(12) United States Patent
Bhushan et al.

(10) Patent No.: US 11,893,675 B1
(45) Date of Patent: Feb. 6, 2024

(54) PROCESSING UPDATED SENSOR DATA FOR REMOTE COLLABORATION

(71) Applicant: SPLUNK INC., San Francisco, CA (US)

(72) Inventors: Devin Bhushan, San Jose, CA (US); Caelin Thomas Jackson-King, Santa Clara, CA (US); Stanislav Yazhenskikh, Santa Clara, CA (US); Jim Jiaming Zhu, Scarborough (CA)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 17/515,345

(22) Filed: Oct. 29, 2021

Related U.S. Application Data

(60) Provisional application No. 63/182,473, filed on Apr. 30, 2021, provisional application No. 63/158,303, (Continued)

(51) Int. Cl.
*G06T 15/04* (2011.01)
*G06T 7/00* (2017.01)
(Continued)

(52) U.S. Cl.
CPC ............ *G06T 15/04* (2013.01); *G06T 7/0002* (2013.01); *G06T 17/05* (2013.01); *G06T 17/20* (2013.01);
(Continued)

(58) Field of Classification Search
CPC ....... G06T 15/04; G06T 7/0002; G06T 17/05; G06T 17/20; G06T 2200/08; G06T 2207/30168
See application file for complete search history.

(56) References Cited

U.S. PATENT DOCUMENTS 6,434,278 B1 * 8/2002 Hashimoto ............. G06T 17/00
382/285
7,937,344 B2 5/2011 Baum et al.
(Continued)

FOREIGN PATENT DOCUMENTS

EP 3 343 516 A1 7/2018
WO 2018/222188 A1 12/2018

OTHER PUBLICATIONS

Splunk Enterprise 8.0.0 Overview, available online, retrieved May 20, 2020 from docs.splunk.com.
(Continued)

*Primary Examiner* — Said Broome
(74) *Attorney, Agent, or Firm* — Artegis Law Group, LLP

(57) ABSTRACT

Various implementations set forth a computer-implemented method for scanning a three-dimensional (3D) environment. The method includes generating, in a first time interval, a first extended reality (XR) stream based on a first set of meshes representing a 3D environment, transmitting, to a remote device, the first XR stream for rendering a 3D representation of a first portion of the 3D environment in a remote XR environment, determining that the 3D environment has changed based on a second set of meshes representing the 3D environment and generated subsequent to the first time interval, generating a second XR stream based on the second set of meshes, and transmitting, to the remote device, the second XR stream for rendering a 3D representation of at least a portion of the changed 3D environment in the remote XR environment.

20 Claims, 33 Drawing Sheets

Related U.S. Application Data filed on Mar. 8, 2021, provisional application No. 63/157,527, filed on Mar. 5, 2021, provisional application No. 63/154,605, filed on Feb. 26, 2021, provisional application No. 63/151,031, filed on Feb. 18, 2021.

(51) Int. Cl.
  *G06T 17/05* (2011.01)
  *G06T 17/20* (2006.01)
(52) U.S. Cl.
  CPC ............... *G06T 2200/08* (2013.01); *G06T 2207/30168* (2013.01)

(56) References Cited

U.S. PATENT DOCUMENTS

| | | | |
|---|---|---|---|
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,171,402 | B1 | 10/2015 | Allen et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 11,127,223 | B1 | 9/2021 | Bhushan et al. |
| 2005/0128210 | A1* | 6/2005 | Berger ............... G06T 15/04 345/582 |
| 2007/0025624 | A1 | 2/2007 | Baumberg |
| 2007/0177583 | A1 | 8/2007 | Vernal et al. |
| 2008/0246765 | A1* | 10/2008 | Grenfell ............... G06T 15/04 345/423 |
| 2009/0244065 | A1 | 10/2009 | Storti et al. |
| 2011/0102460 | A1 | 5/2011 | Parker |
| 2013/0162633 | A1* | 6/2013 | Berger ............... G09G 5/00 345/582 |
| 2014/0063024 | A1* | 3/2014 | Zhang ............... G06T 9/007 345/506 |
| 2014/0204077 | A1 | 7/2014 | Kamuda et al. |
| 2014/0343909 | A1 | 11/2014 | Guerillot |
| 2014/0354685 | A1 | 12/2014 | Lazarow et al. |
| 2015/0243069 | A1 | 8/2015 | Knoblauch et al. |
| 2016/0148433 | A1 | 5/2016 | Petrovskaya et al. |
| 2016/0300385 | A1 | 10/2016 | Bell et al. |
| 2016/0364907 | A1 | 12/2016 | Schoenberg |
| 2017/0024930 | A1 | 1/2017 | Chuang et al. |
| 2018/0115877 | A1 | 4/2018 | Riker et al. |
| 2019/0098106 | A1 | 3/2019 | Mungel et al. |
| 2019/0197774 | A1 | 6/2019 | Molyneaux et al. |
| 2019/0369836 | A1 | 12/2019 | Faulkner et al. |
| 2019/0372060 | A1 | 12/2019 | Li et al. |
| 2020/0066044 | A1 | 2/2020 | Stahl et al. |
| 2020/0066045 | A1 | 2/2020 | Stahl et al. |
| 2020/0098173 | A1 | 3/2020 | McCall |
| 2020/0105068 | A1 | 4/2020 | Panse et al. |
| 2020/0134911 | A1 | 4/2020 | van Hoff et al. |
| 2021/0090301 | A1 | 3/2021 | Mammou et al. |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pds/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

International Search Report for Application No. PCT/US2022/016957 dated Jun. 7, 2022.

Li et al., "3D Reconstruction and Texture Optimization Using a Sparse Set of RGB-D Cameras", 2019 IEEE Winter Conference on Applications of Computer Vision, DOI 10.1109/WACV.2019.00155, Jan. 7, 2019, pp. 1413-1422.

Hou et al., "Optimized Method for Real-time Texture Reconstruction with RGB-D Camera", DOI 10.1007/sl2209-017-0069-7, vol. 23, No. 5, 2017, pp. 493-500.

International Search Report for Application No. PCT/US2022/016955 dated Apr. 5, 2022.

International Search Report for Application No. PCT/US2022/016950 dated Apr. 8, 2022.

Mossel et al., "Streaming and Exploration of Dynamically Changing Dense 3D Reconstructions in Immersive Virtual Reality", 2016 IEEE International Symposium on Mixed and Augmented Reality, DOI: 10.1109/ISMAR-ADJUNCT.2016.0035, Sep. 19, 2016, pp. 43-48.

Yang et al., "Learning Object Bounding Boxes for 3D Instance Segmentation on Point Clouds", NEURIPS 2019, 33rd Conference on Neural Information Processing Systems Dec. 8, 2019, 10 pages.

First Action Interview Office Action received for U.S. Appl. No. 17/246,423 dated Nov. 16, 2022, 7 pages.

Pre-Interview First Office Action received for U.S. Appl. No. 17/246,423 dated Oct. 5, 2022, 20 pages.

Pre-Interview First Office Action received for U.S. Appl. No. 17/246,434 dated Sep. 2, 2022, 15 pages.

First Action Interview Office Action received for U.S. Appl. No. 17/246,434 dated Oct. 3, 2022, 10 pages.

Non Final Office Action received for U.S. Appl. No. 17/515,321 dated Feb. 3, 2023, 26 pages.

Non Final Office Action received for U.S. Appl. No. 17/515,325 dated Feb. 17, 2023, 38 pages.

Final Office Action received for U.S. Appl. No. 17/246,423 dated Mar. 14, 2023, 55 pages.

Non Final Office Action received for U.S. Appl. No. 17/515,320 dated Feb. 3, 2023, 31 pages.

Advisory Action received for U.S. Appl. No. 17/246,423, dated May 10, 2023, 4 pages.

Non Final Office Action received for U.S. Appl. No. 17/246,423 dated Jul. 7, 2023, 57 pages.

Final Office Action received for U.S. Appl. No. 17/246,434 dated Jul. 17, 2023, 60 pages.

Non Final Office Action received for U.S. Appl. No. 17/515,320 dated Sep. 6, 2023, 34 pages.

Non-Final Office Action received for U.S. Appl. No. 17/246,434 dated Oct. 25, 2023, 55 pages.

Final Office Action received for U.S. Appl. No. 17/515,321 dated Dec. 13, 2023, 42 pages.

\* cited by examiner

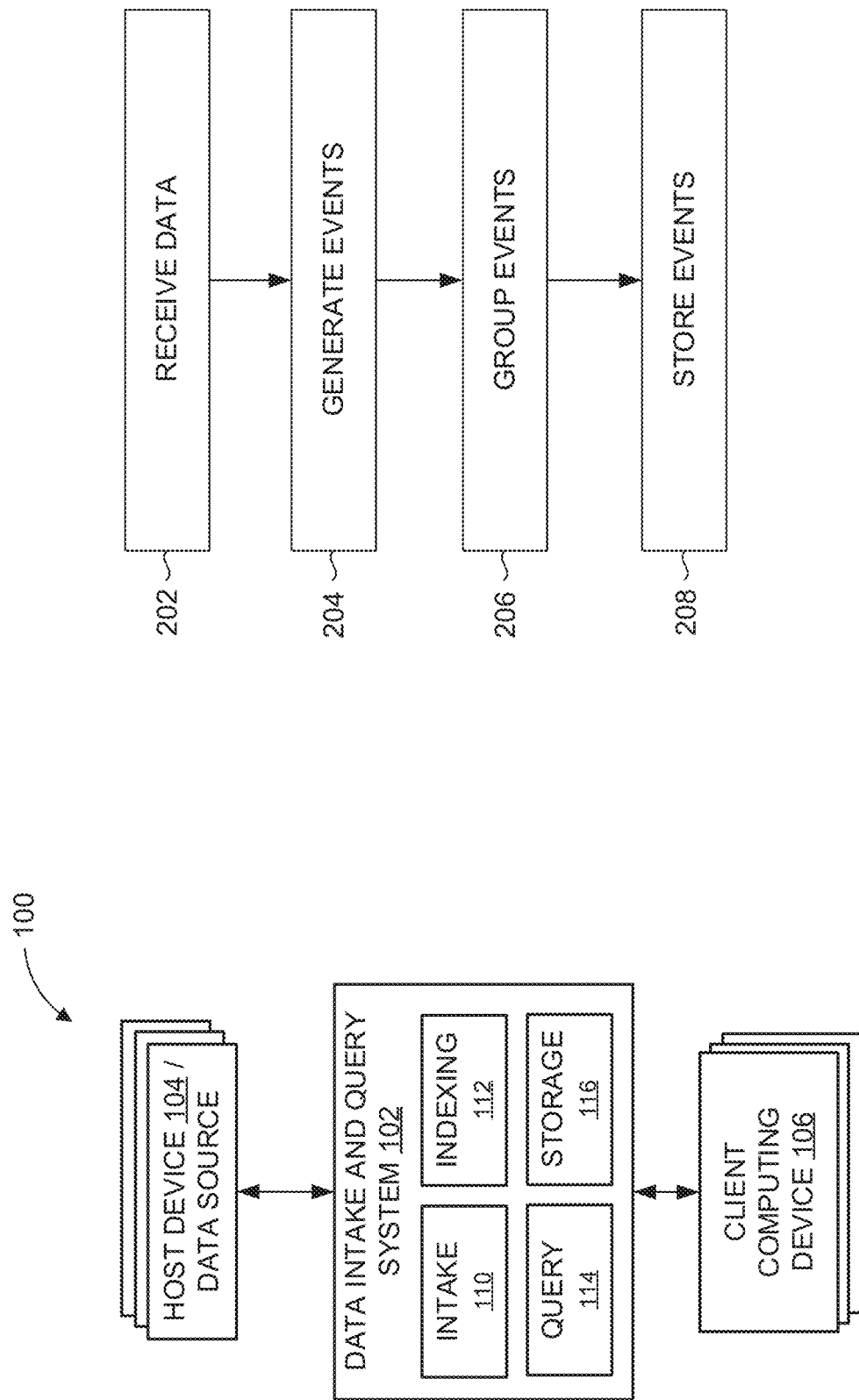

─ 302

─ 302A 127.0.0.1 − eva [10/Oct/2000:13:55:36-0700] "GET/apache.gif HTTP/1.0" 200  2326  0.0947
127.0.0.1 − emerson [10/Oct/2000:13:56:36-0700] "GET/eastwood.gif HTTP/1.0" 200 2980 0.0899
    ─ 302C        ─ 302B
127.0.0.3 − eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/pub_html/images/alisia.gif
            ─ 302E              ─ 302D
91.205.189.15 - - [28/Apr/2014:18:22:16] *GET /oldlink?itemId=EST-14&JSESSIONID=SD6SL7FF7ADFF53113 HTTP 1.1" 200 1665 "http://www.buttercupgames.com/oldlink?itemId=EST-14" "Mozilla/5.0 (Windwos NT 6.1; WOW 64) AppleWebKit/536.5 (KHTML, like Gecko) Chrome/19.0.1084.46 Safari/536.5" 159

─ 304 docker: {
    container_id: f7360a148a670c4c257f4ee024be81284b6017d72ae41ea8ee5d
}
kubernetes: {                   ─ 304A
    container_name: kube-apiserver
    host: ip-172-20-43-173.ec2.internal
    labels: {
        k8s-app: kube-apiserver
    }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal       ─ 304B
}
log: I0503 23:04:12.595203    1 wrap.go:42] GET /apis/admissionregistrations.k8s.io/v1beta1/validatingwebhookconfiguration 200 [[kube-apiserver/v1.9.3 (linux/amd64) kubernetes/d283541] 127.0.0.1:55026 stream: stdout
time: 2018-05-03T23:04:12.619948395Z
}

─ 306

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

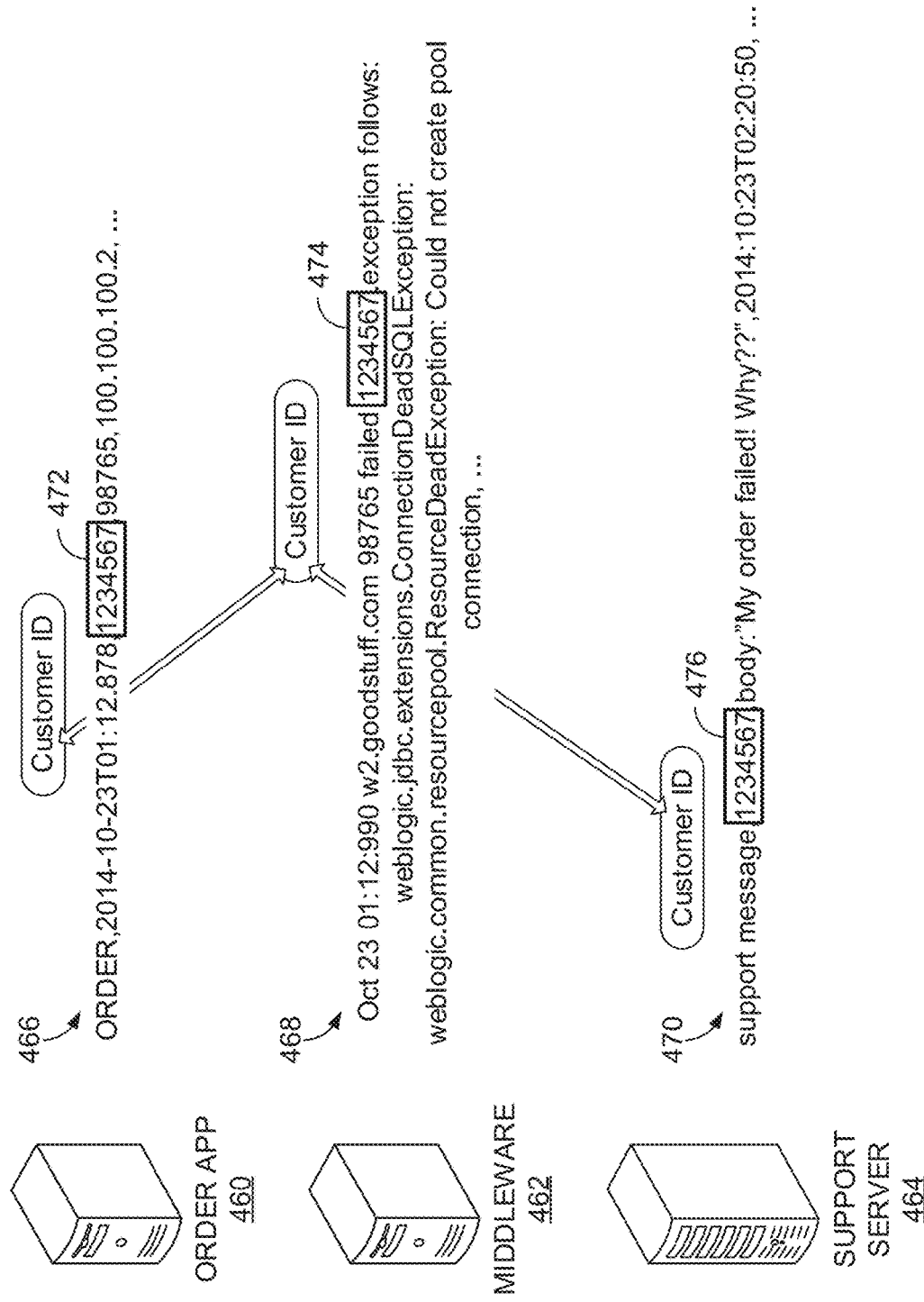

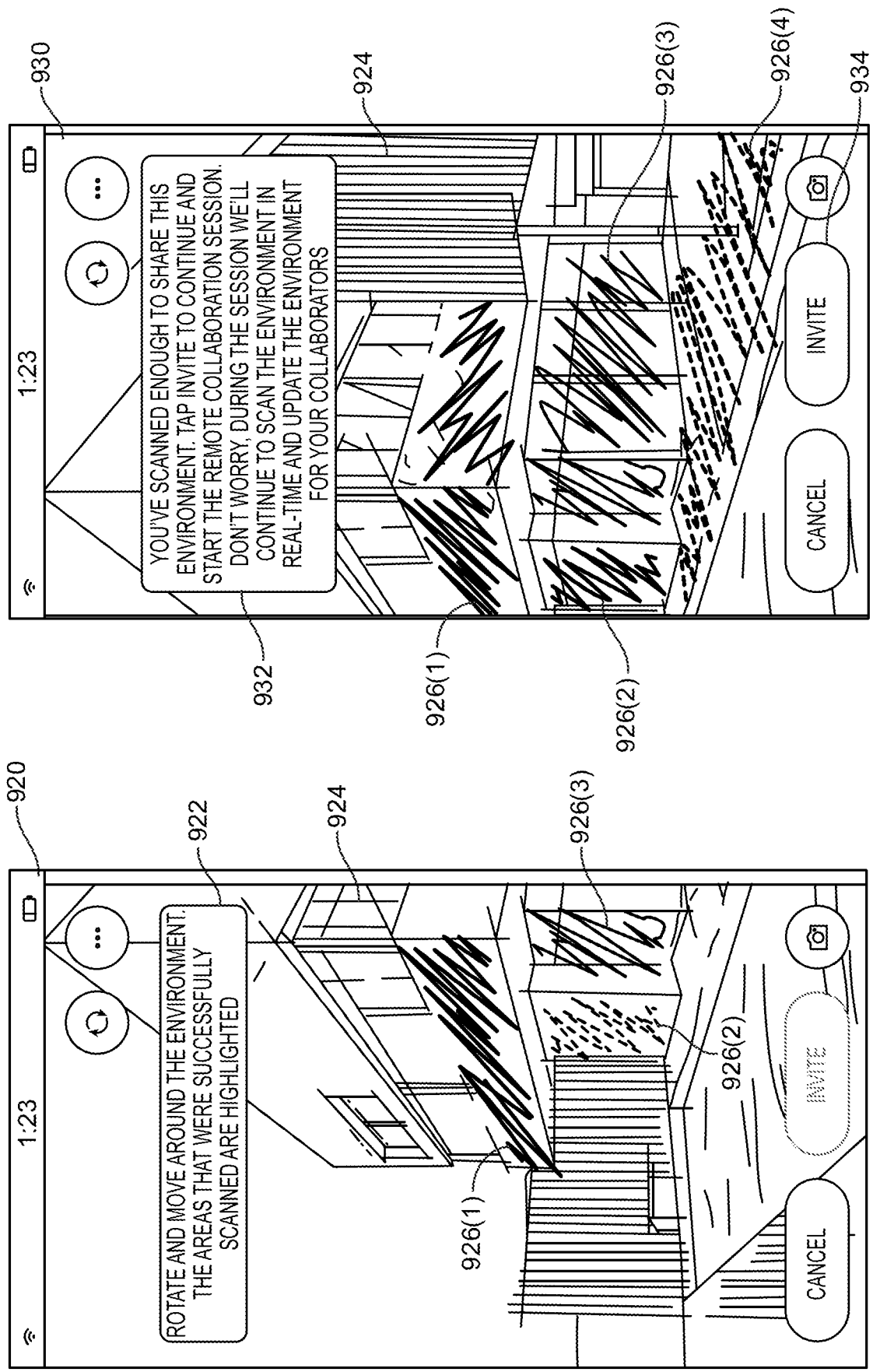

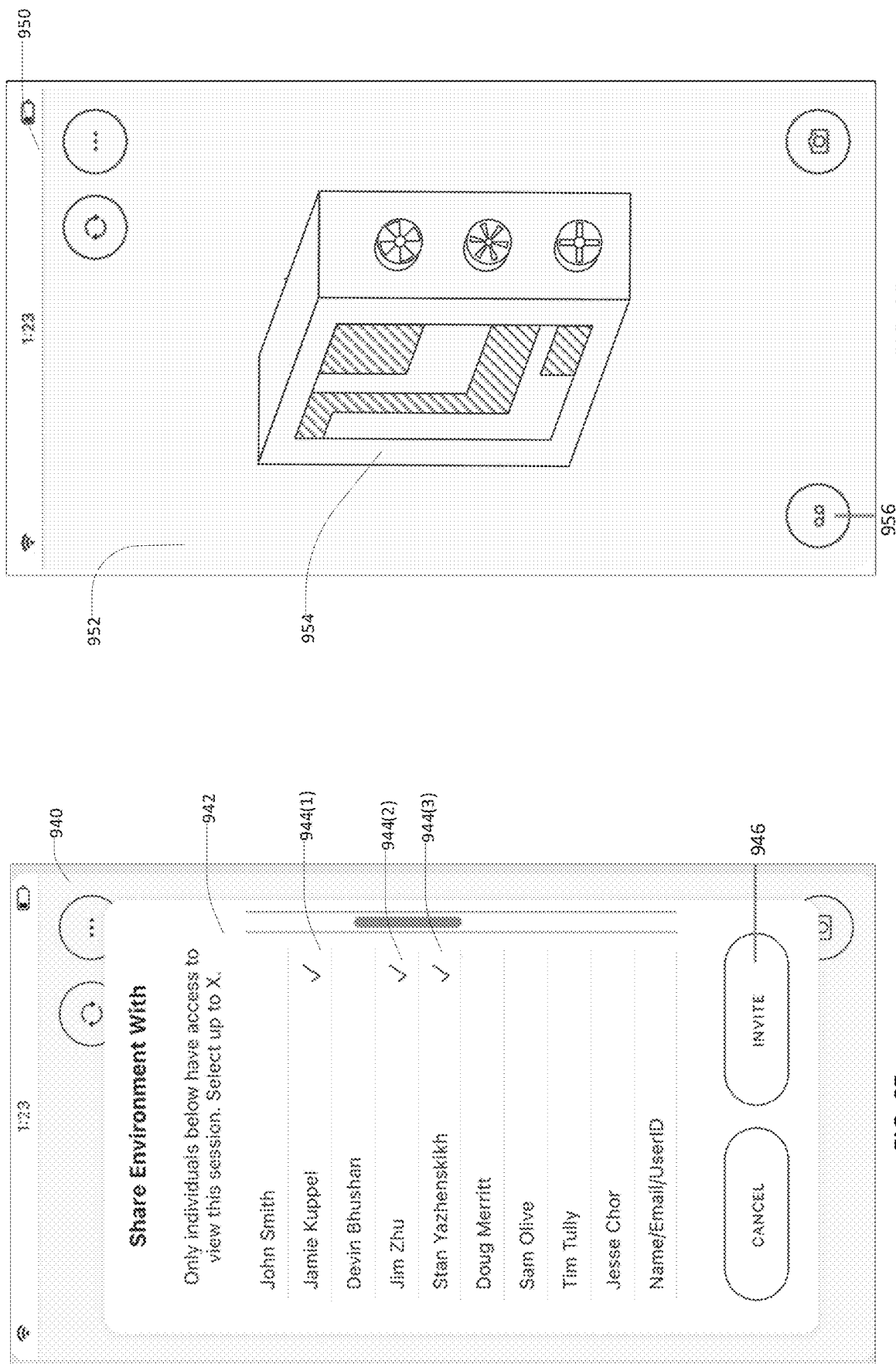

PROCESSING UPDATED SENSOR DATA FOR REMOTE COLLABORATION

RELATED APPLICATIONS

Any and all applications for which a foreign or domestic priority claim is identified in the Application Data Sheet as filed with the present application are incorporated by reference under 37 CFR 1.57 and made a part of this specification.

For example, this application claims the benefit of U.S. Provisional Application having Ser. No. 63/151,031 and filed on Feb. 18, 2021, entitled "Live Updates in Networked Remote Collaboration", U.S. Provisional Application No. 63/157,527, filed on Mar. 5, 2021, entitled "Techniques for Live Updates in Networked Remote Collaboration", U.S. Provisional Application No. 63/154,605, filed on Feb. 26, 2021, entitled "Collaboration Space Selection in Networked Remote Collaboration", U.S. Provisional Application No. 63/158,303, filed on Mar. 8, 2021, entitled "Updating Devices in a remote Collaboration Session", and U.S. Provisional Application No. 63/182,473, filed on Apr. 30, 2021, entitled "Live Updates in a Networked Remote Collaboration Session".

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

FIG. 4D is a block diagram illustrating an example scenario where a common customer identifier is found among log data received from disparate data sources.

FIG. 9C, illustrates the extendable application scanning a physical space within a real-world environment, in accordance with example implementations.

FIG. 9D illustrates the extendable application completing a scan of a physical space, in accordance with example implementations.

FIG. 9E illustrates an invitation menu for a potential participant in a remote collaboration session, in accordance with example implementations.

FIG. 9F illustrates a portion of a remote environment during a remote collaboration session, in accordance with example implementations.

DETAILED DESCRIPTION

Figure 3B:
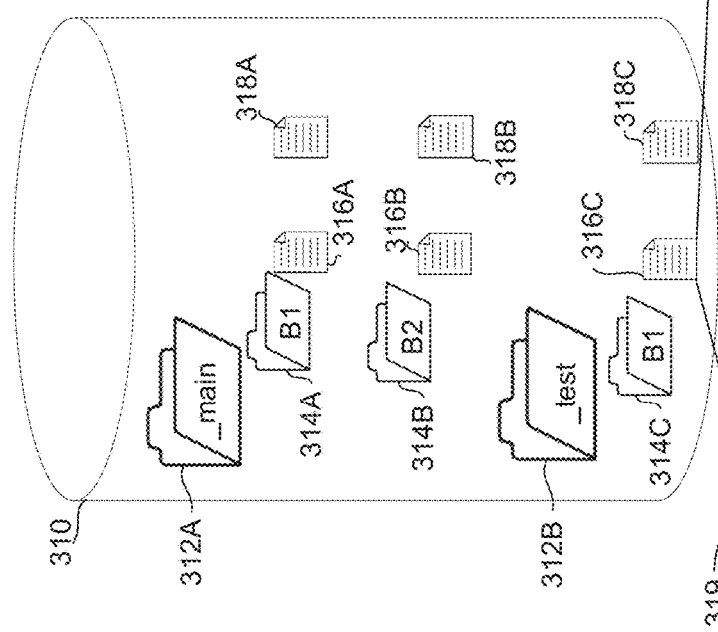
FIGS. 3B and 3C are block diagrams illustrating embodiments of various data structures for storing data processed by the data intake and query system.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, Calif. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a standalone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.1 Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 16 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. Tn some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (APT). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion. Indexing. And Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
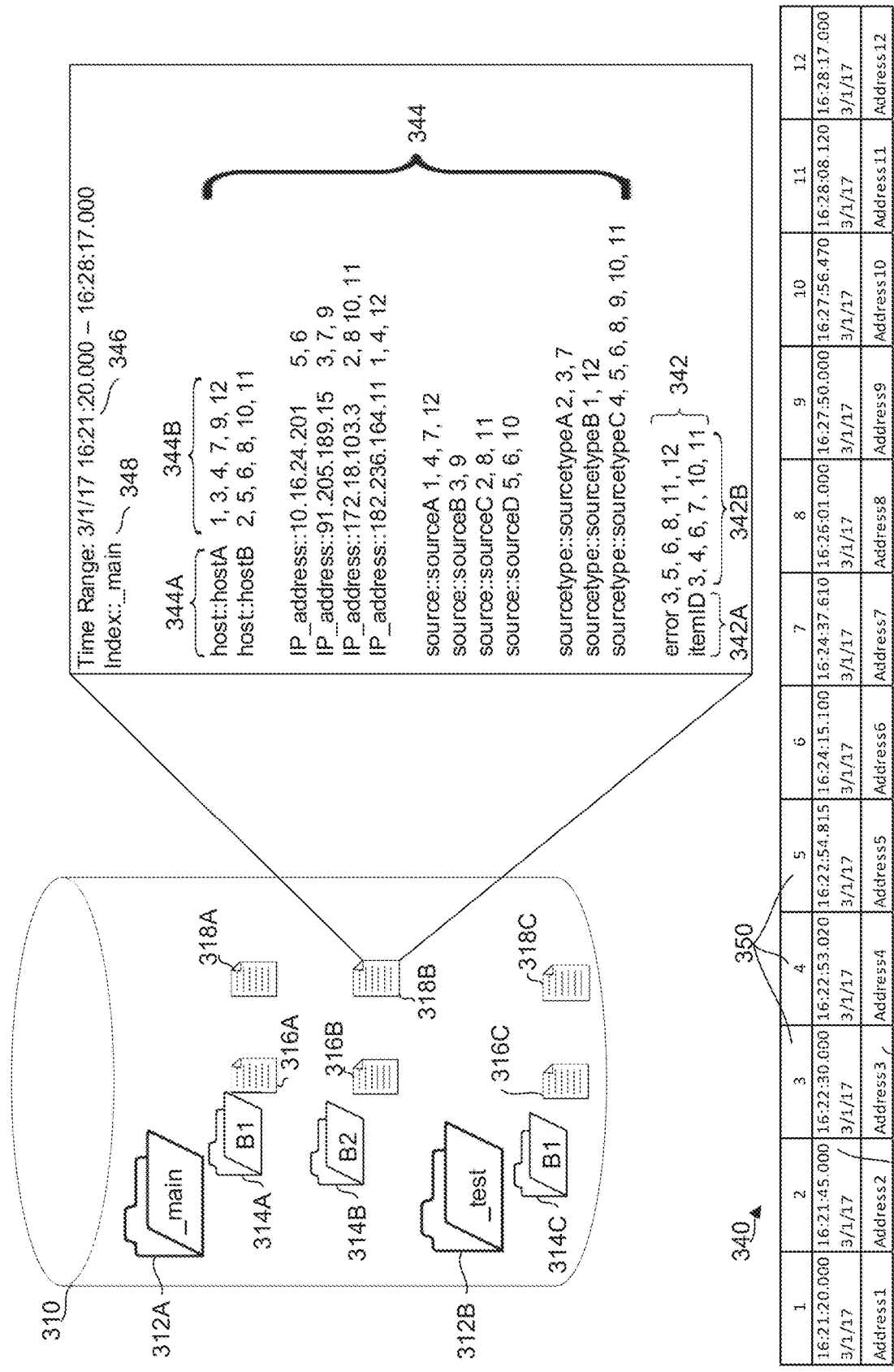

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name:field values container_name:kube-apiserver, host:ip 172 20 43 173.ec2.internal, pod_id:0a73017b-4efa-11e8-a4el-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a_main directory 312A associated with an index "_main" and a_test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the main directory 312A and one sub-directory 312C of the_test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
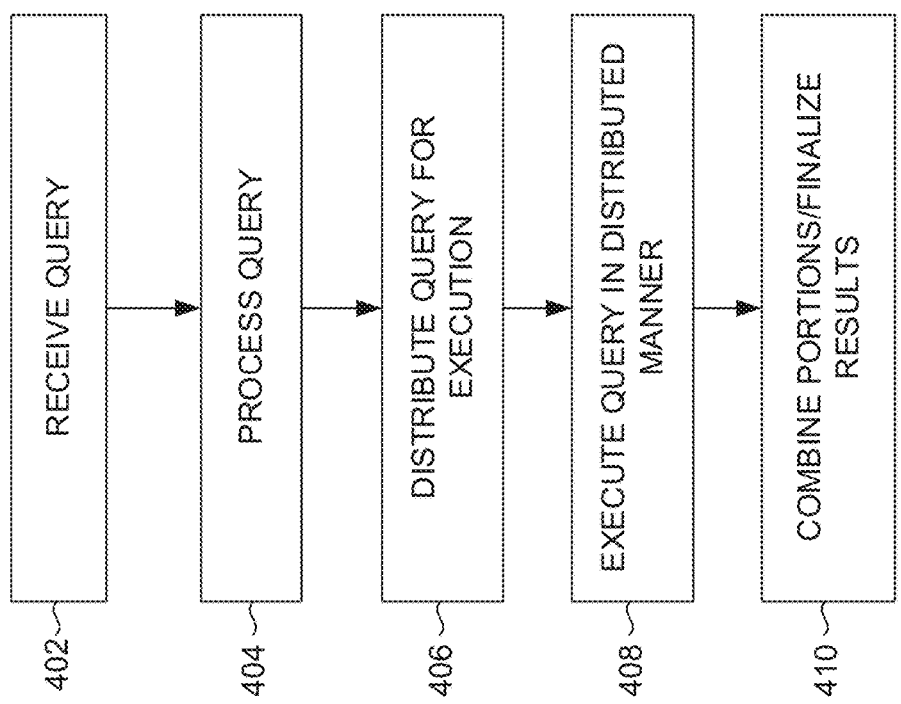
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 114 distributes the determined portions or phases of the query to the appropriate components (e.g., search nodes). In some cases, the query system 114 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
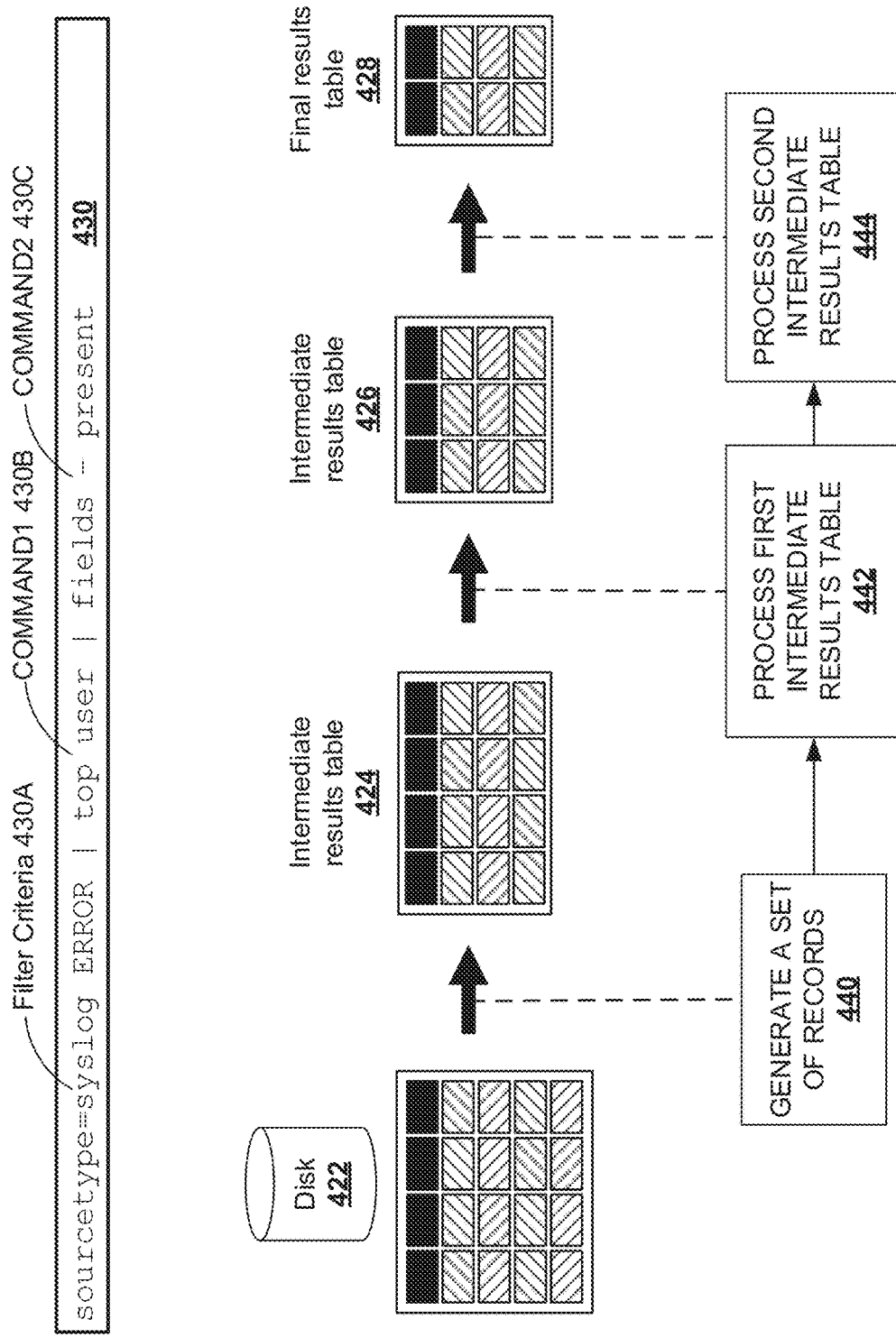
FIG. 4B provides a visual representation of the manner in which a pipelined command language or query can operate.

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
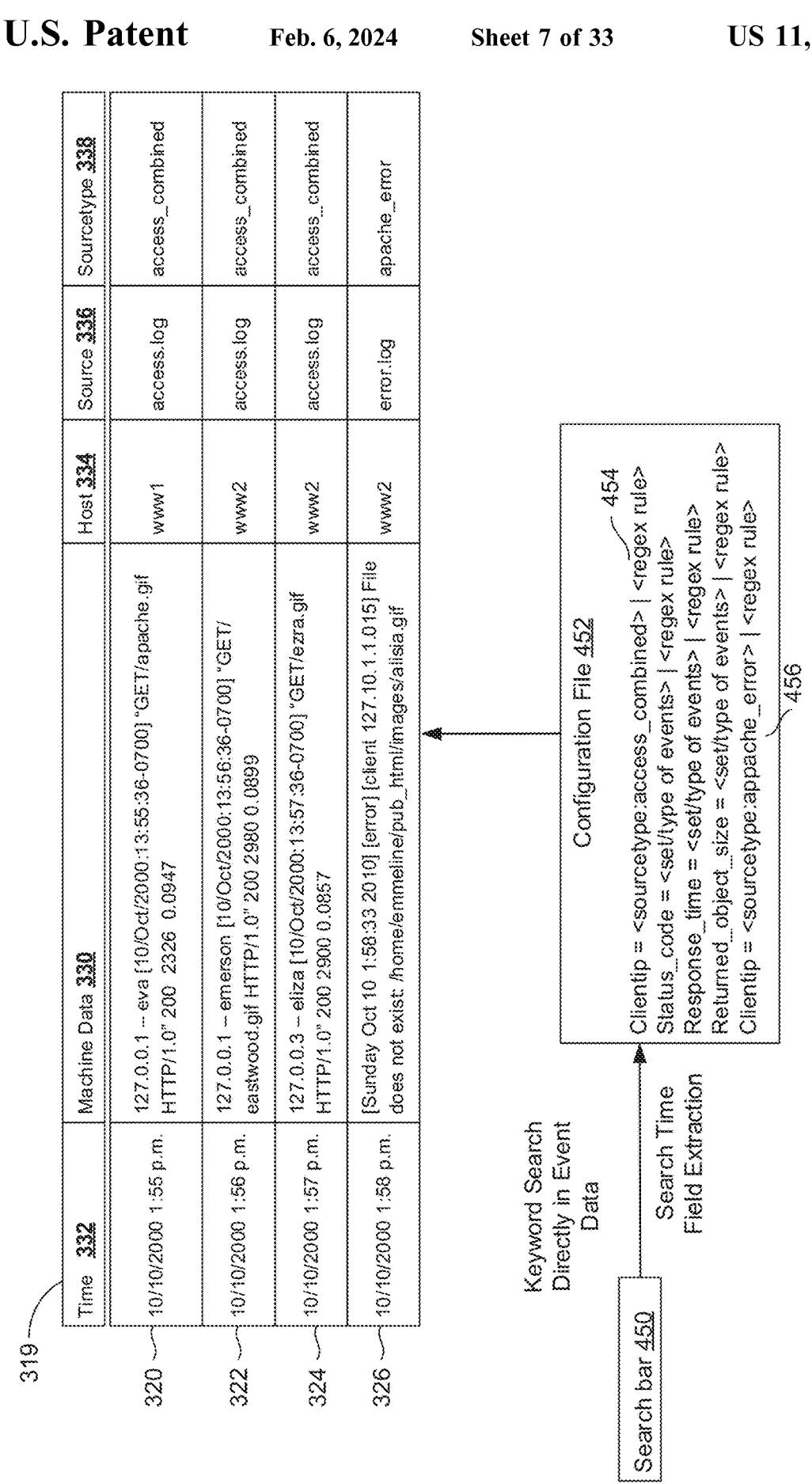
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

[In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

[By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov. 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a servicecentric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Networked Data Processing System

Figure 5:
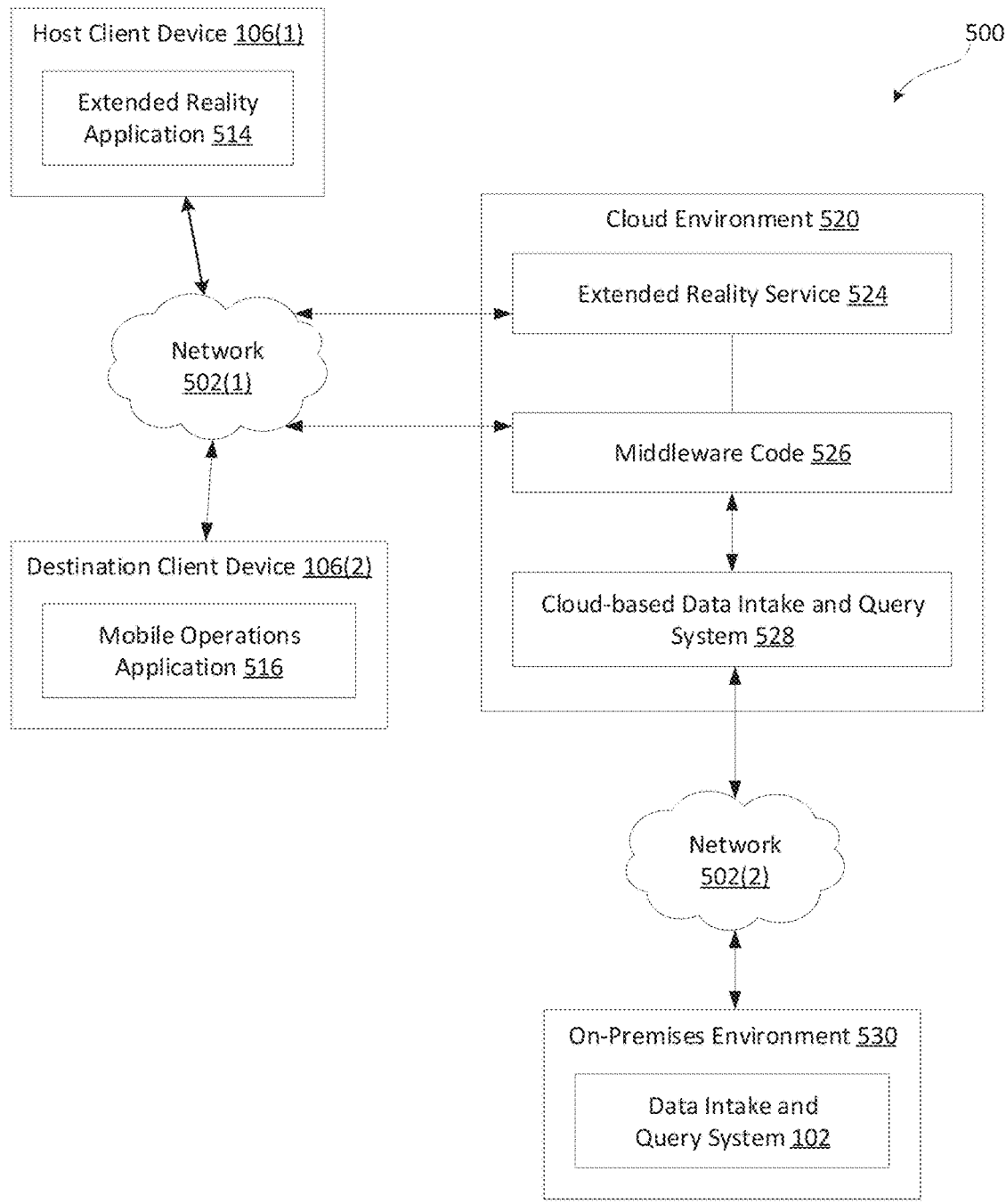
FIG. 5 illustrates a network architecture that enables secure communications via a network between client devices and an on-premises environment for the data intake and query system of FIG. 1, in accordance with example implementations.

FIG. 5 illustrates a network architecture that enables secure communications via network 502 (e.g., 502(1), 502 (2)) between client devices 106 (ea, 106(1), 106(2), etc.) and an on-premises environment 530 for the data intake and query system 102, in accordance with example implementations.

As described above, a user may install and configure, on computing devices owned and operated by the user, one or more software applications that implement some or all of the data intake and query system 102. For example, a user may install a software application on server computers owned by the user and configure each server to operate as one or more of a forwarder, an indexer, a search head, etc. This arrangement generally may be referred to as an "on-premises" solution. An on-premises solution may provide a greater level of control over the configuration of certain aspects of the system (e.g., security, privacy, standards, controls, etc.).

In various implementations, the cloud-based data intake and query system 528, executing in the cloud environment 520, may serve as a secure bridge between an on-premises environment 530 and an extended reality application 514 and/or a mobile operations application 516. In other implementations, the on-premises environment 530 may be omitted and the entire computational process may be carried out in one or more aspects or components of the cloud environment 520. In various implementations, the cloud environment 520 may include a cloud-based data intake and query system 528, which communicates with the data intake and query system 102 via a network 502(2). The cloud environment 520 may further include middleware code 526 and/or a push notification service (not shown), which communicate with the extended reality application 514, the mobile operations application 516, the sensor data device 508, and/or the hub device 504 via a network 502(1). In various implementations, the network 502(1) and the network 502(2) may be portions of the same network or may include one or more shared network components that communicate with both the network 502(1) and the network 502(2). In various implementations, the data intake and query system 102 may communicate with a network interface of a given client device 106 through use of a mobile gateway that facilitates communication between devices behind a firewall, or set of firewalls, without requiring additional port openings.

In various implementations, the client device 106 retrieves data and displays the retrieved data via the extended reality application 514 and/or the mobile operations application 516. For example, the client device 106(1) could send a query to the data intake and query system 102 in order to receive a response that includes a set of field values. These field values, extracted from events, could be associated with data included in the query. In various implementations, the client device 106 and/or the data intake and query system 102 may generate content (e.g., schemas, dashboards, cards, and/or visualizations) based on the extracted field values.

In various implementations, an object may have a tag that encodes or otherwise includes data. The data in the tag includes a textual and/or numerical string that operates as a unique identifier (UID). The tag is provided by an entity that owns or operates the environment in which the object resides. In such instances, the client device 106 may scan tags associated with the object, decode data included in the tag, determine a unique identifier from the decoded data, and use the unique identifier to receive field values, extracted from events, which are associated with the object. In various implementations, the client device 106 and/or the data intake and query system 102 may generate content (e.g., schemas, dashboards, cards, and/or visualizations) based on the extracted field values.

The extended reality application 514 executing on the client device 106(1) and/or the mobile operations application 516 executing on the client device 106(2) may establish secure, bidirectional communications with the data intake and query system 102. For example, in some implementations, a persistent, always-open, asynchronous socket for bidirectional communications (e.g., a trusted tunnel bridge) through a firewall of the on-premises environment 530 could be established between the data intake and query system 102 and the cloud-based data intake and query system 528. The cloud-based data intake and query system 528 may then communicate with the extended reality application 514 and/or the mobile operations application 516 via the middleware code 526 executing in the cloud environment 520.

Additionally, in some implementations, the cloud-based data intake and query system 528 and/or the middleware code 526 may communicate with the extended reality application 514 and/or the mobile operations application 516 via a push notification service, such as Apple Push Notification service (APNs) or Google Cloud Messaging (GCM). For example, the data intake and query system 102 could output to the one or more client devices 106, based on the unique identifier, content that includes real-time data associated with a particular object. The content could then be displayed by the client device 106. For example, the mobile operations application 516 could display the content in a window provided by the client device 106. In some implementations, the extended reality application 514 may display the content in relation to the real-world object, in conjunction with an augmented reality workspace. Additionally or alternatively, various playbooks, insights, predictions, annotations, and/or runbooks that include set of commands and/or logic trees (e.g., if-then-else) associated with an object and possible actions (e.g., "if the operating temperature is above 100 degrees Celsius, then show options for activating fans") may be implemented and/or displayed to the user.

In some implementations, in order to authenticate an instance of the extended reality application 514 and/or the mobile operations application 516 associated with a particular user and/or client device 106, the extended reality application 514 and/or the mobile operations application 516 may cause a unique identifier associated with the user and/or the client device 106 to be displayed on a display device (Mi, on a display of the client device 106). The user may then register the unique identifier with the cloud-based data intake and query system 528 and/or the data intake and query system 102, such as by entering the unique identifier into a user interface (e.g., a web portal) associated with the cloud-based data intake and query system 528 or the data intake and query system 102. In response, the extended reality application 514 and/or the mobile operations application 516 may receive credentials that can be used to access real-time data outputted by the data intake and query system 102. Additional queries transmitted by the client device 106 to the data intake and query system 102 may then implement the credentials associated with the unique identifier. In this manner, secure, bidirectional communications may be established between the client device 106 and the data intake and query system 102.

Once the communications connection is established, a user may cause the client device 106 to acquire data based on a tag provided by, or otherwise associated with, a given object. For example, the client device 106 could scan a tag and may decode the tag to retrieve a unique object identifier (UOID) from the tag that corresponds to the particular object.

Once the client device 106 obtains the UOID, the client device 106 transmits queries to the data intake and query system 102, requesting one or more values associated with the object. For example, the client device 106 could send a request for specific field values for the object. The client device 106 could include the UOID in the request that is sent to the data intake and query system 102. In response, the data intake and query system 102 may retrieve events associated with the UOID and may use extraction rules to extract values for fields in the events being searched, where the extracted values include the requested field values. The data intake and query system 102 then transmits the field values associated with the UOID to the client device 106. In various implementations, the data intake and query system 102 may transmit the raw data retrieved from the field values included in the event data. Alternatively, the data intake and query system 102 may filter, aggregate, or otherwise process the raw data prior to transmitting the field values. For example, in some implementations, the data intake and query system 102 may generate a dashboard associated with the unique object ID. The dashboard may include a filtered subset of data values, where the subset of data values is filtered based on additional criteria, such as user role (e.g., a user role identifier value), location, type of device (e.g., whether client device 106-1 is a smart phone, tablet, AR headset, etc.), and/or time.

The extended reality application 514 receives the field values from the data intake and query system 102, where the field values represent the values of one or more metrics associated with the UOID. In an implementation, the field values are extracted from fields that are defined post-ingestion (e.g., at search time), as has been previously described (e.g., with a late-binding schema). The field values transmitted by the data intake and query system 102 may be in any technically-feasible format.

In various implementations, the data intake and query system 102 may generate a dashboard that includes one or more visualizations of the underlying textual and/or numerical information based on the retrieved field values. In various implementations, the mobile operations application 516 may display one or more visualizations that are included in the dashboard received from the data intake and query system 102. Additionally or alternatively, the extended reality application 514 may generate an AR workspace that includes one or more panels, where the one or more panels include the visualizations (included in the dashboard) as a portion of an AR workspace. In some implementations, the dashboard may also include a portion of the field values as a data set. In such instances, the extended reality application 514 and/or the mobile operations application 516 may generate visualizations based on the field values included in the data set.

Figure 6:
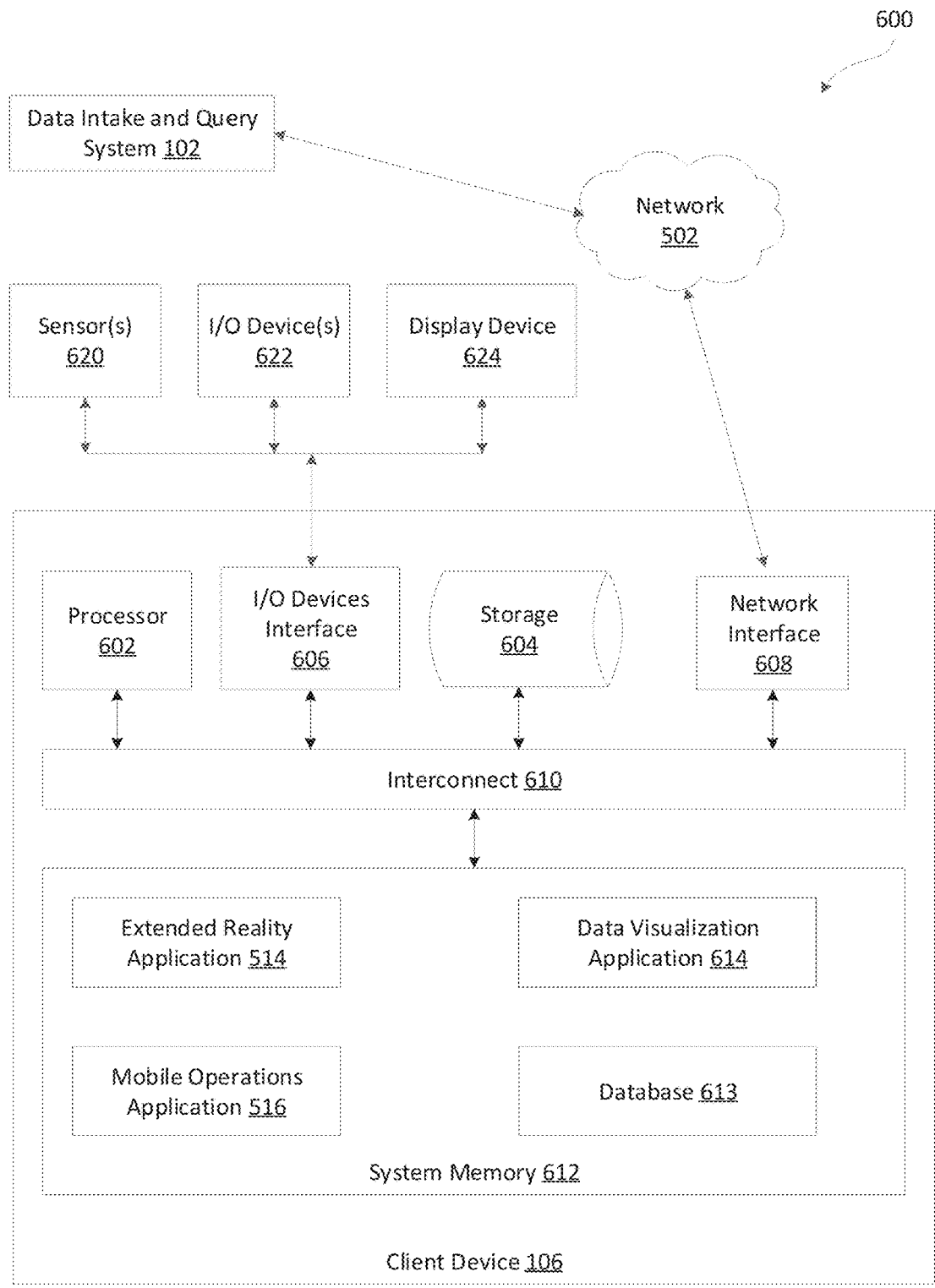
FIG. 6 illustrates a more detailed view of the example data processing environment of FIG. 1, in accordance with example implementations.

FIG. 6 illustrates a more detailed view of the example data processing environment 100 of FIG. 1, in accordance with example implementations. As shown, the data processing environment 600 may include, without limitation, the data intake and query system 102 and the client device 106 communicating with one another over the network 502. The data intake and query system 102 and the client device 106 function substantially the same as described in conjunction with FIGS. 1 and 5, except as further described herein. Examples of the client device 106 may include, without limitation, a mobile device (e.g., a smartphone, a tablet computer, a handheld computer, a wearable device, a portable media player, a virtual reality (VR) console, an augmented reality (AR) console, a laptop computer, a desktop computer, a server, a gaming device, a streaming device (e.g., an Apple TV® device, a Roku (® device, etc.), and so forth. The client device 106 may include, without limitation, a processor 602, storage 604, an input/output (I/O) device interface 606, a network interface 608, an interconnect 610, and system memory 612. The system memory 612 includes the extended reality application 514, mobile operations application 516, data visualization application 614 and database 613.

In general, the processor 602 may retrieve and execute programming instructions stored in the system memory 612. The processor 602 may be any technically-feasible form of processing device configured to process data and execute program code. The processor 602 could be, for example, a central processing unit (CPU), a graphics processing unit (GPU), an application-specific integrated circuit (ASIC), a field-programmable gate array (FPGA), and so forth. The processor 602 stores and retrieves application data residing in the system memory 612. The processor 602 is included to be representative of a single CPU, multiple CPUs, a single CPU having multiple processing cores, and the like. In operation, the processor 602 is the manager processor of the client device 106, controlling and coordinating operations of other system components.

The system memory 612 stores software application programs and data for use by the processor 602. For example, the system memory 612 could include, without limitation, the extended reality application 514, the mobile operations application 516, and/or a database 613. The processor 602 executes software application programs stored within the system memory 612 and, optionally, an operating system. In particular, the processor 602 executes software and then performs one or more of the functions and operations set forth in the present application.

The data visualization application 614 is an application that displays, computes, and/or generates data based on data received from the data intake and query system 102. In some embodiments, the data visualization application 614 may use the identifier for an object (object ID) and/or a dashboard (dashboard ID) to retrieve field values, extracted from events, which are associated with a specific object or environment. In various embodiments, the client device 106 and/or the data intake and query system 102 may generate content (e.g., schemas, dashboards, cards, and/or visualizations) based on the extracted field values.

In various embodiments, the data visualization application 614 retrieves data by querying a field-searchable data store included in the network. For example, the data visualization application 614 could be an instance of the SPLUNK® ENTERPRISE system, an application within the cloud-based environment, such as SPLUNK CLOUD™, an application for a self-service cloud, or another deployment of an application that implements the Splunk processing language (SPL).

For example, the data visualization application 614 could implement the data intake and query system 102 in order to extract one or more fields of data from a field-searchable data store. In such instances, the data visualization application 614 could retrieve the extracted fields as portions of a text string, such as: 2018-07-28 00:07:01,781 INFO [async_client] [async_client][asyncjpost_request] [16574] POST headers={'Authorization': u'SplunkM4q2ROpGJCpng81W i8JJsyVlyGIxrIhI_lUsIUxvVk3m I12q6Q83Drf7P68v8H68kvQ7RHgA2eJz5o-LSnw4dOOyw EsTodODOjdWDNGHj9zFGN-RuCiBWovEyXnO25X3_aNjSwyO_rE_ik7', Content-Type: app lication/json'}, uri=https://127.0.0.1:8089/servicesNS/nobody/spacebridge-app/storage/collections/data/alert_recipient_devices, params=None, data={"py/object": "spacebridge app.data.alert_data. RecipientDevice", "timestamp": "1532736421.201776", "alert_id": "5b5bb3a580db6133e603d33f", "device_id": "y+DJALQwOXERwVDBzUe340ya1MINAIdOIPzRB dtt91U=") host=ip-10-0-240-141 source=/opt/splunk/var/log/splunk/spacebridge-app.log sourcetype=spacebridge-app-too_small.

In some embodiments, the data intake and query system 102 may send messages to the data visualization application 614 in accordance with a push notification service (not shown), such as the APPLE® Push Notification service (APN), or GOOGLE® Cloud Messaging (GCM). For example, the data visualization application 614 could receive various schemas, dashboards, playbooks, runbooks, cards, and/or visualizations that include real-time data associated with a particular machine and/or set of field-searchable events.

The storage 604 may be a disk drive storage device. Although shown as a single unit, the storage 604 may be a combination of fixed and/or removable storage devices, such as fixed disc drives, floppy disc drives, tape drives, removable memory cards, or optical storage, network attached storage (NAS), or a storage area-network (SAN). The processor 602 communicates to other computing devices and systems via the network interface 608, where the network interface 608 is configured to transmit and receive data via one or more communications networks 502.

The interconnect 610 facilitates transmission, such as of programming instructions and application data, between the processor 602, the input/output (I/O) device interface 606, the storage 604, the network interface 608, and the system memory 612. The I/O device interface 606 is configured to receive input data from user I/O devices. These I/O devices include, without limitation, sensor(s) 620 (e.g., one or more cameras, location sensor(s), etc.), input device(s) 622 (e.g., a keyboard, stylus, microphone, etc.), and/or a display device 624. The display device 624 generally represents any technically-feasible means for generating an image for display. For example, the display device 624 could be a liquid crystal display (LCD) display, an organic light-emitting diode (OLED) display, or a digital light processing (DLP) display. The sensor 620, such as camera, acquires images via a lens and converts the images into digital form. The images acquired by the camera may be stored in the storage 604 and/or the system memory 612. An acquired image may be displayed on the display device 624, either alone or in conjunction with one or more other acquired images, graphical overlays, and/or other data.

The sensor(s) 620 may include location sensors enable the client device 106 to determine the physical location and/or orientation of the client device 106. In some implementations, the location sensor(s) may include a network-based sensor that communicates with the data intake and query system 102 via the network 502, which may be part of a production-monitoring network. In some implementations, the location sensor(s) may include a network-based sensor that communicates with one or more data intake and query systems 102 via a local area network (LAN) and/or a wide area network (WAN). In various implementations, the production-monitoring environment may include multiple objects (e.g., sensor data devices 508) and/or multiple client devices 106. Each of the client devices 106 may communicate with a data intake and query system 102, and each of the client devices 106 is capable of identifying one or more objects based on identifier tags, geofences, and/or any other object-identification technique disclosed herein.

The I/O devices 622 may include a microphone that acquires audio signals for storage and analysis. Additional examples of user I/O devices 622 (not explicitly shown) may include one or more buttons, a keyboard, and a mouse or other pointing device. The I/O device interface 606 may also include an audio output unit configured to generate an electrical audio output signal, and the additional user I/O devices 622 may further include a speaker configured to generate an acoustic output in response to the electrical audio output signal.

Accordingly, in various implementations disclosed herein, a data processing environment includes a host device and one or more destination devices that are connected via a tunnel bridge. In particular, the host device changes one or more properties of a host dashboard, where the host dashboard provides insights to various operations via retrieved data values. For example, the host device provides dashboard property modifications through the tunnel bridge to the one or more destination devices. A given destination device includes a destination dashboard that corresponds to the dashboard included in the host device. Upon receipt of the modifications, the destination device applies the modifications to the destination dashboard.

In another example, host device may transmit the dashboard property modification to a device simulator, where a given device simulator models the operation of software operating on a specific type of device. A given device simulator modifies a property of a dashboard that is included in the given device simulator. The given device simulator then provides the modified simulated dashboard to at least one of the host device or the destination device, where the receiving device displays the modified simulated dashboard. Further, the given device simulator generates a dashboard screenshot of the generated dashboard. In such instances, the given device simulator transmits the screenshot to remote storage, where the host device or the destination devices retrieves the dashboard screenshot for display.

6.0 Networked Remote Collaboration System

Figure 7:
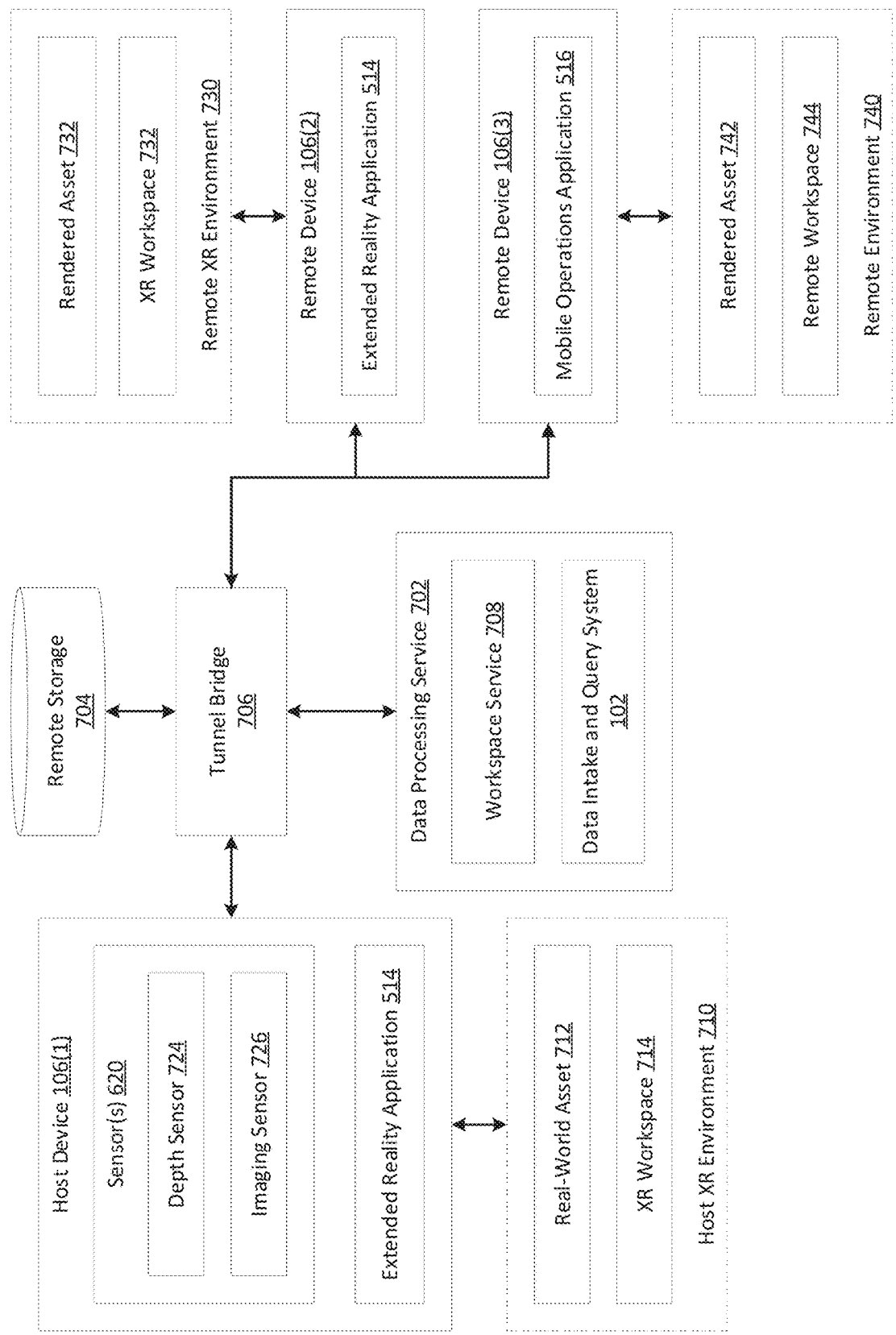
FIG. 7 illustrates a block diagram of an example networked computer environment, in accordance with example implementations.

FIG. 7 illustrates a block diagram of an example networked computer environment 700, in accordance with example implementations. As shown, a networked computer environment 700 may include, without limitation, host device 106(1), one or more remote devices 106, data processing service 702, remote storage 704, tunnel bridge 706, host extended reality (XR) environment 710, remote XR environment 730, coupled to remote device 106(2) and remote environment 740 coupled to remote device 106(3). Host device 106(1) includes depth sensor 724, imaging sensor 726, and XR application 514. Host XR environment 710 includes real-world asset 712 and XR workspace 714. Remote XR environment 730 includes rendered asset 732 and XR workspace 734. Remote environment 740 includes rendered asset 742 and remote workspace 744. Data processing service 702 includes workspace service 708 and data intake and query system 102.

In various embodiments, host device 106(1) functions substantially the same as client device 106, except as further described herein. Examples of host device 106(1) may include, without limitation, a smartphone, a tablet computer, a handheld computer, a wearable device, an XR console, a laptop computer, a desktop computer, a server, a portable media player, a gaming device, and so forth. In some embodiments, host device 106(1) executes one or more applications that present, compute, or generate data based on data received from data processing service 702. In some embodiments, host device 106(1) may include, without limitation, smartphones, tablet computers, handheld computers, wearable devices, laptop computers, desktop computers, servers, portable media players, gaming devices, an Apple TV® A devices, and so forth.

For example, host device 106(1) may execute an extended reality (e.g., augmented reality (AR), mixed reality (MR), and/or virtual reality (VR)) application, which presents a portion of a real-world environment, performance metrics associated with assets in the real-world environment, and/or other data as provided by data intake and query system 102 and/or data processing service 702. In various embodiments, XR application 514 included in host device 106(1) may generate host XR environment 710 based on sensor data acquired from sensor(s) 620. For example, XR application 514 may include imaging data acquired by imaging sensor 726 when generating host XR environment 710.

Sensor(s) 620 includes various sensors that acquire data about the real-world environment. In various embodiments, host device 106(1) may include sensor(s) 620. For example, host device 106(1) that includes depth sensor 724 and imaging sensor 726. Additionally or alternatively, host device 106(1) may control one or more sensor(s) 620 that are communicatively coupled to host device 106(1). For example, host device 106(1) may be a desktop computer that controls the movement and operation of one or more wireless cameras. In various embodiments, sensor(s) 620 may include additional sensors, such as audio sensors, position sensors (e.g., an accelerometer and/or an inertial measurement unit (IMU)), motion sensors, and so forth.

Depth sensor 724 includes one or more sensors that acquire sensor data relating to the depth of objects within an environment. For example, depth sensor 724 may be one or more (e.g., camera array) light detection and ranging (Li-DAR) cameras that generate depth information based on reflected light. In various embodiments, depth sensor 724 generates depth sensor data using on or more depth imaging techniques, such as triangulation, structured light imaging, time-of-flight imaging, stereo imaging, laser scan, and so forth. In some embodiments, host device 106(1) may compute various depth properties of the environment using the sensor data and generate 3D depth data that includes the computed depth properties. Additionally or alternatively, host device 106(1) may transmit the 3D depth data to remote device(s) 106 for further processing. In some embodiments, depth sensor 724 may include one or more infrared sensors, time-of-flight depth sensors, stereo depth sensors, audio depth sensors (ea, RADAR sensors, sonograms, etc.), and so forth.

Imaging sensor 726 includes one or more optical sensors, such as RGB cameras, infrared cameras, and/or camera arrays, which includes two or more of such cameras. Other imaging sensors may include imagers and/or lasers sensors. In various embodiments, host device 106(1) may generate 2D surface data from the image sensor data acquired by imaging sensor 726.

In various embodiments, host device 106(1) may provide updates to the imaging data (e.g., depth sensor data and image sensor data) associated with real-world environments.

For example, host device 106(1) may update the 2D surface data and the 3D depth data associated with a real-world environment by re-scanning the real-world environments (e.g., re-scanning every 10 seconds) using imaging sensor 726 and depth sensor 724. Such re-scanning may be triggered in multiple ways. For example, host device 106(1) may be triggered to attempt a rescan at periodic intervals (e.g., a setting to attempt a rescan every 20 seconds, every 5 minutes. etc.), in response to a change in the location of host device 106(1), and/or in response to actions taken by remote device 106(2) or 106(3) (LL, receiving a message requesting a re-scan). Additionally or alternatively, host device 106(1) may receive a user input to rescan a portion of the environment. In such instances, host device 106(1) may acquire new depth sensor data from depth sensor 724 and image sensor data from imaging sensor 726 in response to the user input.

XR application 514 included in host device 106(1) acquires environmental data for the real-world environment for use in a remote collaboration session. In various embodiments, XR application 514 may receive the depth sensor data and image sensor data and generate respective 3D depth data and 2D surface data. In such instances, XR application 514 may combine correlated 3D depth data and 2D surface data to generate an XR stream and transmit the XR stream to one or more recipients (e.g., remote devices 106, remote storage 704, etc.). In some embodiments, XR application 514 may generate an adaptable 3D representation of the real-world environment (e.g., determining coordinates corresponding to the 3D depth data and/or 2D surface data and storing the set of coordinates as a scene) corresponding to a scene of the physical space and transmit the adaptable 3D representation to one or more recipients.

In some embodiments, host device 106(1) may convert the adaptable 3D representation of the real-world environments, included in the XR stream, into geometry data that represents the scene being shared by host device 106(1). In such embodiments, host device 106(1) may convert correlated 3D depth data and 2D depth data into coordinate-based sets of vertices, edges, and textures. Host device 106(1) may then group the sets of vertices, edges, and textures into geometry data for other devices to reconstruct. In some embodiments, host device 106(1) may set an anchor point as the origin of a scene and may determine coordinate data (e.g., x-axis, y-axis, and z-axis coordinates) from the anchor point for portions of the 3D depth data and/or 2D surface data. Based on the determined coordinates, host device 106(1) may convert the 2D surface data and/or the 3D depth data into a set of vertices at specific coordinates, a set of faces comprising edges between pairs of vertices, and texture data for specific coordinates.

For example, host device 106(1) may convert determined coordinates for portions of 3D depth data included in the XR stream. Host device 106(1) may then use the coordinates to determine sets of triangles that form faces of a combined mesh. A given triangle may have vertices defined as coordinates that have the anchor point as an origin. Host device 106(1) may also convert the 2D surface data into one or more sets of textures, where a given texture corresponds to a specific face, by correlating the image data from the image sensor to the depth data. In various embodiments, remote device 106 may render the scene by generating meshes that have faces formed by the triangles included in the geometry data. Remote device 106 may then apply textures to the corresponding faces (e.g., fill a triangle with the texture that has the corresponding coordinates). Various techniques of generating the portions of a scene from geometry data is described in further detail in pending U.S. Patent Application entitled "MESH UPDATES IN AN EXTENDED REALITY ENVIRONMENT" (serial number 17/086,297) filed on 30 Oct. 2020, and which is hereby incorporated by reference in its entirety for all purposes.

In some embodiments, XR application 514 may generate the XR stream for a real-time remote collaboration session. In such instances, XR application 514 may first determine a correlation between the 3D depth data and the 2D surface data. In some implementations, the 2D surface data is clipped to match the 3D depth data, and the relative locations of the 2D surface data and the 3D depth data are correlated such that the 2D surface data may be made into texture data that can be applied to the 3D depth data. For example, XR application 514 may determine that a section of the 2D surface data shares common coordinates with a section of the 3D depth data. Based on the correlation between the 3D depth data and the 2D surface data, XR application 514 may combine the 3D depth data and the 2D surface data to generate the XR stream. Host device 106(1) may then transmit the XR stream via tunnel bridge 706 to remote devices 106 for reproduction. In some embodiments, the XR stream includes rendered assets 732, 742, which are digital reproductions of real-world asset 712 included in the real-world environment. Alternatively, remote device 106(2) may use data included in the XR stream to generate rendered asset 732 (e.g., a 3D model of real-world asset 712) in remote XR environment 730, while remote device 106(3) may use data included in the XR stream to generate rendered asset 742 (e.g., a 2D model of real-world asset 712) in remote environment 740.

In various embodiments, the host device 106(1) may continually scan and update the adaptable 3D representation of the real-world environment. In such instances, the XR application 514 may transmit live updates of the adaptable 3D representation in the XR stream by providing the updated data, which includes updated 3D depth data (e.g., mesh data based on 3D coordinate data) and/or the updated 2D surface data (e.g., texture data for corresponding meshes), to the recipients. The recipients may then update the adaptable 3D representation using the updated data provided by the host device 106(1).

For example, the host device 106(1) could initially scan the real-world environment during a first time interval. The XR application 514 could transmit to the recipients an initial XR stream of the combined initial texture data and mesh data that was generated from the initial scan. During a subsequent time interval, the host device 106(1) could perform additional scan(s) of the real-world environment. The XR application 514 could transmit to the recipients a subsequent XR stream that includes the updated texture data and mesh data generated by the additional scan(s).

In various embodiments, the host device 106(1) may perform depth scans of the real-world environment and acquire updated mesh data independent of performing surface scans of the real-world environment and acquiring updated texture data. In such instances, the XR application 514 may manage the data that the host device 106(1) includes when transmitting live updates to the recipients. For example, the sensors 620 in the host device 106(1) could continually scan the real-world environment, where the imaging sensor 726 acquires updated texture data at a first rate (e.g., one image frame every second) and the depth sensor 724 acquires updated mesh data at a second rate (L, updated 3D coordinates every 10 seconds).

In various embodiments, the XR application 514 may determine whether the newly-acquired texture data and/or the mesh data represents a significant change to the adaptable 3D representation before generating an XR stream that includes the updated texture data and updated mesh data. In some embodiments, the XR application 514 may compute one or more values to determine a difference between previous iterations of the representation of the 3D environment in order to determine whether the updated data represents a significant change. In such instances, the XR application 514 may refrain from transmitting updates to the recipients until the XR application 514 receives updated texture data and/or updated mesh data that represents a significant change to the representation of the 3D environment.

For example, the XR application 514 could compute a difference metric based on one or more characteristics of a mesh formed by the mesh data. The initial mesh data could include coordinates for vertices of an initial mesh, where the XR application 514 computes one or more indices associated with the characteristics of the mesh. Such indices may include: (i) a distance index that is associated with functions based on distances between points on multiple faces of the mesh, (ii) a volume index that is associated with a function of volumes of portions within the mesh, and/or (iii) a curvature index that is associated with a function of the two principal curvatures of the surface of the mesh. In such instances, the XR application 514 could compute differences between corresponding indices of the respective meshes (e.g., compute a difference between a volume index of the initial mesh and a volume index of the updated mesh) and may determine a single difference value that is based on the differences between the respective indices.

Additionally or alternatively, the XR application 514 may compute the difference value as a Hausdorff distance between the surfaces of the respective meshes. In such instances, the XR application 514 may compute the Hausdorff distance between one or more faces of the updated mesh and corresponding faces of the previous mesh. In some embodiments, the XR application 514 may maintain a rolling average of the Hausdorff distance between successive iterations of the mesh. In such instances, the XR application 514 may compare the current Hausdorf distance with the rolling average Hausdorff distance to determine whether the updated mesh represents a significant change relative to previous updates.

In various embodiments, the XR application 514 could compare the difference value to one or more difference thresholds, where the XR application 514 determines a significant change based on the computed difference value exceeding the difference threshold. In one example, the XR application 514 could determine that the update represents a significant change when a single difference value exceeds a predetermined difference threshold. In another example, the XR application 514 could determine that the update represents a significant change when an aggregate difference value (computed from combining two or more differences) exceeds an aggregate difference threshold.

In various embodiments, the XR application 514 may periodically determine the applicable frames from which to acquire the updated texture data and associate the updated texture data with the updated mesh data. Upon associating the updated texture data with the updated mesh data, the XR application 514 may generate XR streams from the combined data and transmit XR stream to the recipients.

Host XR environment 710 includes real-world asset 712 and XR workspace 714. In various embodiments, XR application 514 produces host XR environment 710 for presentation via a display device associated with host device 106(1). For example, XR application 514 may generate host XR environment 710 and present a portion of host XR environment 710 via a display device. In such instances, host device 106(1) may present at least a portion of real-world asset 712.

In some embodiments, XR application 514 may generate an XR workspace 714 that includes one or more augmented reality (AR) elements. Such AR elements may include one or more display panels that are associated with portions of the environment. For example, real-world asset 712 may be registered with data processing service 702 and may transmit or stream data to data processing service 702, where data processing service 702 ingests and stores the data via data intake and query system 102. When generating XR workspace 714, XR application 514 may send one or more queries to receive data values, dashboards, playbooks, and so forth, to present within XR workspace 714. Any AR elements may be included, such as panels that display the content (e.g., schemas, dashboards, cards, and/or visualizations generated from the extracted field values), directional indicators (e.g., pointers at the edge of the display device indicating the position of portions of the AR workspace relative to the position and/or orientation of imaging sensor 726). Other example AR elements include a full graphics overlay, a partial graphics overlay, text data (e.g., alerts, runbooks, playbooks, etc.), numerical data, color information, and/or icon data (e.g., a skull-and-crossbones symbol indicating that a machine that has failed), and/or one or more virtual objects.

In various embodiments, XR workspace 714 may include various collaboration tools that enable the user to interact with portions of the host XR environment 710. For example, XR workspace 714 may include graphical pointers that highlight a small portion of the host XR environment 710. Other collaboration tools may include, for example, a color palette, a map of host XR environment 710, a set of highlight pins, and so forth. In some embodiments, XR application 514 may provide a specific set of AR elements based on the user of host device 106(1). For example, a user may be associated with a user identifier, role identifier and/or other criteria that correspond to a specific XR workspace 714. In such instances, XR application 514 may generate XR workspace 714 based on the specific criteria associated with the host user.

Remote device(s) 106 (e.g., 106(2), 106(3), etc.) functions substantially the same as client device 106, except as further described herein. Examples of remote device 106 may include, without limitation, a smartphone, a tablet computer, a handheld computer, a wearable device, an XR console, a laptop computer, a desktop computer, a server, a portable media player, a gaming device, and so forth. In some embodiments, host device 106(1) executes one or more applications that present, compute, or generate data based on data received from data processing service 702. In some embodiments, host device 106(1) may include, without limitation, smartphones, tablet computers, handheld computers, wearable devices, laptop computers, desktop computers, servers, portable media players, gaming devices, Apple TV® devices, and so forth. It is noted that "remote" in this context means located at a different location, relative to host device 106(1). In various embodiments, what constitutes "remote" may differ based on the use case, but no minimum or maximum distance is specified here or required. There may be implementations in which remote device 106 is in the next room from the host device, or implementations where the remote device is thousands of miles away. Remote device 106 also may be an autonomously operated or controlled device, or may be a remotely controlled device such as a drone or a semi-autonomous vehicular device, e.g., a rover.

In various embodiments, remote device 106 may generate a digital reproduction of a portion of the real-world environment based on data included in the XR stream provided by host device 106(1). In some embodiments, remote device 106 may receive the XR stream as a set of serialized chunks that are below a specific data size (e.g., below 1 MB). In such instances, remote device 106 may combine the set of serialized chunks into the XR stream and retrieve data from the XR stream.

Remote device 106(2) executes an instance of XR application 514 to generate remote XR environment 730. In various embodiments, XR application 514 may extract the 3D depth data and the 2D surface data included in the XR stream and may generate an adaptable 3D representation of the real-world environment. The adaptable 3D representation corresponds to the scene of the physical space and may include rendered asset 732, which is a digital representation of real-world assets 712 that is included in the real-world environment. XR application 514 may also generate an XR workspace 734 within remote XR environment 730. In some embodiments, remote device 106(2) may also render one or more portions of a background that correspond to areas proximate to real-world asset 712 (e.g., the texture of the floor surrounding real-world asset 712).

While in some embodiments, XR workspace 734 may be the same as XR workspace 714, in other embodiments, XR workspace 734 may be different. For example, in some embodiments, XR workspace 734 may include different AR elements than AR elements included in the XR workspace 714 included in the host XR environment 710. For example, a technician may operate host device 106(1), where XR workspace 714 includes a first set of display panels, while an expert may operate remote device 106(2), where XR workspace 734 includes a second set of display panels. XR workspaces 714, 734 may differ based on a number of different factors, for example, XR workspaces 714, 734 may be adjusted based on a type of remote device 106(2), or based on a user or a profile of a user that operates the various devices 106(1) and 106. For example, a local technician operating host device 106(1) may not have sufficient access to see certain XR environment information, particularly in high-confidentiality areas such as hospitals or other medial settings, so those informational elements may be blocked or otherwise not shown in XR workspace 714, but may be visible to a higher-privileged user or user role of a user working in XR workspace 734 in remote device 106.

In other implementations, the system may be designed to simplify the information displayed in XR workspace 714 to more clearly illustrate the instructions and information given to the user of host device 106(1). In some embodiments, such access control and XR environment decisions may be made by data processing service 702. In other embodiments, data processing service 702 may send the same environments to host devices 106(1) and 106, and the respective XR applications 514 of host device 106(1) and 106 may perform some processing to determine what elements to display in XR workspaces 714 and 734, respectively. In still other embodiments, it may be a combination of data processing serviced 702 and XR applications 514, working in concert at various times, to determine the specific layouts and elements of XR workspaces 714 and 734. In various embodiments, remote device 106(2) may generate remote XR environment 730 in real time.

In various embodiments, XR application 514 may provide controls that enable the remote user to navigate remote XR environment 730 independent of the position of host device 106(1). In various embodiments, host device 106(1) may initially scan a portion of the real-world environment that includes real-world asset 712. Host device 106(1) may provide the 3D depth data and 2D surface data in the XR stream, where XR application 514 generates a scene that is a digital reproduction of the scanned portion. Upon generating the scene, XR application 514 may respond to navigation inputs (e.g., physically moving remote device 106(2), applying navigation inputs) by changing the viewing position of remote device 106(2) within the remote XR environment 730 and presenting a different portion of the scene.

In various embodiments, XR application 514 in remote device 106 may receive data from the XR stream based on host device 106(1) rescanning at least a portion of the real-world environment. In such instances, XR application 514 may update the remote XR environment 730 by re-generating the corresponding portion of the digital representation of the updated portion while maintaining the digital representation of the non-updated portions. In some embodiments, XR application 514 may first compare the differences between the existing scene and the updated 2D surface data and 3D depth data and may only regenerate the scene upon the determining that the changes are above a threshold level.

In some embodiments, XR application 514 may generate rendered asset 732 by combining portions of the 3D depth data and 2D surface data included in the XR stream. For example, XR application 514 may apply a portion of the 2D surface data as a texture to a corresponding portion of the 3D depth data. In some embodiments, XR application 514 may separate rendered asset 732 from other portions of the scene. Alternatively, remote device 106(2) may combine the 3D depth data and 2D surface data included in the XR stream. In such instances, XR application 514 may generate the scene without specifically identifying rendered asset 732.

XR workspace 734 includes one or more augmented reality elements, such as dashboards and other interaction and/or collaboration tools. In various embodiments, when generating XR workspace 734, XR application 514 included in remote device 106(2) may send one or more queries (via tunnel bridge 706) to receive data values, dashboards, playbooks, and so forth, to present within XR workspace 734. Additionally or alternatively, XR workspace 734 may include various collaboration tools that enable the remote user to interact with portions of the remote XR environment 730. In such instances, XR application 514 may transmit data to data processing service 702 and/or host device 106(1) based on the identified interaction.

In one example, the remote user may use the color palette interaction tool to change the color of a specific portion of rendered asset 732 (e.g., changing the color of a non-functioning fan). XR application 514 may send data to host device 106(1) that causes the host XR workspace 714 to add a highlighted region over the corresponding portion of real-world asset 712. In another example, XR application 514 may receive an input that requests updated data for a display panel included in XR workspace 734. XR application 514 may then respond to the data request by sending a query to data processing service 702 that processes the data query via data intake and query service 108.

In some embodiments, remote device 106 may generate an environment for remote collaboration other than an extended reality environment. For example, a remote user may use a web browser to view a two-dimensional reproduction of the real-world environment. In such instances, remote device 106(3) may execute a different application (e.g., mobile operations application, a web browser, a VR application, etc.) to view a non-XR environment. In some embodiments, remote device 106(3) may generate a non-XR remote environment 740 while remote device 106(2) generates remote XR environment 730. In some such environments, in which remote device 106(3) is a non-XR environment, the XR environment that would have been displayed may be translated into a non-XR environment to the extent possible, e.g., multimedia files may be displayed as popups, text may be displayed as tooltips, runbooks may be executed on mouse button click, or any combination thereof.

In various embodiments, mobile operations application 516 may enable a different remote user to navigate and interact with remote environment 740 independent of host device 106(1) and/or remote device 106(2). For example, after mobile operations application 516 generates remote environment 740, mobile operations application 516 may provide navigational controls that enable the remote user to change the position of remote device 106(3) within remote environment 740 independent of the position of host device 106(1).

Mobile operations application 516 generates remote environment 740, where remote environment 740 includes rendered asset 742 and remote workspace 744. In some embodiments, rendered asset 742 may have a different format than rendered asset 732. For example, rendered asset 732 may be a 3D mesh representation of real-world asset 712, while rendered asset 742 may be a 2D photograph or icon of real-world asset 712, or a flattened version of the 3D mesh representation of real-world asset 712. Mobile operations application 516 also generates remote workspace 744. In some embodiments, remote workspace 744 includes display panels and/or interaction tools within an adaptable 3D representation of the real-world environment. Alternatively, remote workspace 744 may include display panels and/or interaction tools that are positioned outside the adaptable representation. For example, remote environment 740 may present the adaptable representation of the real-world environment in a first window, and present one or more display panels, displaying data associated with the real-world asset, in a second window.

Data processing service 702 processes data associated with a remote collaboration session. In various embodiments, data processing asset 802 includes a workspace service 708 that manages actions performed by host device 106(1) and/or remote device(s) 106 in relation to the remote collaboration session. Data intake and query system 102 manages the retrieval and transmission of data values associated with one or more real-world assets 712 included in the real-world environment.

In various embodiments, data processing service 702 receives data from one or more real-world assets 712. In some embodiments, data processing service 702 may be a data ingestion application, such as a data stream processor (DSP) that ingests sensor data transmitted by one or more real-world assets 712 in real time. In such instances, data processing service 702 may generate a processed data set and transmit the processed data set to data intake and query system 102 for storage in one or more data stores. Additionally or alternatively, data processing service 702 responds to data requests by retrieving field values via the data intake and query system 102, where the field values represent the values of one or more metrics associated with a particular real-world asset 712. In an implementation, the field values are extracted from fields that are defined post-ingestion (e.g., at search time), as has been previously described (e.g., with a late-binding schema). The field values transmitted by data intake and query system 102 may be in any technically-feasible format.

In various embodiments, data intake and query system 102 generates a dashboard that includes one or more visualizations of the underlying textual and/or numerical information based on the retrieved field values. In various embodiments, the dashboard may present in one or more visualizations included in the dashboard received from data intake and query system 102. One or more workspaces 714, 734, 744 include one or more display panels that present the visualizations included in the dashboard. In some embodiments, the dashboard may also include a portion of the field values as a data set. In such instances, XR application 514 and/or mobile operations application 516 may generate visualizations based on the field values included in the data set.

Workspace service 708 manages actions performed by host device 106(1) and/or remote device(s) 106 in relation to the remote collaboration session. In various embodiments, one or more remote devices 106 may register or subscribe to receive the XR stream generated by host device 106(1) for a given remote collaboration session. In such instances, workspace service 708 may cause data chunks corresponding to the XR stream to be transmitted to subscribed recipients. Additionally or alternatively, workspace service 708 may cause the XR stream and/or other interaction data (e.g., recorded audio, actions performed by host device 106(1) and/or remote device(s) 106) to be stored in remote storage 704. In some embodiments, workspace service 708 may send notifications to a target recipient (e.g., remote device 106(2)) to join a remote collaboration session.

Remote storage 704 includes one or more data stores that store information associated with a remote collaboration session. In various embodiments, host device 106(1) may transmit the XR stream to remote storage 704, where remote storage stores the XR stream as a combination of 2D surface data and 3D depth data. In such instances, the stored 2D surface data and 3D depth data is much smaller in data size than an equivalent high-definition video clip. Remote storage 704 may also store other data associated with the XR stream. For example, remote storage 704 may receive and store one or more activity logs from host device 106(1) and/or remote devices 106. In some embodiments, remote storage 704 may store an initial set of data chunks and subsequent sets of update chunks. In such instances, subsequent update data chunks may overwrite previous update chunks.

In some embodiments, a device may subsequently download data from remote storage 704 and may replay the remote collaboration session. In such instances, the device may navigate the adaptable 3D representation of the real-world environment, as well as view actions performed by participants, e.g., as recorded in the activity log. For example, a quality assurance technician may replay the remote collaboration session to determine how experts explained an issue during a recorded remote collaboration session by viewing how an expert, e.g., a user operating remote device 106(2), identified an issue and used the interaction tools to notify other participants during the recorded remote collaboration session.

In some embodiments, the XR workspace 734 may be stored as part of the remote collaboration session. In other embodiments, when the remote collaboration session is played back, the system may contact data processing service 702 and re-generate the XR workspace 734 as part of the playback. In such implementations, XR workspace 734 may show the data, e.g., data from dashboards, as it appeared when the remote collaboration session was created. In other implementations, XR workspace 734 may show a same or similar XR workspace 734 as when the remote collaboration session was created, but updated with all or partial new data from the time that the remote collaboration session is played back. These features can be toggled or changed when the remote collaboration session is played back, depending on the use case, for example, some use cases may want to see the XR workspace 734 data the same as when the session was created, e.g., for security incidents or other instances where the session is to be replayed exactly or stored for audit purposes. In other use cases, the remote collaboration session may show updated data, such as when an unskilled technician wants to view the session with updated data, e.g., to check on the status of an industrial IoT (Internet of Things) environment, such as a factory floor, assembly line, or any other connected workspace, e.g., an airport security area.

Tunnel bridge 706 is a device that establishes communications with one or more devices included in the networked computer environment 700. For example, tunnel bridge 706 may establish one or more WebSocket connections with host device 106(1), remote devices 106, data processing service 702, and/or remote storage 704. In some embodiments, tunnel bridge 706 may be a trusted service that establishes trust with one or more devices in order to establish secure WebSocket connections with such devices. In some embodiments, tunnel bridge 706 may perform authentication operations with other devices in order to establish trust, and may then establish secure communications channels with the other devices, where tunnel bridge 706 and/or other devices and transmit secure communications using the secure communications channels.

In some embodiments, tunnel bridge 706 enables E2EE communications between two separate devices by forwarding one or more encrypted data packets without fully decrypting the encrypted data packet. For example, tunnel bridge 706 may receive an encrypted data packet that was encrypted and signed using multiple encryption keys. The trusted tunnel bridge 706 may determine whether the encrypted data packet was validly signed with one of the encryption keys without decrypting the encrypted data packet.

Figure 8:
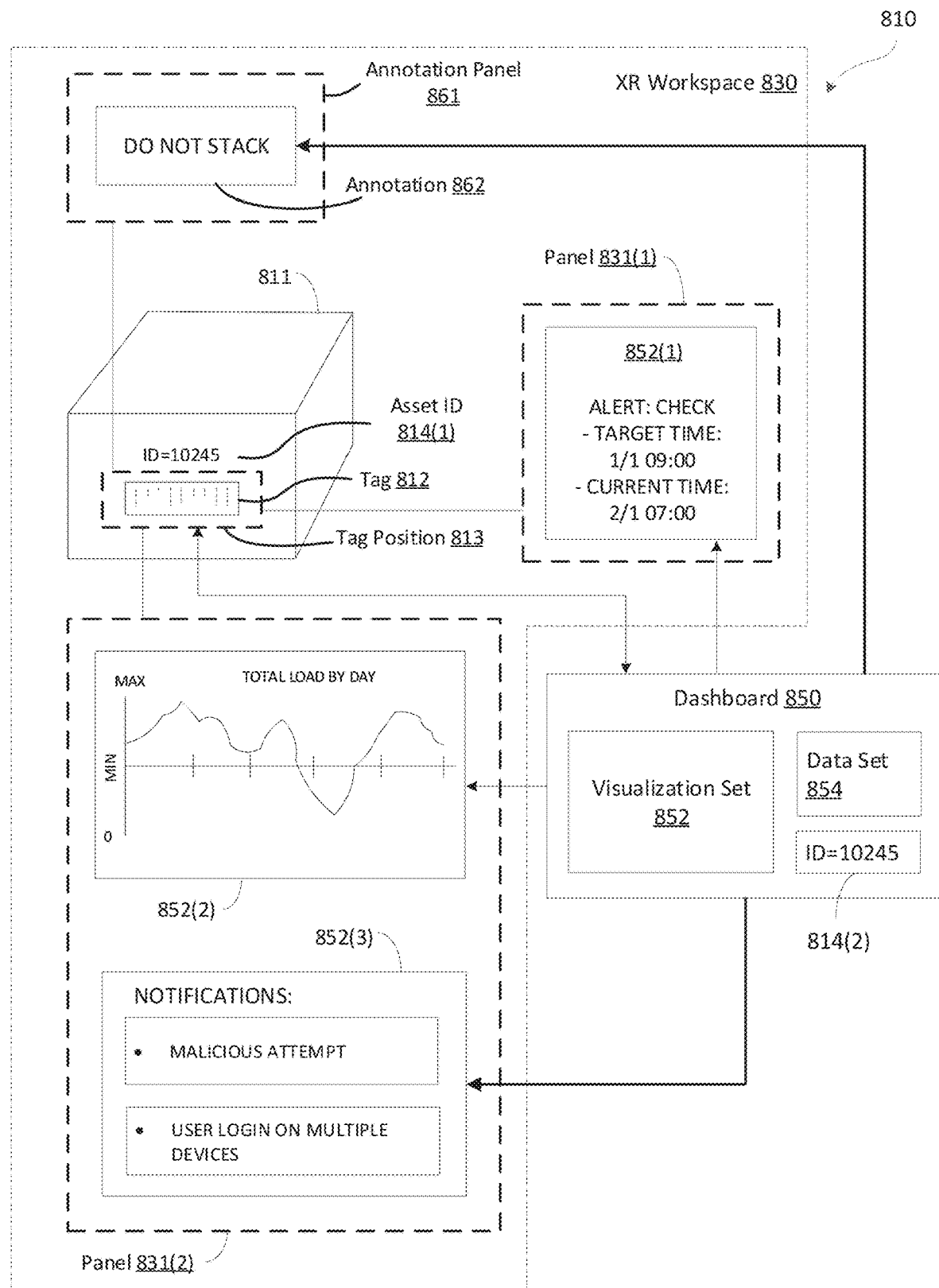
FIG. 8 illustrates an example extended reality environment that presents information using the networked computer environment, in accordance with example implementations.

FIG. 8 illustrates an example extended reality environment that presents information using the networked computer environment, in accordance with example implementations. As shown, remote collaboration system 810 includes asset 811, XR workspace 830, and dashboard 850. Asset 811 includes tag 812 that includes unique asset ID 814 at tag position 813. XR workspace 830 includes a plurality of panels 831 (e.g., 831-1, 831-2) and/or annotation panel(s) 861. Dashboard 850 includes visualization set 852, data set 854, and a copy of unique asset ID 814-2.

In various embodiments, XR application 514 may identify a given asset 811 that has been registered with data processing service 702, where data intake and query service 108 ingests and stores sets of data values associated with the asset (e.g., performance metrics associated with the operation of asset 811). In some embodiments, XR application 514 generates XR workspace 830 within a given environment (e.g., host XR environment 710, remote XR environment 730, etc.) and presents various images in one or more panels 831 within XR workspace 830 on a display device of host device 106(1) and/or remote device 106.

Each of the panels 831, 861 is positioned within XR workspace 830 relative to tag position 813. In some embodiments, XR application 514 may scan tag 812 in order to receive XR workspace 830 and/or dashboard 850 from data intake and query system 102. In other implementations, XR application 514 may respond to scanning tag 812 by requesting one or more field values associated with unique asset ID 814 encoded in the tag 812 from data intake and query system 102. In such instances, XR application 514 responds to receiving the field values by generating XR workspace 830 and/or dashboard 850 from the one or more received field values. Dashboard 850 includes visualization set 852 (e.g., 852-1, 852-2, etc.) and/or data set 854. Dashboard 850 provides one or more visualizations included in visualization set 852 to present within one or more panels 831 of XR workspace 830.

Extended reality (XR) workspace 830 includes one or more portions of graphics overlays (e.g., panels 831 and/or annotation panel 861) and/or indicators within the extended reality environment. In various embodiments, XR workspace 830 may include a full graphics overlay, or a partial graphics overlay. Additionally or alternatively, portions of XR workspace 830 may include text data, numerical data, color information, and/or icon data (e.g., a skull-and-crossbones symbol indicating that a machine has failed). For example, a portion of an overlay within XR workspace 830 may include a highlighted or other visually distinctive portion, signifying information of particular interest to the user.

In some embodiments, the field values provided by data intake and query system 102 may include only the underlying textual and/or numerical information. In such instances, XR application 514 may generate graphical overlays locally based on the underlying textual and/or numerical information. In various embodiments, the one or more overlays within XR workspace 830 may be static, or may be dynamically updated. For example, panel 831-1 may include visualization 852-2 that illustrates a total data load in relation to the operation of asset 811. In this instance, XR application 514 may send multiple requests to data intake and query system 102 while viewing XR workspace 830 in order to receive updated field values. XR application 514 may dynamically update visualization 852-2 based on the updated field values received from data intake and query system 102. In some implementations, one or more overlays may include interactive hooks to allow an operator of the system to interact with the one or more overlays.

Although various embodiments disclosed herein are described in conjunction with extended-reality techniques (e.g., generating XR overlays), each extended-reality technique also may be implemented in a non-XR environment. Further, specific XR techniques (e.g., virtual-reality techniques, augmented-reality techniques, etc.) disclosed herein also may be implemented in other environments. For example, for clarity of explanation, various embodiments disclosed herein are described in conjunction with AR overlays (e.g., field values, images, dashboards, cards, etc.). However, each of these embodiments may also be implemented by generating such overlays in a VR environment. Accordingly, the term extended reality (XR) may be used to refer to techniques that can be performed in an AR environment, a VR environment, and/or any combination thereof.

In various embodiments, XR application 514 superimposes XR workspace 830 onto the image(s) acquired via imaging sensor 726. For example, one or more panels 831-1, 831-2 and/or annotation panel 861 may be overlaid at positions relative to tag position 813 corresponding to tag 812, such as next to tag position 813 and/or in front of tag position 813. XR application 514 causes the images superimposed with XR workspace 830 to be presented on a display device.

In some embodiments, XR application 514 may cause XR workspace 830 to be presented on a display device without presenting the acquired image. In general, XR application 514 superimposes portions of XR workspace 830 based on any of one or more determined dimensions and/or positions of asset 811, the known size of tag 812, the three-dimensional location and/or orientation of tag position 813, and the detected plane of tag position 813. In some embodiments, XR application 514 places portions of XR workspace 830 over portions of the adaptable 3D environment. For example, XR application 514 may superimpose portions of XR workspace 830 over portions of rendered asset 732.

In some embodiments, XR application 514 may receive additional information from data intake and query system 102 and may present the additional information on a display device. This additional information may be in any technically-feasible format. For example, data intake and query system 102 may transmit content (e.g., various schemas, dashboards, cards, playbooks, runbooks, and/or visualizations) to XR application 514. The contents include data, including real-time data (e.g., near real-time data) associated with asset 811 retrieved by data intake and query system 102 based on unique asset ID 814. XR application 514 may then display the content in conjunction with the real-world asset 811 using XR workspace 830.

For example, XR application 514 may request data relating to asset 811 by generating a data request that includes unique asset ID 814-1 and sending the data request to data intake and query system 102. XR application 514 may then receive dashboard 850 from data intake and query system 102 that includes data set 854, which includes one or more field values retrieved by data intake and query system 102 in response to the data request. In some embodiments, dashboard 850 may include various insights, predictions, and/or annotations associated with asset 811. For example, data intake and query system 102 may employ various machine-learning (ML) algorithms to generate one or more predictions associated with field values included in data set 854. Additionally or alternatively, dashboard 850 may include one or more annotations 862 provided by one or more users in relation to asset 811. Data intake and query system 102 may associate the one or more annotations 862 to asset 811 and store the one or more annotations 862. Data intake and query system 102 may then include the one or more annotations 862 as a portion of data set 854.

In various embodiments, dashboard 850 also includes visualization set 852 that includes one or more visualizations relating to portions of data set 854. In some embodiments, dashboard 850 may include visualizations associated with asset ID 814-2 that are presented when the asset ID 814-2 is provided as an input into the dashboard 850. In such instances, dashboard 850 may automatically use asset ID 814-2 as an input (e.g., a form input into a schema) to generate one or more visualizations included in visualization set 852. In various embodiments, each visualization corresponds to applicable portions of data set 854. For example, a portion of data set 854 that corresponds to field values for a specified time range may have a corresponding timeline graph visualization. Similarly, a set of notification messages included in data set 854 may have a corresponding set of notification visualizations.

In some embodiments, visualization set 852 includes one or more annotations 862 previously generated by one or more users. For example, by pointing imaging sensor 726 at tag 812, XR application 514 obtains unique asset ID 814-1 of "10245" from tag 812, and sends a request to data intake and query system 102 that includes unique asset ID 814-1. Host device 106(1) and/or remote device 106 may receive dashboard 850 that includes visualizations 852-1, 852-2, 852-3 based on field values associated with asset 811 for a specific time period. Host device 106(1) and/or remote device 106 may also receive the corresponding XR workspace 830. XR workspace 830 associated with asset 811 may include multiple panels 831-1, 831-2 and/or annotation panel(s) 861 positioned relative to tag position 813. XR application 514 then presents XR workspace 830 via a display device, where panels 831, 861 of XR workspace 830 include the visualizations included in visualization set 852.

In various embodiments, after generating XR workspace 830, along with any visualizations 852 and/or annotations 862 included in panels 831, 861, onto the image(s) acquired via imaging sensor 726, XR application 514 may store the enhanced image in an enhanced image data store included in a storage and/or in system memory. In some embodiments, the enhanced image data store may be stored within a database. In some embodiments, XR application 514 generates and populates XR workspace 830 onto a VR scene rather than onto an image acquired from imaging sensor 726. In such instances, the images stored in the enhanced image data store represent VR images augmented with AR overlays, rather than acquired images augmented with AR overlays.

FIGS. 9A-F are example user interfaces for a host user initiating a remote collaboration session via host device 106(1), in accordance with example implementations. In general, host device 106(1) scans a physical space within a real-world environment. XR application 514 receives 2D surface data and 3D depth data of the physical space and generates an XR stream that host device 106(1) transmits to one or more recipients. In various embodiments, host device 106(1) may receive a selection of one or more recipients that are to participate with host device 106(1) in a remote collaboration session. In such instances, the selected recipients each receive the XR stream produced by host device 106(1). During setup of the remote collaboration session, XR application 514 generates various views 900, 910, 920, 930, 940, 950 on host device 106(1).

Figure 9B:
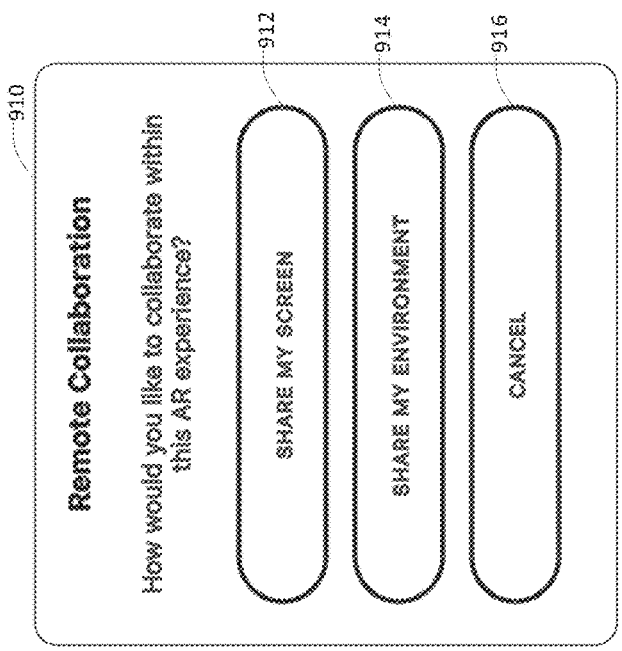
FIG. 9B illustrates a menu with selectable icons to initiate a remote collaboration, in accordance with example implementations.
Figure 9A:
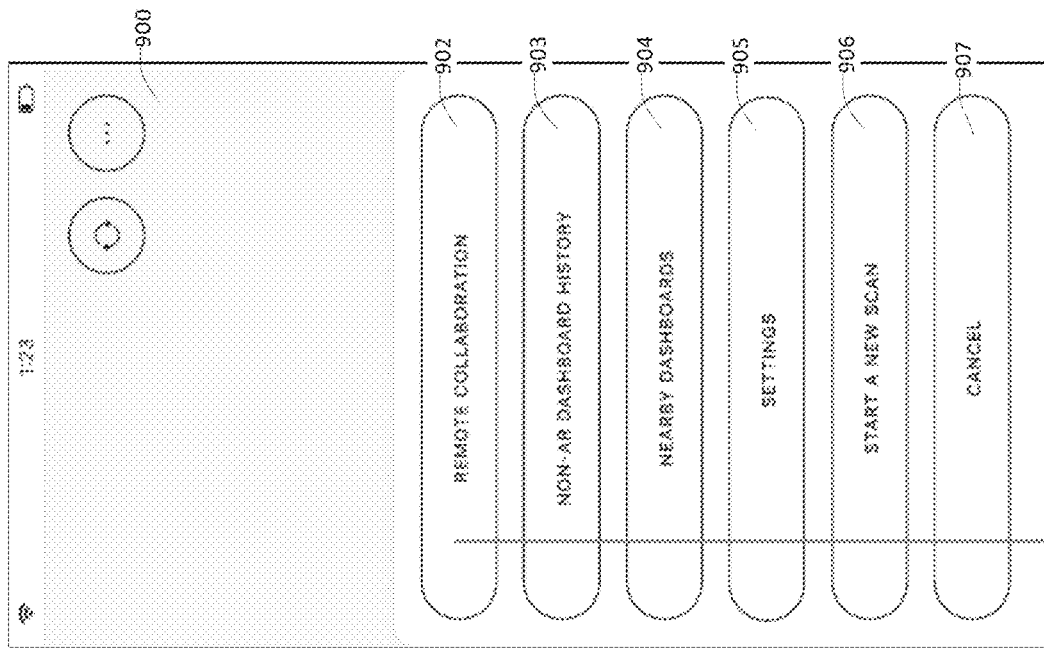
FIG. 9A illustrates a menu with selectable icons to conduct various operations associated with the real-world environment and/or data processing service, in accordance with example implementations.

As shown in FIG. 9A, view 900 presents a menu with selectable icons to conduct various operations associated with the real-world environment and/or data processing service 702. Such icons include remote collaboration icon 902, non-AR dashboard history icon 903, nearby dashboards icon 904, settings icon 905, start a new scan icon 906, and cancel icon 907. In various embodiments, XR application 514 may present view 900 to provide a host user with options to scan a physical space within the real-world environment (e.g., selecting remote collaboration icon 902, settings icon 905, or start a new scan icon 906) and/or perform various operations associated with dashboards provided by data processing service 702 (e.g., selecting non-AR dashboard history icon 903 or nearby dashboards icon 904).

In various embodiments, upon receiving a user input corresponding to a user selection of remote collaboration icon 902, XR application 514 may respond by presenting view 910. As shown in FIG. 9B, view 910 illustrates a menu with selectable icons to initiate a remote collaboration. Such icons include a share my screen icon 912, share my environment icon 914, and cancel icon 916. In some embodiments, host device 106(1) may respond to a selection of share my screen icon 912 by initiating a remote collaboration session by sharing the screen of host device 106(1).

In various embodiments, host device 106(1) may respond to a selection of share my environment icon 914 by determining whether host device 106(1) has recently scanned a physical space (e.g., performed a scan in response to a selection of the start a new scan icon 906). In such instances, host device 106(1) may prepare the recent scan for sharing by generating an XR stream that includes 2D surface data and 3D depth data from the recent scan. Alternatively, when host device 106(1) determines that host device 106(1) has not performed a recent scan, XR application 514 proceeds by presenting view 920.

Although not required in order to enable remote collaboration, in some embodiments, the host device 106(1) may provide prompts to the user to scan more of the physical space, to enable the remote device to view different areas of the physical space at the remote location. For example, as shown in FIG. 9C, XR application 514 presents view 920 to scan a physical space within a real-world environment. View 920 includes prompt 922, scanning region 924, and scanned region(s) 926 (e.g., 926-1, 926-2, etc.). In some embodiments, XR application 514 may provide prompt 922 that instructs a host user to scan a particular asset or collection of assets within the physical space (e.g., scanning a particular server device). Alternatively, XR application 514 may provide prompt 922 that instructs the host user to scan a region of the real-world environment (M, one or more portions of an open space, building, room, etc.).

In various embodiments, XR application 514 may present view 920 while host device 106(1) scans a physical space. For example, XR application 514 may present scanning region 924 that corresponds to a specific region or a specific object within the physical space. When XR application 514 determines that a portion of the physical space has been successfully scanned, XR application 514 presents one or more scanned regions 926. In some embodiments, XR application 514 may lock the scanned region and store 3D texture data and/or 2D surface data for the scanned region while host device 106(1) scans other portions of the physical space. In some embodiments, the host user may change the position of host device 106(1) in order to scan other regions of the physical space. Alternatively, XR application 514 may expand a given scanned region as host device 106(1) changes position (ea, the host user moves and/or rotates host device 106(1)).

As shown in FIG. 9D, view 930 includes prompt 932, scanning region 924, scanned regions 926, and invitation icon 934. As XR application 514 determines that a set of scanned regions 926 have been successfully scanned, XR application 514 may update prompt to specify that a sufficient amount of the physical space has been scanned to share in a remote collaboration session. In some embodiments, prompt 932 may also specify that the scanned region may be updated during the remote collaboration session. When XR application determines that enough of the physical space has been successfully scanned, XR application 514 may provide invitation icon 934 to invite others to the remote collaboration session.

As shown in FIG. 9E, view 940 displays an invitation menu for potential participants in the remote collaboration session. View 940 includes invitation menu 942, selected participants 944 (e.g., 944-1, 944-2, etc.), and invitation icon 946. Once the host user selects one or more participants for the remote collaboration session, the host user selects invitation icon 946. XR application 514 responds to the selection of the invitation icon by retrieving address information for each of the selected participants 944 and sending invitations to each of the selected participants.

As each selected participant accepts the invitation, host device 106(1) may receive an indication of a remote device 106 used by the selected participant. In some embodiments, XR application 514 may identify each remote device 106 as an intended recipient of the XR stream and may send separate messages to each respective recipient. Additionally or alternatively, each selected participant may register with workspace service 708 included in data processing service 702. In such instances, data processing service 702 may direct the XR stream to each intended recipient during the remote collaboration session.

As shown in FIG. 9F, view 950 includes host XR environment portion 952, asset 954, and record icon 956. Tn various embodiments, XR application 514 included in host device 106(1) presents view 950 during a remote collaboration with one or more remote devices 106.

Host XR environment portion 952 corresponds to a view of host XR environment 710 based on a position of host device 106(1) relative to the physical space. In some embodiments, host XR environment portion 952 includes one or more assets 954. In such instances, XR application 514 may highlight asset 954 within host XR environment portion 952 may identify asset 954. Additionally or alternatively, XR application 514 may display one or more display panels, including various dashboards, playbooks, and so forth, within host XR environment portion 952.

In various embodiments, host device 106(1) may change position within the real-world environment. In such instances, XR application 514 may update host XR environment portion 952 to reflect the position change of host device 106(1). Additionally or alternatively, the position change of host device 106(1) does not modify the view seen by the remote participants via the one or more remote devices 106.

In some embodiments, XR application 514 may present record icon 956. In such instances, XR application 514 may respond to a selection of record icon 956 by recording the remote collaboration session. Recording the remote collaboration session may include storing the XR stream, an activity log of actions performed by host device 106(1) and/or the one or more remote devices 106, and/or AR elements displayed by host device 106(1) and/or the one or more remote devices 106 within the respective host XR environment 710, or remote XR environment 730, and/or remote environment 740. In some embodiments, XR application 514 may also store an audio recording from each respective device included in the remote collaboration session, or other additional annotation or information, as is relevant to the particular use case.

FIGS. 10A-D are example user interfaces for a remote user joining a remote collaboration session via remote device 106, in accordance with example implementations. In general, remote device 106 joins a remote collaboration session, where host device 106(1) shares a screen or an environment with remote device 106. Remote device 106 presents views 1000, 1010, 1020, 1030 to enable the remote user to join the remote session as a participant and view portions of a physical space scanned by host device 106(1). In various embodiments, remote device 106 may navigate a representation of the physical space independent of the host device 106(1).

Figure 10B:
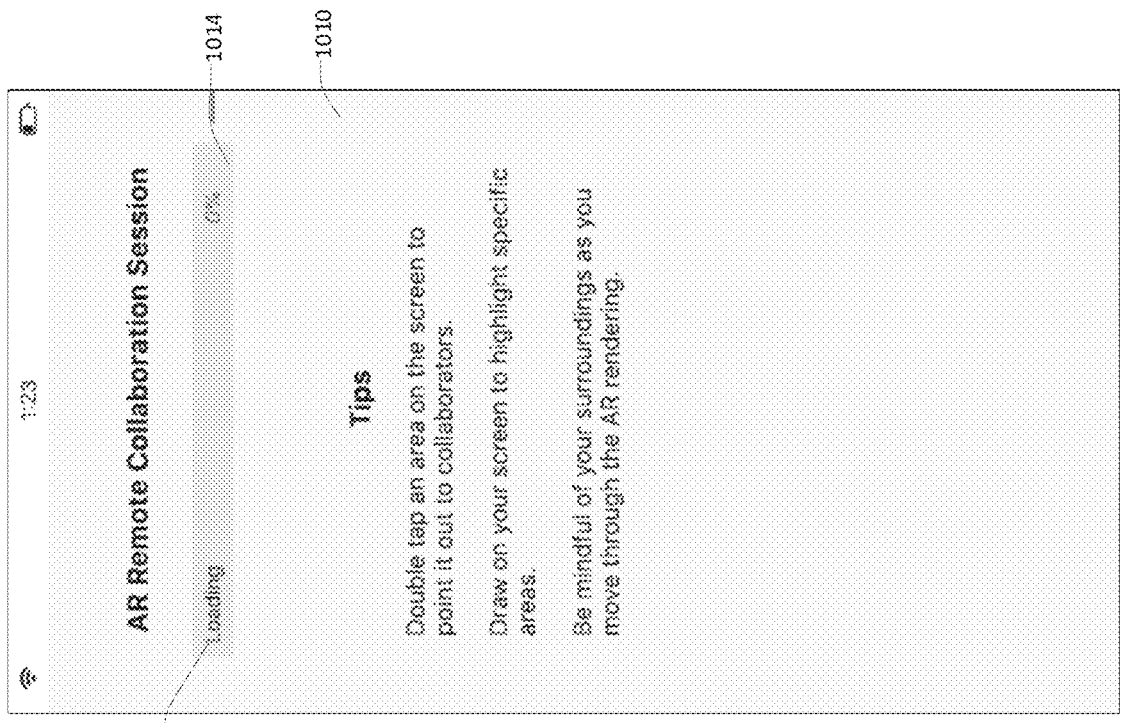
FIG. 10B illustrates a splash page describing the remote collaboration session, in accordance with example implementations.
Figure 10A:
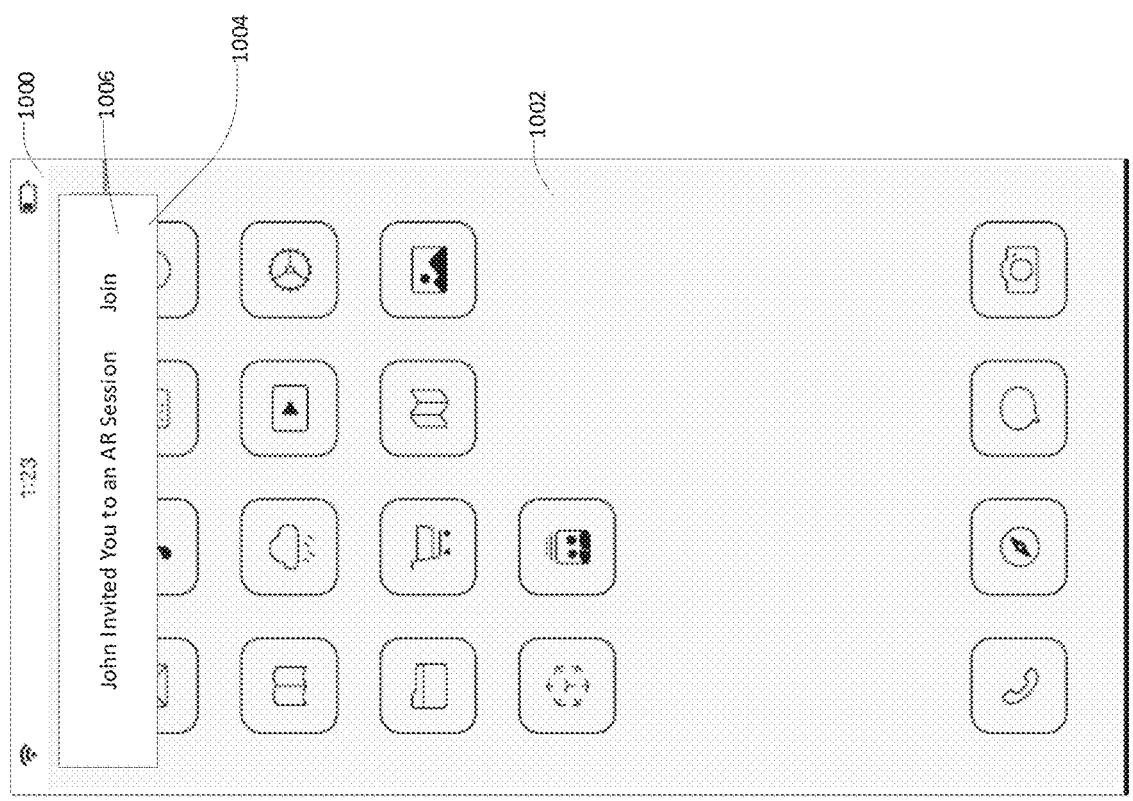
FIG. 10A illustrates a menu with selectable icons to initiate a remote collaboration, in accordance with example implementations.

As shown in FIG. 10A, view 1000 presents a prompt to join a remote session. View 1000 includes home screen 1002, prompt 1004, and link 1006. In various embodiments, remote device 106 may receive an invitation to join a remote collaboration session. In such instances, remote device 106 may present prompt 1004 indicating that the remote user has been invited to join a remote collaboration session as a participant. In such instances, prompt 1004 may include link 1006 to join the remote collaboration session. In some embodiments, link 1006 may cause remote device 106 to register with workspace service 708 as a participant for the specific remote collaboration session. Upon registration, workspace service 708 may direct the XR stream for the remote collaboration session, as generated by host device 106(1), to remote device 106.

As shown in FIG. 10B, view 1010 presents a splash page describing the remote collaboration session. View 1010 includes loading progress bar 1012 and instructional panel 1014. In operation, XR application 514 included in remote device 106(2) receives the XR stream and generates remote XR environment 730 that includes an adaptable 3D representation of the physical space. In some embodiments, XR application 514 may present view 1010 while initially generating the remote XR environment 730 by rendering the adaptable 3D representation.

View 1010 presents a progress bar based on XR application generating remote XR environment 730. In some embodiments, generating remote XR environment 730 includes rendering the adaptable 3D representation of the physical space and separately transmitting requests for data associated with one or more assets included in the adaptable 3D representation (asset 954). Additionally or alternatively, view 1010 may include instructional panel 1014. Instructional panel 1014 provides information about the remote collaboration session. For example, instructional panel 1014 may instruct the remote user to be mindful of the surroundings of at the remote location when moving remote device 106(2). Instructional panel 1014 may also include instructions about using one or more collaboration tools (e.g., graphical pointers, pins, highlighters, etc.) that the remote user can implement to navigate within remote XR environment 730 and/or interact with the rendered asset within remote XR environment 730.

Figure 10D:
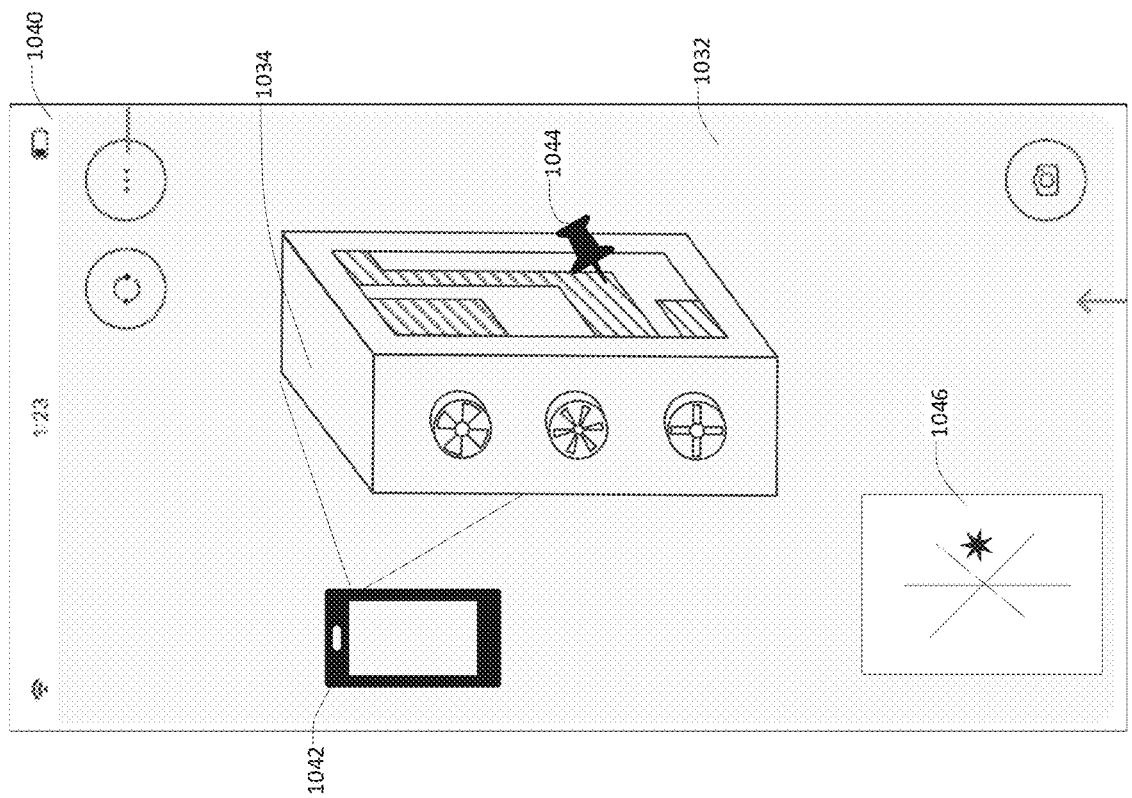
FIG. 10D illustrates a portion of remote XR environment portion at a later time during the remote collaboration session, in accordance with example implementations.
Figure 10C:
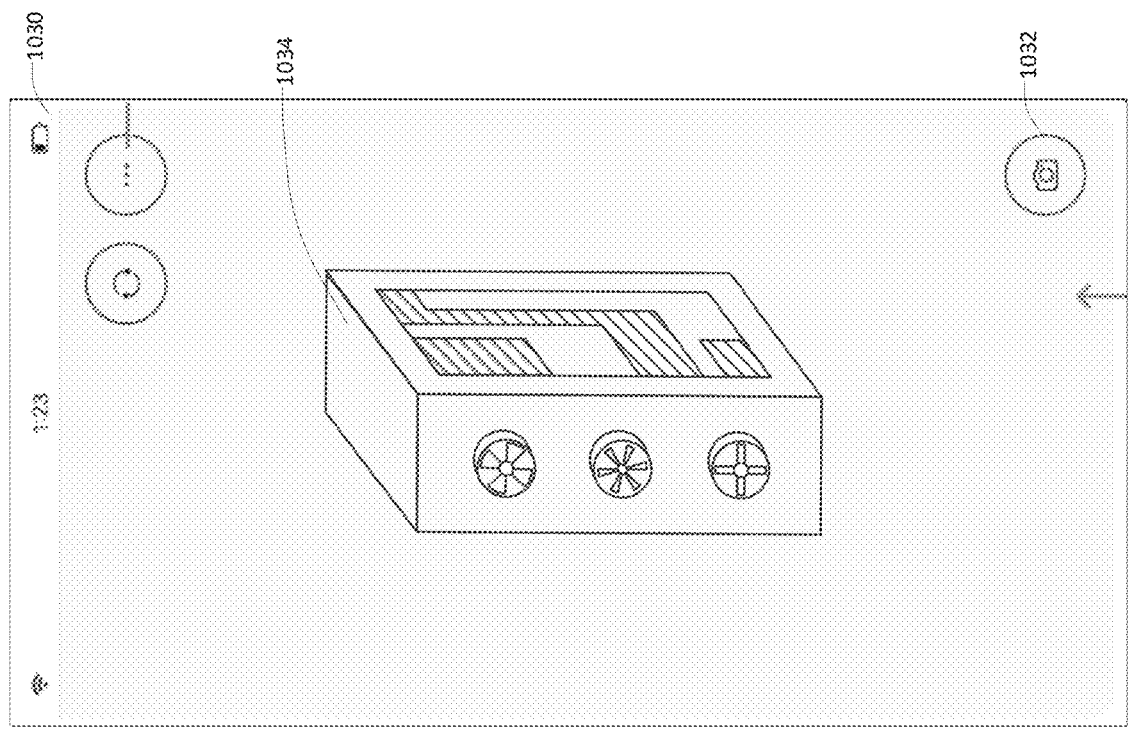
FIG. 10C illustrates a portion of the remote XR environment portion, in accordance with example implementations.

As shown in FIG. 10C, view 1020 presents remote XR environment portion 1032. View 1020 includes remote XR environment portion 952 and rendered asset 1034. Remote XR environment portion 1032 corresponds to a view of remote XR environment 730 based on a position of remote device 106(2). Remote XR environment 730 renders the XR stream, corresponding to the scene scanned by host device 106(1), as an adaptable 3D representation of the physical space.

In some embodiments, remote device 106(2) may determine an anchor position for the scene and may render portions of the scene relative to the anchor position. In such instances, XR application 514 included in remote device 106(2) may determine the position of remote device 106(2) relative to the anchor position in order to determine the position of remote device 106(2) relative to portions of the scene. Upon determining the position of remote device 106(2) relative to the portions of the scene, XR application 514 may present remote XR environment portion 1032 to reflect the position of remote device 106(2). In some embodiments, an XR representation of remote device 106(2) may appear in the host XR environment 710 of the host device 106(1). For example, if remote device 106 is a cellular phone of a particular brand, a 3D model representing that cellular phone brand may be rendered in host XR environment 710 according to the position of remote device 106 relative to rendered asset 732. In other implementations, remote device 106 may be represented by a symbol or simple object, such as a cube or sphere. In still other implementations, remote device 106 may be represented as a line or ray, with the line or ray pointing in the direction representing the orientation of the remote device 106 relative to the rendered asset 732.

For example, XR application 514 may determine that, based on the anchor position for the scene, remote device 106(2) is at a position and orientation that is to the right of rendered asset 1034. XR application may then respond by generating remote XR environment portion 1032 to reflect that position of remote device 106(2) relative to rendered asset 1034.

In various embodiments, remote device 106(2) may change position within the real-world location of remote device 106(2). In such instances, XR application 514 may update remote XR environment portion 1032 to reflect the position change of remote device 106(2). Additionally or alternatively, the position change of remote device 106(2) does not modify the view of the scene as seen by other remote participants or by the host user.

As shown by FIG. 10D, view 1040 displays remote XR environment portion 1032 at a later time during the remote collaboration session. View 1040 includes remote XR environment portion 1032, asset 1034, host device avatar 1042, pin 1044, and map 1046. During the remote collaboration session, the remote user may implement one or more collaboration tools in order to navigate through remote XR environment 730 and/or interact with portions of the adaptable 3D representation of the physical space.

For example, the remote user may toggle avatars of other participants in the remote collaboration session to determine the position of each participant's device relative to the physical space. The avatar may be any XR representation of a device in the host XR environment 710. For example, the avatar may be a point or a shape. In other implementations, knowledge of the type of host device 106(1) may be used to create an XR representation with the physical characteristics of host device 106(1). In one example, the remote user may turn on host avatar 1042 in order to see the position of host device 106(1) and determine what portion of real-world asset 954 (corresponding to rendered asset 1034) that the host user is viewing. The remote user may then tell the user to move to a different position in order to view a different portion of the real-world asset 954.

In some embodiments, the remote user may implement collaboration tools that are displayed in the environments of other participants. For example, the remote user may add a pin 1044 to flag a particular portion of rendered asset 1034 throughout the remote collaboration session. In such instances, other participants may see pin 1044 within the respective environments. For example, when host device 106(1) changes position to be located to the right side of real-world asset 954, host device 106(1) may present pin 1044 for display within host XR application portion 952.

In various embodiments, XR application 514 may generate a map 1046 of the scene within view 1040. Tn such instances, the remote user may move remote device 106(2) to change the position of remote device 106(2) within the map of the scene. In some embodiments, the remote device may be presented with navigation controls. For example, when mobile operations application 516 generates a non-XR remote environment 740 for a remote collaboration session, mobile operations application 516 may present navigation controls to change the position of remote device 106(3) within the scene.

Figure 11:
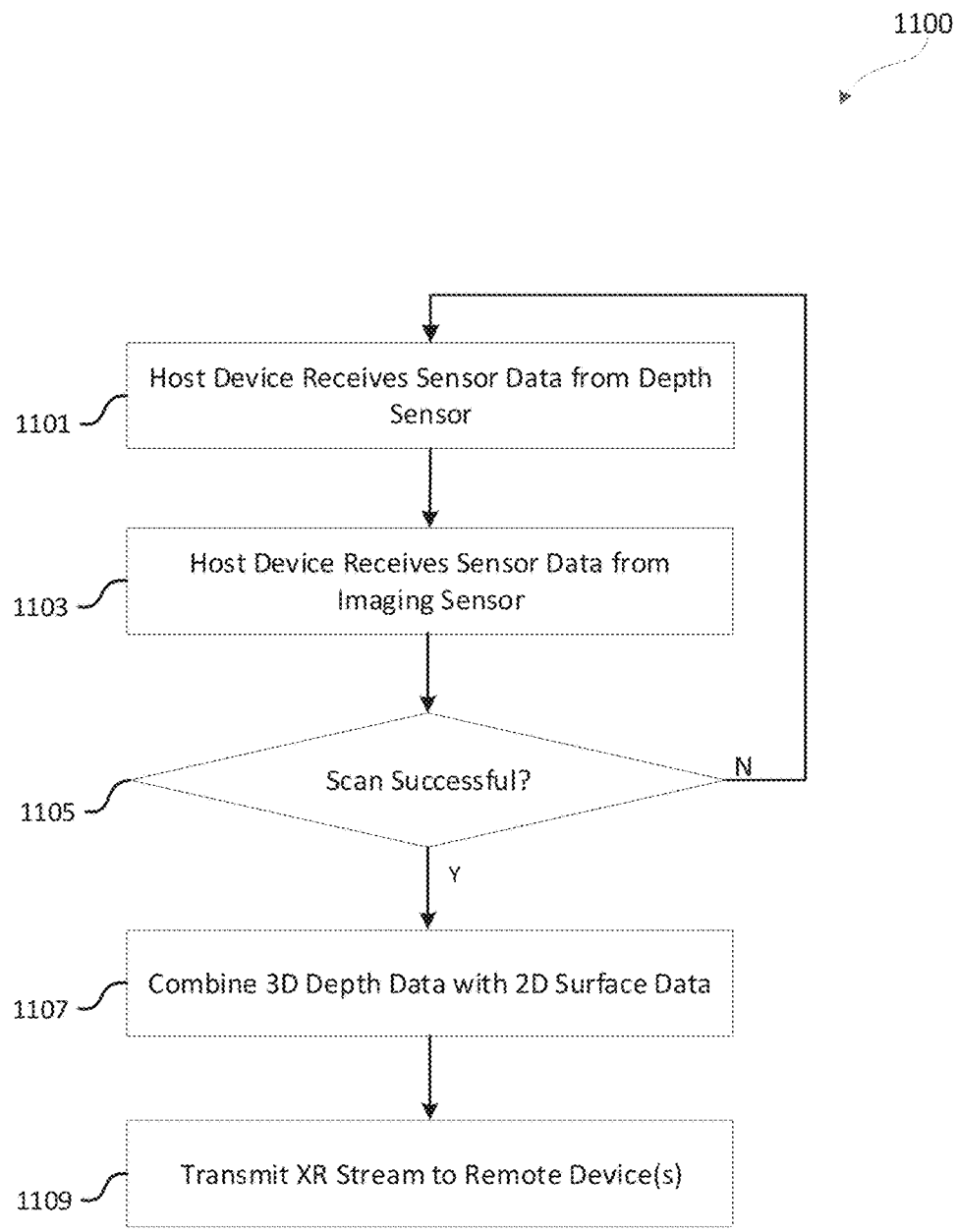
FIG. 11 sets forth a flow diagram of method steps for providing an extended reality stream for a remote collaboration session, in accordance with example implementations.

FIG. 11 sets forth a flow diagram 1100 of method steps for providing an extended reality stream for a remote collaboration session, in accordance with example implementations. Although the method steps are described in conjunction with FIGS. 1-7, persons of ordinary skill in the art will understand that any system configured to perform this method and/or other methods described herein, in any order, and in any combination not logically contradicted, is within the scope of the present invention.

As shown in by method 1100, at step 1101, host device 106(1) receives sensor data from a depth sensor 724. In various embodiments, host device 106(1) may receive depth sensor data that was acquired by a depth sensor 724 (e.g., one or more LiDAR sensors) that are associated with host device 106(1). For example, a LiDAR sensor included in host device 106(1) may scan a physical space and acquire depth sensor data for the physical space. XR application 514 included in host device 106(1) may receive the depth sensor data and generate 3D depth data that is based on the depth sensor data.

At step 1103, host device 106(1) receives sensor data from an imaging sensor 726. In various embodiments, host device 106(1) may receive image sensor data that was acquired by an imaging sensor 726 (e.g., one or more RGB cameras) that are associated with host device 106(1). For example, an RGB camera included in host device 106(1) may scan the physical space and acquire image sensor data for the physical space. XR application 514 included in host device 106(1) may receive the image sensor data and generate 2D surface data that is based on the image sensor data.

At step 1105, host device 106(1) determines whether a scan of the physical space was successful. In some embodiments, XR application 514 may determine whether host device 106(1) successfully acquired both image sensor data and depth sensor data for the physical space. In some embodiments, XR application 514 may perform a series of successive checks to determine whether host device 106(1) successfully acquired both image sensor data and depth sensor data for specific regions of the physical space. When host device 106(1) determines that host device 106(1) did not successfully complete the scan of the physical space, host device returns to step 1101, where XR application 514 prompts the host user to rescan at least a portion of the physical space. Otherwise, XR application determines that host device 106(1) successfully scanned the physical space and proceeds to step 1107.

At step 1107, host device 106(1) combines the 3D depth data and 2D surface data to generate an XR stream. In some embodiments, host device 106(1) may generate the 3D depth data and 2D surface data as a discrete scene that can be produced in a non-XR environment. In various embodiments, XR application 514 may combine correlated portions of the 3D depth data and the 2D surface data to generate the XR stream. In some embodiments, XR application 514 may determine a correlation between portions of 2D surface data and 3D depth data (e.g., determining related sets of coordinate data between a portion of 2D surface data and a portion of 3D depth data).

At step 1109, host device 106(1) transmits the XR stream to one or more remote devices 106. In various embodiments, XR application 514 may transmit the XR stream to one or more recipients (e.g., remote devices 106, remote storage 704, etc.) for use in a remote collaboration session. In some embodiments, XR application 514 may transmit the XR stream as a stream of the combined 2D surface data and 3D depth data. In such instances, the recipient (e.g., remote device 106(2)) may extract the 2D surface data and 3D depth data to generate an adaptable 3D representation of the physical space corresponding to a scene of the physical space. Alternatively, host device 106(1) may initially generate the adaptable representation of the physical space and may transmit the adaptable 3D representation to one or more recipients. In various embodiments, remote device 106 may generate a remote environment that includes at least a portion of the adaptable 3D representation of the physical space.

Figure 12:
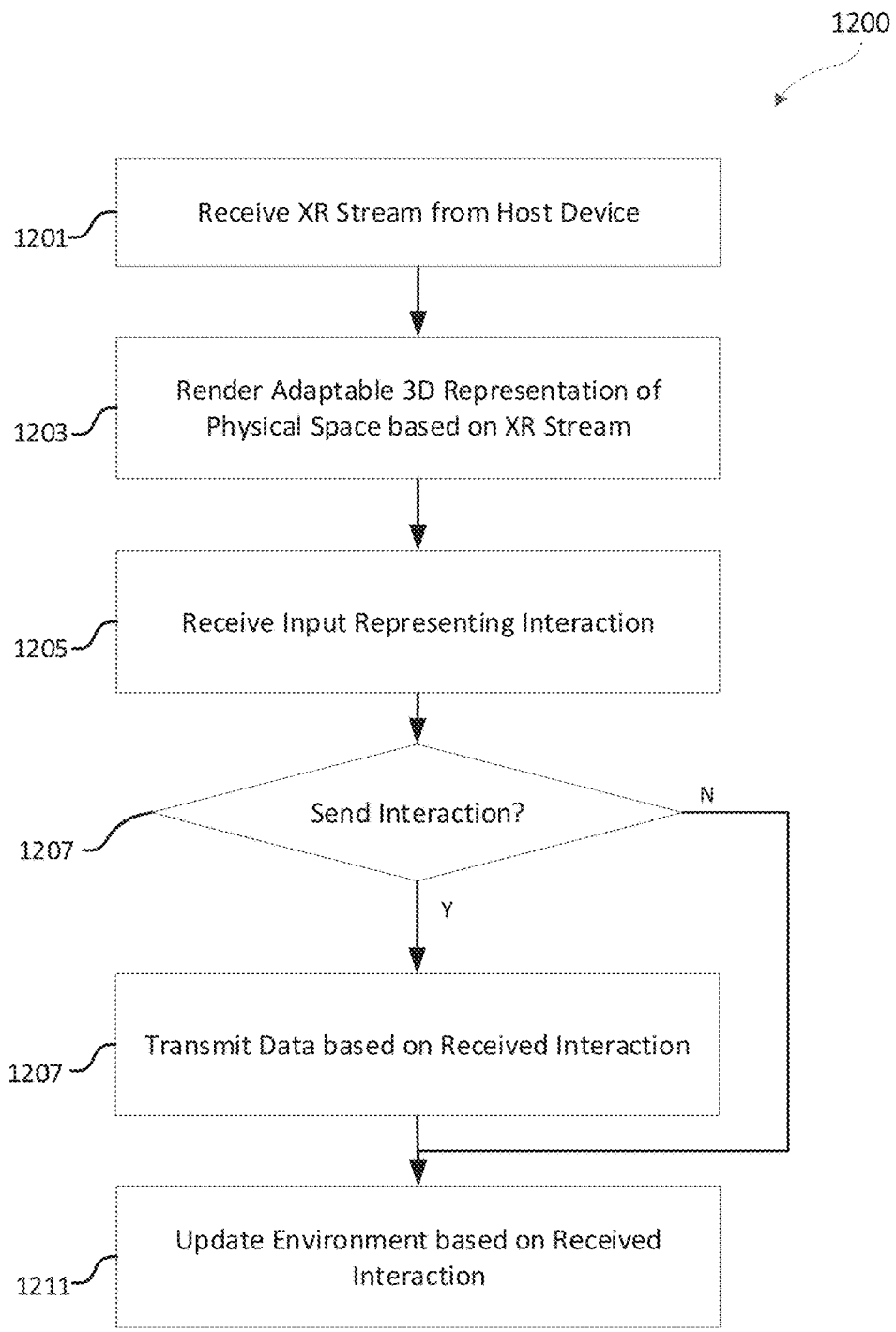
FIG. 12 sets forth a flow diagram of method steps for generating and interacting with a digital representation of a physical space, in accordance with example implementations.

FIG. 12 sets forth a flow diagram 1200 of method steps for generating and interacting with a digital representation of a physical space, in accordance with example implementations. Although the method steps are described in conjunction with FIGS. 1-7, persons of ordinary skill in the art will understand that any system configured to perform this method and/or other methods described herein, in any order, and in any combination not logically contradicted, is within the scope of the present invention.

As shown in method 1200, at step 1201, remote device 106 receives an XR stream originating from host device 106(1). In various embodiments remote device 106 receives an XR stream via tunnel bridge 706. In some embodiments, the XR stream may include continual chunks of combined 3D depth data and/or 2D surface data. Additionally or alternatively, the XR stream may include a discrete set of data that corresponds to a scene at a particular time (e.g., an initial set of geometry data at the start of the remote collaboration session). In some embodiments, workspace service 708 may specify that remote device is an intended recipient of the XR stream. In such instances, data processing service 702 may direct a copy of the XR stream, originating at host device 106(1), to remote device 106.

At step 1203, remote device 106 renders an adaptable 3D representation of the physical space based on the XR stream. In various embodiments, remote device 106 may render at least a portion of an adaptable representation of the physical space that is to be used during the remote collaboration session. For example, XR application 514 included in remote device 106(2) may generate the adaptable 3D representation for inclusion in remote XR environment 730. In another example, remote operations application 516 included in remote device 106(3) may generate the adaptable 3D representation for inclusion in remote environment 740. In various embodiments, when rendering adaptable 3D representation, remote device 106 may extract the 2D surface data and 3D depth data that is included in the XR stream to generate an adaptable 3D representation of the physical space corresponding to a scene of the physical space.

At step 1205, remote device 106 receives an input representing an interaction. In various embodiments, remote device 106 may receive an input from a remote user during the remote collaboration session. For example, remote device 106 may receive an input corresponding to the remote user highlighting a portion of the remote environment. In such instances, remote device 106 may determine the interaction corresponding to the input.

At step 1207, remote device 106 determines whether to send an interaction to a recipient. In various embodiments, remote device 106 may determine whether to publish the interaction corresponding to the received input to other participants in the remote collaboration session. For example, XR application 514 may determine whether the input corresponding to highlighting a portion of the remote XR environment 730 to be seen by other participants. When remote device 106 determines that the interaction is to be published to other participants, remote device 106 may proceed to step 1209. Otherwise, remote device 106 determines that the interaction is not to be published to other participants and proceeds to step 1211.

At step 1209, remote device 106 transmits data based on the received interaction. In various embodiments, remote device 106 transmits one or more messages that corresponds to the interaction received by remote device 106. In such instances, remote device 106 may send the message that includes the interaction and associated data (e.g., type of interaction, coordinates for the interaction, etc.) via tunnel bridge 706 to workspace service 708 and/or host device 106(1). In such instances, other participants may update a corresponding workspace to reflect the interaction (e.g., host device 106(1) updating host XR environment 710 to highlight a corresponding portion of XR workspace 714).

At step 1211, remote device 106 updates the remote environment based on the received interaction. In various embodiments, remote device 106 updates the remote environment to reflect the interaction corresponding to the received input. For example, XR application 514 may update XR workspace 734 included in remote XR environment 730 to highlight a specific portion corresponding to the user input.

In various embodiments, remote device 106 may continually update the remote workspace based on the updated XR stream and/or additional inputs provided by the remote user. In such instances, remote device 106 may update the remote workspace to reflect the updates.

7.0 Mesh and Texture Updates in Networked Remote Collaboration

As mentioned above, the XR application 514 on the host device 106(1) and/or one or more the remote devices 106(2), 106(3) may generate a 3D representation of an object or environment. This 3D representation may include one or more polygon meshes of 3D data produced by the depth sensor 724, as well as textures that include pixel values from 2D data captured by the imaging sensor 726, which are applied to vertices and/or other components of the mesh(es). As additional 3D data and 2D data of the object or environment are generated by the depth sensor 724 and the imaging sensor 726, respectively, the XR application 514 may update one or more portions of the mesh(es) to reflect the latest 2D and 3D representations of the object or environment, as described in further detail below.

Figure 13:
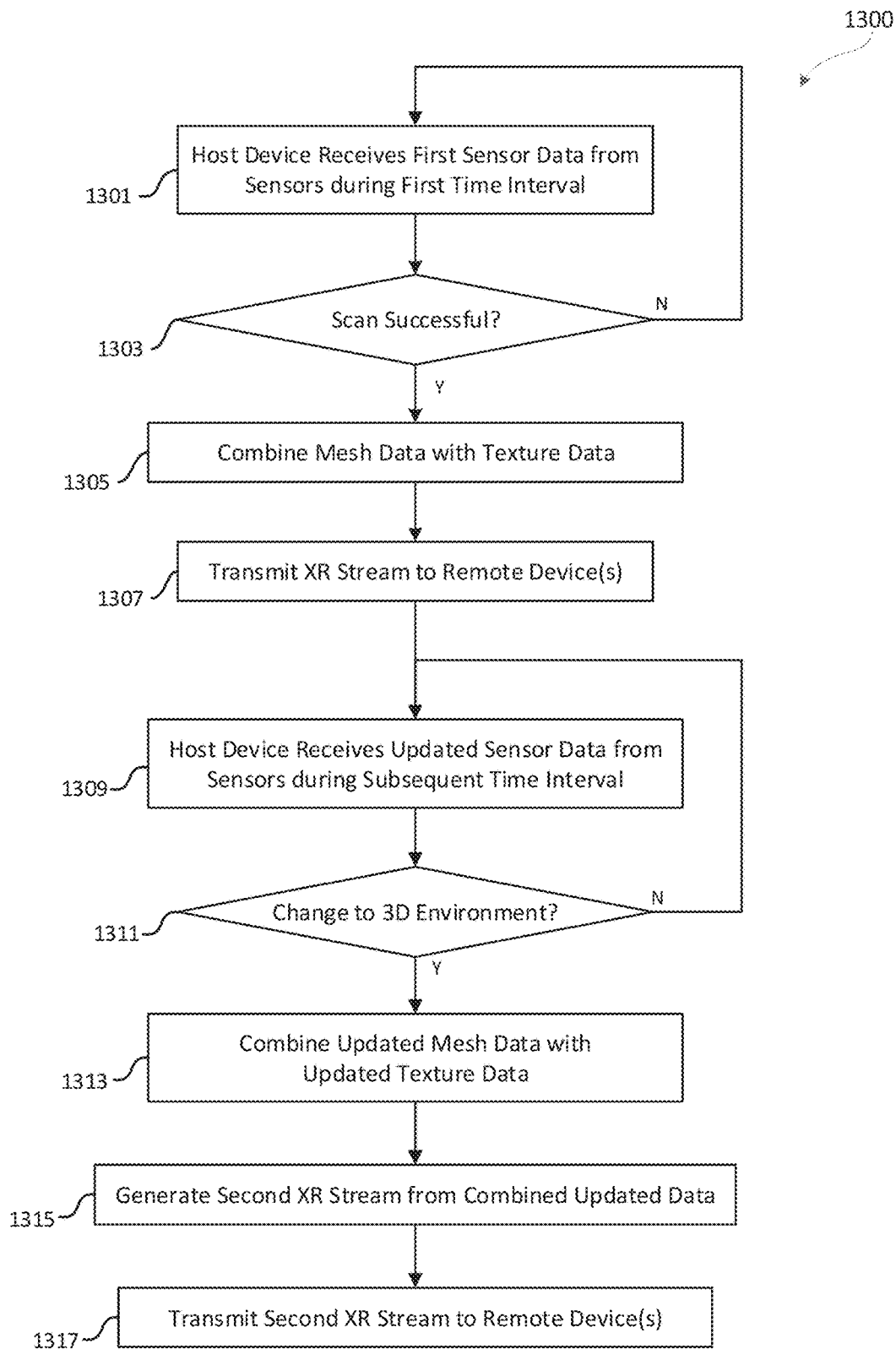
FIG. 13 sets forth a flow diagram of method steps for providing an updated extended reality stream for a remote collaboration session, in accordance with example implementations.

FIG. 13 sets forth a flow diagram 1300 of method steps for providing an updated extended reality stream for a remote collaboration session, in accordance with example implementations. Although the method steps are described in conjunction with FIGS. 1-12, persons of ordinary skill in the art will understand that any system configured to perform this method and/or other methods described herein, in any order, and in any combination not logically contradicted, is within the scope of the present invention.

At step 1301, the host device 106(1) receives first sensor data from the sensors 620 during a first time interval. In various embodiments, the host device 106(1) may respectively receive depth sensor data that was acquired by a depth sensor 724 (e.g., one or more LiDAR sensors) and image sensor data that was acquired by an imaging sensor 726 (e.g., one or more RGB cameras) that are associated with host device 106(1). For example, a LiDAR sensor included in host device 106(1) could scan a physical space and acquire depth sensor data for the physical space. An RGB camera included in host device 106(1) may scan the physical space and acquire image sensor data for the physical space. The XR application 514 included in the host device 106(1) could receive the depth sensor data and generate 3D depth data (e.g., mesh data) that is based on the depth sensor data and could receive the image sensor data and generate 2D surface data (e.g., texture data) that is based on the image sensor data.

At step 1303, the host device 106(1) determines whether a scan of the physical space was successful. In some embodiments, the XR application 514 may determine whether the host device 106(1) successfully acquired both the image sensor data and the depth sensor data for the physical space. In some embodiments, the XR application 514 may perform a series of successive checks to determine whether the host device 106(1) successfully acquired both the image sensor data and the depth sensor data for specific regions of the physical space. When the host device 106(1) determines that the host device 106(1) did not successfully complete the scan of the physical space, the host device 106(1) returns to step 1301, where the XR application 514 prompts the host user to rescan at least a portion of the physical space. Otherwise, the XR application 514 determines that the host device 106(1) successfully scanned the physical space and proceeds to step 1305.

At step 1305, the host device 106(1) combines the mesh data and the texture data to generate an XR stream. In some embodiments, the host device 106(1) may generate the mesh data and the texture data as a discrete scene that includes one or more meshes and that can be produced in a non-XR environment. In various embodiments, the XR application 514 may combine correlated portions of the mesh data and the texture data to generate the XR stream. In some embodiments, the XR application 514 may determine a correlation between portions of the texture data and the mesh data (e.g., determining related sets of coordinate data between portions of the texture data and portions of the mesh data).

At step 1307, the host device 106(1) transmits the XR stream to one or more remote devices 106(2)-106(3). In various embodiments, the XR application 514 may transmit the XR stream to one or more recipients (e.g., the remote devices 106(2)-106(3), the remote storage 704, etc.) for use in a remote collaboration session. In some embodiments, the XR application 514 may transmit the XR stream as a stream of the combined texture data and mesh data. In such instances, the recipient (e.g., the remote device 106(2)) may extract the texture data and the mesh data to generate an adaptable 3D representation of the physical space corresponding to a scene of the physical space. Alternatively, the host device 106(1) may initially generate the adaptable representation of the physical space and may transmit the adaptable 3D representation to one or more recipients. In various embodiments, the remote device 106(2), 106(3) may generate a remote environment that includes at least a portion of the adaptable 3D representation of the physical space.

At step 1309, the host device 106(1) receives updated sensor data from the sensors 620 during a subsequent time interval. In various embodiments, the XR application 514, upon the host device 106(1) transmitting the XR stream at step 1307 during the first time interval, receive updated depth sensor data that was acquired by the depth sensor 724 and/or updated image sensor data that was acquired by the imaging sensor 726 during a subsequent time interval. For example, after the XR application 514 causes the host device 106(1) to transmit the XR stream, the sensors 620 may rescan the physical space. In some embodiments, the depth sensor 724 and the imaging sensor 726 may rescan the physical space at different rates. In such instances, the XR application 514 may select particular data from the acquired sensor data (e.g., selecting a specific frame from a plurality of acquired frames to select specific texture data).

At step 1311, the host device 106(1) determines whether a change occurred to the representation of the real-world environment. In various embodiments, the XR application 514 of the host device 106(1) may process the updated sensor data to determine whether the updated sensor data represents a significant change to the mesh that is representing the physical space. In such instances, the XR application 514 may transmit an XR stream of the updated sensor data only upon determining that the updated sensor data represents a significant change to the texture data and/or the mesh data.

For example, the XR application 514 may compute one or more metrics (e.g., a distance index, a curvature index, a volume index, etc.) that characterize the adaptable representation of the 3D environment when generated from the sensor data. In such instances, the XR application 514 may generate metrics based on the previously-acquired sensor data (e.g., the mesh data and texture data acquired at step 1301) and separate metrics based on the updated sensor data (e.g., the mesh data and texture data acquired at step 1309). The XR application 514 could compare the respective metrics in order to determine whether the difference in the metrics represents a significant change (e.g., when a difference value, based on the differences in the respective metrics, exceeds a predetermined difference threshold). When the XR application 514 determines that a change to the adaptable representation of the real-world environment occurred, the XR application 514 proceeds to step 1313; otherwise, the XR application 514 determines that no significant change to the adaptable representation of the real-world environment occurred and returns to step 1309, where the sensors 620 subsequently scan the real-world environment and acquire additional sensor data.

At step 1313, the host device 106(1) combines the updated mesh data and the updated texture data. In various embodiments, the XR application 514 may combine correlated portions of the mesh data and the texture data to generate the XR stream. In some embodiments, the XR application 514 may determine a correlation between portions of the updated texture data and the updated mesh data (e.g., determining related sets of coordinate data between portions of the texture data and portions of the mesh data). In such instances, the XR application 514 may select a specific image frame from a set of candidate image frames and extract portions of the updated texture data from the specific image frame. The XR application 514 may then correlate the portions of the updated texture data to corresponding portions of the mesh data.

At step 1315, the host device 106(1) generates a second XR stream from the combined sensor data. In various embodiments, the XR application 514 may generate a second XR stream from portions of the combined sensor data generated from combining portions of the updated texture data with the updated texture data. In some embodiments, the second XR stream may include only a portion of the updated sensor data. For example, the XR application 514 could determine that only a portion of the adaptable representation of the real-world environment has changed. In such instances, the XR application 514 could generate the second XR stream from only the portions of the updated mesh data and the updated texture data that represent the changed portion of the adaptable representation. In some embodiments, the second XR stream may represent periodic updates that the host device 106(1) transmits to the recipients. In such instances, the XR application 514 may generate multiple instances of the second XR stream.

At step 1317, the host device 106(1) transmits the second XR stream to the one or more remote devices 106(2)-106(3). In various embodiments, the XR application 514 may, upon generating the second XR stream, transmit the second XR stream to one or more recipients (e.g., the remote devices 106(2)-106(3), the remote storage 704, etc.) for use in a remote collaboration session. In some embodiments, the XR application 514 may transmit the second XR stream as a stream of combined portions of the updated texture data and the updated mesh data. In such instances, the recipient (e.g., the remote device 106(2)) may extract portions of the updated texture data and the updated mesh data to update corresponding portions of the adaptable 3D representation. Alternatively, the host device 106(1) may initially generate the updated portions of the adaptable representation and may transmit the updated portions of the adaptable 3D representation to the one or more recipients.

Figure 14:
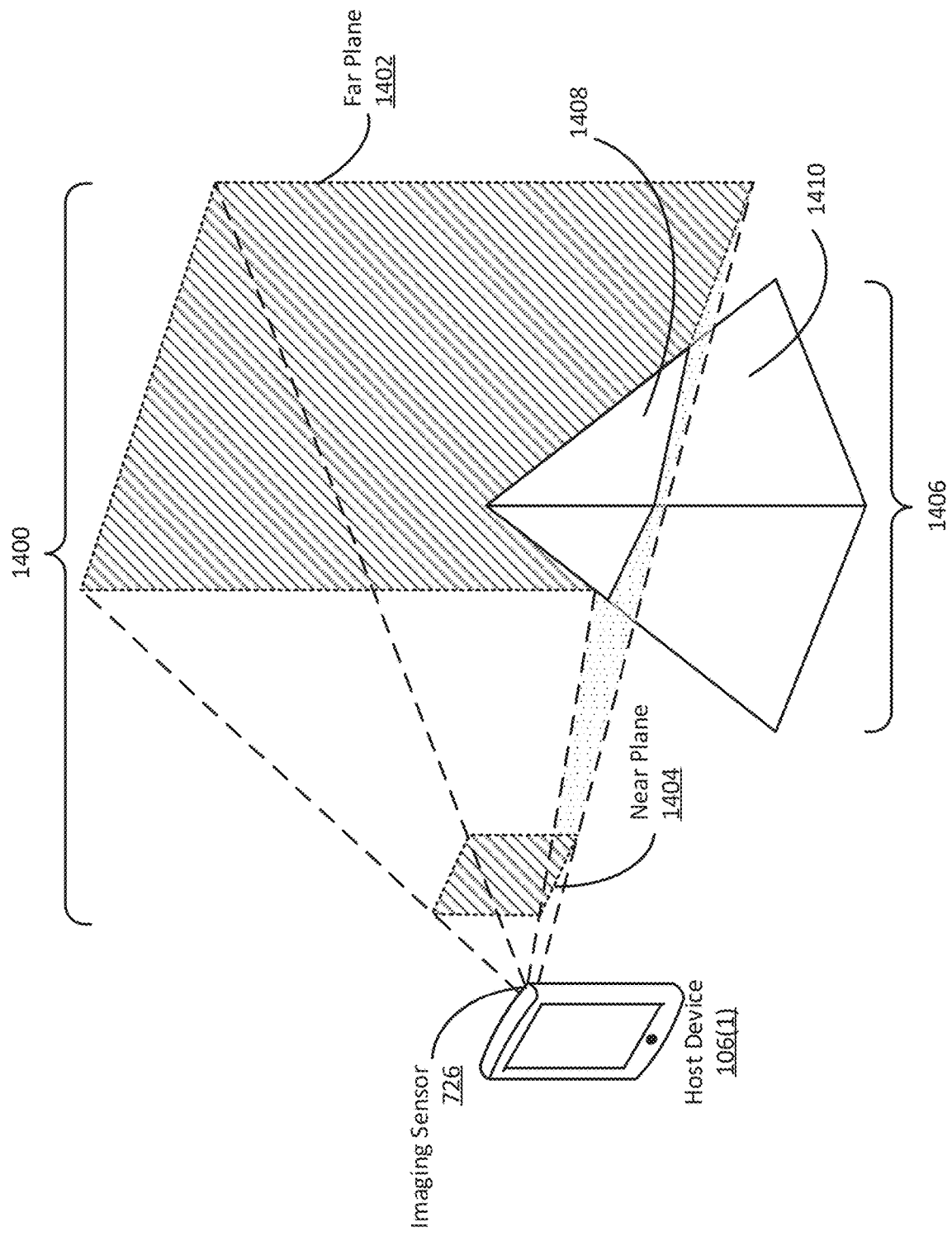
FIG. 14 illustrates the capture of a three-dimensional (3D) environment by the host device and/or remote devices of FIG. 7, in accordance with example implementations.

FIG. 14 illustrates the capture of sensor data associated with a 3D environment by host device 106(1) and/or one or more remote devices 106 of FIG. 7, in accordance with example implementations. In the example shown in FIG. 14, a 2D image of the environment is captured by the imaging sensor 726 on the host device 504 (but can also, or instead, be captured by a different image sensor on one or more remote devices 510). As shown, the field of view associated with the 2D image is represented by a view frustum 1400 that is partially bounded by a near plane 1404 and a far plane 1402. In one or more examples or implementations, the view frustum 1400 includes a 3D volume within the environment that is visible in one or more frames captured by the imaging sensor 726. This 3D volume may be represented by the portion of a rectangular pyramid that lies between the near plane 1404 and the far plane 1402, with the near plane 1404 and the far plane 1402 indicating boundaries of visibility in view frustum 1400 with respect to distance from imaging sensor 726. Additional boundaries of the view frustum 1400 may be represented by line segments connecting the top, left, bottom, and right corners of the near plane 1404 and the far plane 1402 and/or planes formed using the line segments, edges of the near plane 1404, and edges of the far plane 1402.

Objects or portions of objects inside the view frustum 1400 may be visible within the frame(s) captured from the imaging sensor 726, while objects or portions of objects outside the view frustum 1400 may not be visible in the frame(s). Further, an object 1406 that is intersected by the view frustum 1400 may include a first portion 1408 that lies within the view frustum 1400 and is thus visible in frames captured by the imaging sensor 726, as well as a second portion 1410 that lies outside of the view frustum 1400 and is not shown in frames captured by the imaging sensor 726.

In some implementations, meshes generated based on 3D data captured by the depth sensor 724 and/or the extended reality application 514 are larger than 2D images of the same environment captured by the imaging sensor 726, such that each mesh is textured using a limited number of images from the imaging sensor 726. For example, the depth sensor 724 and/or the extended reality application 514 may generate a single mesh of a large object and/or portion of the environment (e.g., a car, a portion of a room etc.). This mesh is textured using a single 2D frame that is acquired by the imaging sensor 726 concurrently with or within a threshold time period of generating least a portion of the mesh. When the mesh is larger than the frame captured by the imaging sensor 726, the extended reality application 514 and/or another component of the host device 504 may texture the mesh by "wrapping" the frame around the mesh (e.g., using a clamp, repeat, clamp to border, mirror, and/or another wrapping mode).

As a result, the portion of the mesh that maps directly to 2D pixel locations in the frame may include an accurate depiction of the object or environment, while other portions of the mesh that fall outside the frame may fail to be textured correctly. Referring to the 3D environment of FIG. 14, a mesh that includes all 3D points in the object 1406 may be textured with the visual representation of the portion 1408 that lies within a frame associated with the view frustum 1400. Thus, the portion 1408 may be accurately represented in the mesh, while wrapping of the texture associated with the portion 1408 around the portion 1410 may result in an inaccurate representation of the portion 1410 in the mesh.

To improve the accuracy of meshes and/or textures applied to the meshes, the extended reality application 514 includes functionality to selectively divide, add, and/or remove meshes in the 3D model based on the latest frames captured by the imaging sensor 726. In turn, the 3D model is updated with 3D points and/or textures that reflect the latest data generated by the depth sensor 724 and/or the imaging sensor 726 instead of requiring textures associated with frames from the imaging sensor 726 to wrap around large meshes.

Figure 15:
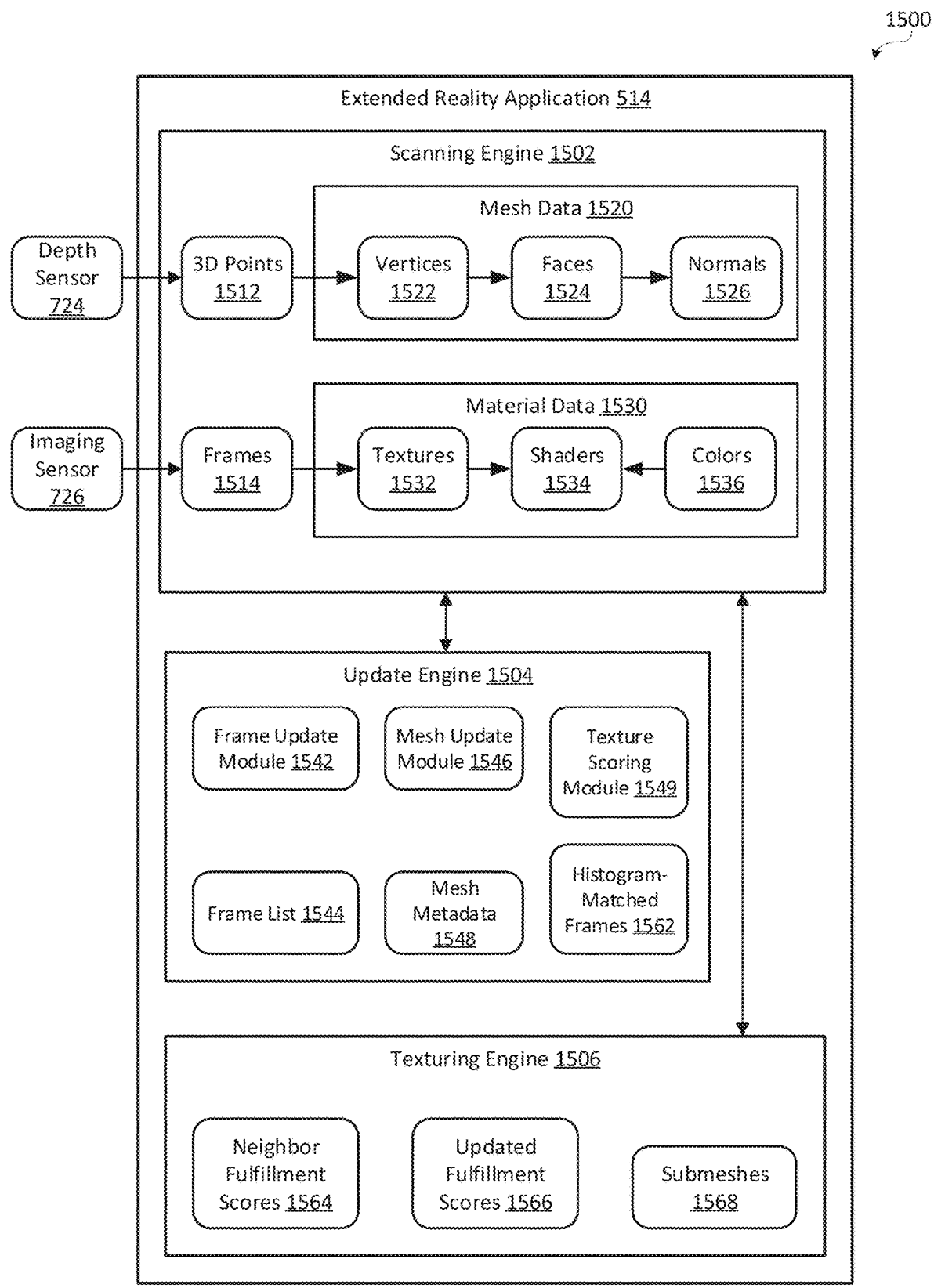
FIG. 15 is an illustration of the extended reality application of FIG. 5, in accordance with example implementations.

FIG. 15 is an illustration of the extended reality application 514 of FIG. 5, in accordance with example implementations. As shown, the extended reality application 514 includes a scanning engine 1502, an update engine 1504, and a texturing engine 1506. Each of these components is described in further detail below.

The scanning engine 1502 generates mesh data 1520 that includes one or more meshes based on 3D data ("3D points 1512") from depth sensor 724. More specifically, the scanning engine 1502 maps 3D points 1512 to vertices 1522 of the meshes and connects pairs of neighboring vertices 1522 with edges to form faces 1524 in the meshes. For example, the scanning engine 1502 may generate vertices 1522 in the meshes that reflect surfaces, shapes, and/or contours represented by the 3D points 1512 and form triangular faces 1524 in the meshes by connecting groups of three spatially proximate vertices 1522 in the 3D points 1512. These faces 1524 may be generated in a way that produces smooth surfaces when a plane is detected in the 3D points 1512 (e.g., by depth sensor 724, scanning engine 1502, and/or another component). The scanning engine 1502 also calculates normals 1526 for the vertices 1522 in the meshes. For example, the scanning engine 1502 may calculate the normal for a vertex in a mesh as the average of normals of the planes of triangles (or other polygons) in which the vertex is found.

The texturing engine 1506 generates material data 1530 that includes one or more materials for meshes generated by scanning engine 1502. This material data 1530 may be generated based on 2D data ("frames 1514") received by the scanning engine 1502 from imaging sensor 726.

More specifically, the texturing engine 1506 maps 2D points (e.g., pixel locations) in the frames 1514 onto 3D vertices 1522 in the mesh data 1520 to define textures 1532 used with the meshes. For example, the texturing engine 1506 may project some or all vertices 1522 in each mesh onto 2D pixel locations in a corresponding frame from the imaging sensor 726. When a vertex is projected onto a valid pixel location in the frame (e.g., a pixel location that falls within the dimensions of the frame), a texture coordinate for the vertex is set to the pixel location. The mesh is then textured by "covering" triangular (or other polygon-shaped) faces 1524 of the mesh with corresponding triangular (or other polygon-shaped) portions of the frame that spatially overlap with the faces, where a given face is textured using a portion of the frame that is represented by the texture coordinates of vertices 1522 in the face. Any remaining faces 1524 of the mesh that do not spatially overlap with the frame can be textured by stretching and/or copying portions of the frame onto those faces.

When a mesh is not associated with a texture (e.g., if vertices 1522 in the mesh do not map to 2D points in available frames 1514 from imaging sensor 726), the texturing engine 1506 may apply one or more colors 1536 to the mesh to facilitate visualization and/or rendering of the mesh. For example, the texturing engine 1506 may assign a different color to each mesh in the 3D model to allow the 3D regions represented by the meshes to be visually identified. Consequently, meshes created by the extended reality application 514 may include textured meshes that include textures 1532 obtained from the frames 1514 of the corresponding portions of the environment, as well as untextured meshes that are assigned colors 1536 in the absence of available textures 1532.

The texturing engine 1506 may additionally associate the meshes with one or more shaders 1534 that control rendering of the meshes using the corresponding textures 1532 and colors 1536. For example, each shader may include a diffuse, specular, bumped, and/or another type of shader that calculates pixel colors in a rendering of a mesh based on one or more textures 1532 and/or colors 1536 associated with the mesh, a lighting model, a reflectivity, a diffusivity, and/or other attributes that affect the rendering of a surface.

The texturing engine 1506 further adds textures 1532, shaders 1534, colors 1536, and/or other attributes that affect rendering of the meshes to the material data 1530 associated with the meshes. For example, the material data 1530 may include one or more materials used to render meshes in the mesh data 1520, with each material specifying a texture (or color) and a shader. Each mesh may be assigned a single material, while one material may be shared across multiple meshes.

The update engine 1504 determines the data used to update portions of the adaptable representation of the real-world environment. As shown, the update engine 1504 includes a frame update module 1542, a frame list 1544, a mesh update module 1546, mesh metadata 1548, and a texture scoring module 1549. In operation, the update engine 1504 generates updated mesh data and updated texture data based on sensor data that is periodically acquired via the depth sensor 724 and/or the imaging sensor 726. In various implementations, the frame update module 1542, the mesh update module 1546, and/or the texture scoring module 1549 may process newly-acquired depth sensor data and/or newly-acquired image sensor data. In various implementations, the updated sensor data may correspond to one or more 3D points 1512 and/or one or more frames 1514 acquired by the scanning engine 1502 over one or more time intervals. For example, the respective sensors 724, 726 could generate initial 3D points 1512 and initial frames 1514, and could subsequently generate one or more instances (e.g., a new instance each scan) of updated 3D points 1512 and updated frames 1514.

The frame update module 1542 included in the update engine 1504 processes the one or more updated frames 1514 that are generated by the scanning engine 1502 when the imaging sensor 726 periodically scans the physical space and acquires updated image sensor data. The frame update module 1542 calculates various values associated with an updated frame 1514 and stores the calculated values in associated frame metadata. In some embodiments, the frame update module 1542 determines whether an updated frame 1514 is a candidate frame that may be used for texturing one or more mesh faces. Upon identifying an updated frame as a candidate frame, the frame update module 1542 stores the corresponding frame metadata in the frame list 1544. In various embodiments, one or more of the mesh update module 1546 and/or the texture scoring module 1549 may retrieve the frame metadata from the frame list 1544, update values stored in frame metadata, and/or select a particular frame based on the values stored in the corresponding frame metadata (e.g., select an updated frame 1514 having the highest fulfillment score, as computed by the texture scoring module 1549).

In various embodiments, the imaging sensor 726 may periodically or at various points in time scan (e.g., scan every one second) the physical space and acquire updated image sensor data. The scanning engine 1502 in the XR application 514 may generate one or more updated frames 1514 corresponding to each scan (e.g., a separate updated frame 1514 for each scan performed by the imaging sensor 726). The scanning engine 1502 may also generate frame metadata that corresponds with each of the updated frames 1514. The scanning engine 1502 provides a given updated frame 1514 and the corresponding frame metadata to the update engine 1504. In some implementations, one or more of the frame update module 1542, the mesh update module 1546, and/or the texture scoring module 1549 may process the updated frame 1514 and the frame metadata in order to determine whether to use the updated frame 1514 to texture one or more portions of updated mesh data 1520 (e.g., the texturing engine 1506 assigning the updated frame 1514 to one or more faces 1524 in updated mesh data 1520).

In various implementations, the frame update module 1542 may receive multiple updated frames 1514 from the scanning engine 1502. For example, the frame update module 1542 could receive a series of updated frames 1514 that the scanning engine 1502 generated at successive times (e.g., every three seconds). The frame update module 1542 may select, from the multiple updated frames 1514, one or more of such frames as candidate frames. Each candidate frame is a candidate for use by the texturing engine 1506 to texture portions of an updated mesh (e.g., assigning portions of the updated frame 1514 to one or more faces 1524 included in the updated mesh). In some implementations, upon identifying an updated frame 1514 as a candidate frame, the frame update module 1542 may add the corresponding frame metadata to the frame list 1544. The mesh update module 1546 and/or the texture scoring module 1549 may process frame metadata included in the frame list 1544 in order to select one or more candidate frames to texture an updated mesh.

In some implementations, the frame update module 1542 may maintain a frame refresh threshold to manage the quantity of received updated frames 1514 that the frame update module 1542 processes. In such instances, the frame update module 1542 may first determine the time elapsed since the frame update module 1542 previously processed an updated frame 1514. The frame update module 1542 may compare the elapsed time to the frame refresh threshold, refraining from processing the corresponding frame metadata when the elapsed time does not exceed the frame refresh threshold. For example, the frame update module 1542 could maintain a frame refresh threshold of 5 seconds. When the update engine 1504 receives an updated frame 1514, the frame update module 1542 could respond by determining the time that has elapsed since the frame update module 1542 last processed any frame 1514 (e.g., an initial frame or an updated frame). When the frame update module 1542 determines that the elapsed time is below 5 seconds, the frame update module 1542 could refrain from processing the updated frame 1514 and wait to receive a subsequent updated frame 1514. Once the elapsed time has exceeded the threshold, the frame update module 1542 may then decide to process a subsequent updated frame 1514.

In various implementations, the frame update module 1542 may process a given frame 1514 and generate and/or update associated frame metadata for the given frame 1514. The frame metadata includes various information about the frame 1514 and may be used by one or more modules to identify and/or process the frame 1514. In some implementations, the frame metadata may include information such as a frame identifier, an orientation (e.g., orientation of the imaging sensor 726 when the image sensor data was acquired), a position (e.g., position of the host device 106(1) relative to an anchor and/or other reference positions), an age relative to the time that the frame 1514 was generated, and so forth. Additionally or alternatively, the frame metadata may include one or more fulfillment scores that are associated with one or more mesh faces. A given fulfillment score indicates the quality that a texture included in the frame 1514 can be applied as a texture to a given face 1524 included in the mesh data 1520. In some implementations, the frame metadata may include material data 1530 (e.g., textures 1532, shaders 1534, colors 1536, etc.) and other derived information (e.g., a view frustrum determined from the position and orientation, etc.).

In various implementations, the frame update module 1542 may compare the position and/or orientation values that are associated with an updated frame 1514 to the position and/or orientation values that are associated with the previous frame. In various implementations, the frame metadata for a given frame 1514 may include the position and orientation of the host device 106(1) and/or the imaging sensor 726 when the 2D surface data was acquired. In such instances, the frame update module 1542 may filter any updated frame 1514 that indicates a large change in the position or orientation that is associated with the previous frame.

For example, large differences in the position and orientation values associated with the frames could indicate a large movement by the imaging sensor 726, which is associated with factors such as blurriness or possible occlusion and may generate poor-quality textures. In some implementations, the frame update module 1542 may also filter small changes in position and/or orientation, as small differences may indicate a high similarity to previous frames and thus generate a texture that is similar to the previous texture and does not indicate a significant change. For each of these example determinations, the update engine 1504 could indicate that any textures 1532 included in the updated frame 1514 are not suitable for texturing an updated mesh.

In some implementations, the frame update module 1542 may compute a position change value based on differences in position values and orientation values in the respective frame metadata for the updated frame 1514 and the previous frame. The frame update module 1542 may compare the computed position change value to a movement threshold, where the frame update module 1542 refrains from using the updated frame 1514 when the corresponding position change value exceeds the movement threshold. Otherwise, the frame update module 1542 may determine that the position change value falls below a movement threshold and identifies the updated frame 1514 as a candidate frame.

In some implementations, the frame update module 1542 may cause the texture scoring module 1549 to compute fulfillment scores for a candidate frame. In such instances, the texture scoring module 1549 may perform one or more evaluations of the updated frame in relation to a given face 1524 and, based on the one or more evaluations, generate a fulfillment score for the frame in relation to a given face 1524. The frame update module 1542 stores the fulfillment score in the frame metadata corresponding to the updated frame 1514 in the frame list 1544. In some implementations, the texture scoring module 1549 may calculate fulfillment scores for a set of faces. In such instances, the texture scoring module 1549 may store each of the respective fulfillment scores in the frame metadata.

In various implementations, one or more modules included in the update engine and/or the texturing engine 1506 may process the frame metadata stored in the frame list in order to identify candidate frames that are to provide texture data for portions of the updated mesh. For example, the texture scoring module 1549 could score a given frame relative to a portion of the mesh based on the ability of the frame to provide a high-quality texture to the portion of mesh. Based on the scores generated by the texture scoring module 1549, the update engine 1504 may identify a candidate frame and cause the texturing engine 1506 to apply texture data included in the frame to a particular portion of the mesh (e.g., a particular face 1524 of an updated mesh).

The mesh update module 1546 included in the update engine 1504 processes updated mesh data 1520 that is generated by the scanning engine 1502 when the depth sensor 724 periodically scans the physical space and acquires updated depth sensor data. The mesh update module 1546 calculates various values associated with the updated mesh data 1520 and stores the calculated values in the associated mesh metadata 1548. In some implementations, the mesh update module 1546 keeps the updated mesh data 1520 only upon determining that the updated mesh data 1520 represents a significant change to the mesh generated from previously-acquired depth sensor data. In such instances, the mesh update module 1546 updates the values of the mesh metadata 1548 and determines the frames 1514 from which the best a texture 1532 can be generated for different faces of the updated mesh data 1520.

For example, upon determining that the updated mesh data 1520 includes a change to a set of faces 1524, the mesh update module 1546 may update the mesh metadata 1548 and cause the texture scoring module 1549 to recalculate the fulfillment scores for the candidate frames identified in the frame list 1544 with respect to the updated set of faces 1524. Upon the texture scoring module 1549 recalculating the fulfillment scores, the mesh update module 1546 selects, for each of the updated faces 1524, the candidate frame with the best fulfillment score, and causes the texturing engine 1506 to assign the selected frame to the updated face 1524.

In various implementations, the depth sensor 724 may periodically scan (e.g., scan every thirty seconds) the physical space and acquire updated depth sensor data. The scanning engine 1502 in the XR application 514 may generate one or more sets of updated 3D points 1512 and generate sets of updated mesh data 1520 from the sets of updated 3D points 1512 (e.g., a separate set of updated mesh data 1520 for each scan performed by the depth sensor 724). The scanning engine 1502 provides a given set of updated mesh data 1520 to the update engine 1504. In some implementations, one or more of the mesh update module 1546 and/or the texture scoring module 1549 may process the updated mesh data 1520 and/or the associated mesh metadata 1548 in order to determine whether to use the updated mesh data 1520 and, if so, which candidate frame to use when texturing the updated portions of the mesh data (e.g., one or more updated faces 1524 that are included in the updated mesh data 1520).

In various implementations, the mesh update module 1546 may receive multiple sets of updated mesh data 1520 from the scanning engine 1502. For example, the mesh update module 1546 could receive a series of updated meshes, each with a set of updated mesh data 1520, which the scanning engine 1502 generates at successive times (e.g., every sixty seconds). In such instances, the mesh update module 1546 may periodically compare the updated mesh data 1520 with previous mesh data 1520 in order to determine whether the updated mesh represents a significant change to the previous mesh. When the mesh update module 1546 determines that the updated mesh represents a significant change, the mesh update module 1546 generates and/or updates the mesh metadata 1548 associated with the updated mesh data 1520.

In some implementations, the mesh update module 1546 may maintain a mesh refresh threshold to determine when the mesh update module 1546 processes data associated with an updated mesh. In such instances, the mesh update module 1546 may first determine the time elapsed since the mesh update module 1546 previously processed updated mesh data 1520 for an updated mesh. The mesh update module 1546 may compare the elapsed time to the mesh refresh threshold, refraining from processing the updated mesh data 1520 when the elapsed time does not exceed the mesh refresh threshold.

For example, the mesh update module 1546 could maintain a mesh refresh threshold of 15 seconds. When the update engine 1504 receives updated mesh data 1520, the mesh update module 1546 could respond by determining the time that has elapsed since the mesh update module 1546 last processed any mesh data 1520 (e.g., the initial mesh data or updated mesh data). When the mesh update module 1546 determines that the elapsed time is below 60 seconds, the mesh update module 1546 could refrain from processing the updated mesh data 1520 and wait to receive a subsequent set of updated mesh data 1520. Once the elapsed time has exceeded the mesh refresh threshold, the mesh update module 1546 could then decide to process a subsequent set of updated mesh data 1520.

In various implementations, the mesh update module 1546 may process the updated mesh data 1520 by initially setting a scene boundary. In such instances, the mesh update module 1546 may analyze the updated mesh data 1520 that is within the scene boundary. In some implementations, the host user may set the scene boundary at the beginning of the remote collaboration session. Additionally or alternatively, the host user may set the scene boundary when performing an initial scan of the physical space. In various implementations, the scene boundary may be a specific shape, such as a cylinder, cube, cuboid, prism, pyramid, and so forth. In some implementations, the mesh update module 1546 may compare the coordinates of the vertices 1522 to the coordinates that define the edges of the scene boundary, and may filter any vertices 1522 and/or any faces 1524 that are positioned outside of the scene boundary.

In various implementations, the mesh update module 1546 may compare the updated mesh data 1520 to previous mesh data. Based on the comparison, the mesh update module 1546 may determine whether there is a significant difference between the previous mesh data and the updated mesh data 1520, indicating a significant change that the host device 106(1) is to provide as an update to the recipients. In some implementations, the mesh update module 1546 may generate one or more values associated with a given mesh. Such values may include metrics that characterize the mesh, such as a curvature index (associated with a function of the two principal curvatures of the surface of the mesh), a distance index (associated with functions based on distances between points on multiple faces of the mesh), and/or a volume index (associated with a function of volumes of portions within the mesh). Additionally or alternatively, the mesh update module 1546 may generate histograms based on each respective index. In such instances, the mesh update module may compare histograms of respective meshes (e.g., compare the volume histogram for the updated mesh to the volume histogram for the previous mesh) to determine a difference value. In some implementations, the mesh update module 1546 may compute the difference value as an aggregate value of the differences from each metric. In such cases, the differences between the respective curvature indices, distance indices, and volume indices may be combined to generate a single aggregate difference value.

Alternatively, the mesh update module 1546 may compute other values in order to determine a difference value between meshes. In some implementations, the mesh update module 1546 may compute a Hausdorff distance between the updated mesh and the previous mesh. In such instances, the mesh update module 1546 may compute the Hausdorff distance between faces 1524 for the updated mesh and faces of the previous mesh. In some implementations, the mesh update module 1546 may compute the difference value as a function of multiple Hausdorff distances. For example, the mesh update module 1546 may compute individual Hausdorff distances for each face 1524 within the scene boundary and may compute the difference value as the mean of the set of individual Hausdorff distances. Alternatively, the mesh update module 1546 may compute the Hausdorff distance between a group of neighboring faces in the updated mesh data 1520 that form a single surface to the corresponding group of neighboring faces in the previous mesh.

In various implementations, the mesh update module 1546 may compare the computed difference value to an update threshold. In such instances, the mesh update module 1546 may refrain from further processing updated mesh data 1520 for a mesh that has a difference value below the update threshold. In such instances, the mesh update module 1546 determines that because the difference value falls below the update threshold, the updated mesh is not a significant change to the previous mesh and the host device 106(1) does not need to provide the updated mesh to the recipients.

For example, the update threshold could be a value associated with the computed difference value, such as a calibrated update threshold based on an error percentage relative to the diameter of the scene boundary. The mesh update module 1546 could initially compute the Hausdorff distance between the faces 1524 of the updated mesh to the faces of the previous mesh. The mesh update module could then determine a difference value, such as a mean error based on the Hausdorff distance and determine whether the difference value exceeds the update threshold. When the mesh update module 1546 determines that the difference value exceeds the update threshold, the mesh update module 1546 determines that the updated mesh is a significant change to the representation of the physical space and proceeds to update the representation using the updated mesh.

In various implementations, the mesh update module 1546 updates mesh metadata 1548 based on the updated mesh data 1520. In some implementations, when updated mesh represents a significant change from the previous mesh, the mesh update module 1546 updates the mesh metadata 1548 based on the updated mesh data 1520. In some implementations, the mesh metadata 1548 includes values associated with specific mesh components, such as specific mesh metadata 1548 that is assigned to each face 1524. In such instances, the mesh update module 1546 may update the mesh metadata 1548 based on the faces 1524 included in the updated mesh data 1520. In some implementations, a subset of the faces 1524 differ in the updated mesh data from the faces included in the previous mesh data. In such instances, the mesh update module 1546 may update the mesh metadata 1548 subset of differing faces while the mesh metadata 1548 for the unaltered faces 1524 remain unchanged.

In various implementations, the mesh metadata 1548 may include information about a given portion of the mesh, such as a specific face 1524 or a set of neighboring faces. In some implementations, the information may include an identifier for the corresponding portion of the mesh, an age (indicating when the portion of the mesh was last modified), the position (as a set of coordinates relative to an anchor position), a frame identifier (indicating the frame that is currently mapped to the portion of the mesh), and/or a fulfillment score. In some implementations, the mesh update module 1546 may cause the texture scoring module 1549 to update one or more fulfillment scores for the current frame mapped to the portion of the mesh and/or one or more candidate frames identified in the frame list 1544. In such instances, the mesh update module 1546 may respond to the updated fulfillment scores associated with the portion of the mesh by causing the texturing engine 1506 to assign a different frame (e.g., a candidate frame identified in the frame list 1544) to a given portion of the mesh.

The texture scoring module 1549 calculates various information for a given frame in relation to a portion of a mesh. As will be discussed in further detail below, the texture scoring module 1549 calculates one or more fulfillment scores for a set of faces. The texture scoring module 1549 stores each of the respective fulfillment scores that are computed for the respective faces in the frame metadata associated with the frame.

In some implementations, the update engine 1504 further mitigates patchiness in rendering the mesh when the mesh is textured with frames that have different white balances and/or tonal distributions. In particular, the update engine 1504 converts frames selected for inclusion in the frame list 1544 into histogram-matched frames 1562 with the same tonal distributions. The histogram-matched frames 1562 include one or more key frames in the frame list 1544 that capture different portions of the mesh. After a given frame is selected for inclusion in the frame list 1544, the update engine 1504 may determine whether or not the overlap between the portion of the mesh that falls within the view frustum of the frame and a portion of the mesh that falls within the view frustum of a key frame in the frame list 1544 exceeds a threshold. If the overlap exceeds the threshold, the update engine 1504 may perform histogram matching that adjusts a distribution of pixel attributes (e.g., tone values) in the frame to match the distribution of pixel attributes in the key frame. If the overlap does not exceed the threshold, the update engine 1504 may select the frame as a key frame for the portion and assign subsequent frames with more than the threshold overlap with the frame to the key frame. The update engine 1504 may additionally discard one or more existing key frames on a periodic basis to allow histogram matching to be performed using newer frames in the frame list 1544. The operation of the update engine 1504 in generating histogram-matched frames 1562 is described in further detail below with respect to FIG. 18.

In some implementations, the texturing engine 1506 performs retexturing of meshes in the mesh data 520 by periodically and/or continually assigning newer frames 1514 from imaging sensor 726 as textures 1532 for the faces 1524 in the mesh data 1520 based on fulfillment scores calculated by the texture scoring module 1549. For example, the texturing engine 1506 may perform texturing of the faces 1524 in a mesh using frames 1514 in a corresponding frame list 1544. The texturing may be performed according to a texturing interval that corresponds to a prespecified period of time, a certain number of frames 1514 received from the imaging sensor 726, and/or another duration. The texturing engine 1506 may also, or instead, perform texturing of the faces 1524 in a mesh after the mesh changes beyond a threshold.

During texturing of a mesh, the texturing engine 1506 calculates updated fulfillment scores 1566 associated with the faces 1524 in the mesh and the frames 1514 in the frame list 1544 for the mesh. Each updated fulfillment score may be calculated for a face in the mesh and a frame in the frame list 1544 using the current fulfillment score for the face and frame and one or more neighbor fulfillment scores 1564 associated with the same frame and one or more faces that are adjacent to (or within a threshold distance to) the face. For example, the updated fulfillment score may be calculated as a weighted combination of the current fulfillment score for the face and the average current fulfillment score associated with the adjacent face(s). The updated fulfillment score may be higher than the current fulfillment score when the neighbor fulfillment scores 1564 are, on average, higher than the current fulfillment score for the face. Conversely, the updated fulfillment score may be lower than the current fulfillment score when the neighbor fulfillment scores 1564 are, on average, lower than the current fulfillment score for the face. In other words, the updated fulfillment score may represent a "blending" or "smoothing" of the current fulfillment score for the face with the current fulfillment scores of the adjacent (or nearby) face(s).

After the updated fulfillment scores 1566 are calculated for all faces 1524 in the mesh, the texturing engine 1506 selects, as a texture for each face in the mesh, a frame associated with the highest updated fulfillment score for the face. Because an updated fulfillment score associated with a given face and frame includes contributions from the neighbor fulfillment scores 1564 associated with adjacent faces and the same frame, adjacent faces are more likely to be textured using the same frame. Texturing adjacent faces using the same frame additionally reduces "patchiness" in the rendered mesh that can be caused by texturing contiguous faces with different frames when these frames have differing tonal distributions (e.g., due to variations in white balance, contrast, exposure, saturation, etc.).

The texturing engine 1506 then divides the mesh into multiple separate submeshes 1568 by grouping faces textured by the same frame under a corresponding submesh. Each submesh includes a subset of the vertices 1522, the faces 1524, and the normals 1526 in the mesh and is associated with a separate material in material data 1530. By creating submeshes 1568, the texturing engine 1506 allows different portions of the mesh to be associated with different materials and textures 1532 in the materials.

After submeshes 1568 are created, the texturing engine 1506 transmits one or more submeshes 1568 and one or more frames 1514 used to texture the submesh(es) to another device (e.g., one or more remote devices 106) for rendering of the submesh(es) on the other device. More specifically, the texturing engine 1506 may transmit one or more submeshes 1568 with faces 1524 and/or textures 1532 that have changed since the last texturing interval to the other device and/or do a distributed messaging system for receipt by the other device. This selective transmission of submeshes 1568 and corresponding frames 1514 allows the other device to update the rendered mesh with recent data from the depth sensor 724 and the imaging sensor 726 while avoiding computational and/or network overhead associated with unnecessarily transmitting unchanged portions of the mesh to the other device.

Figure 16:
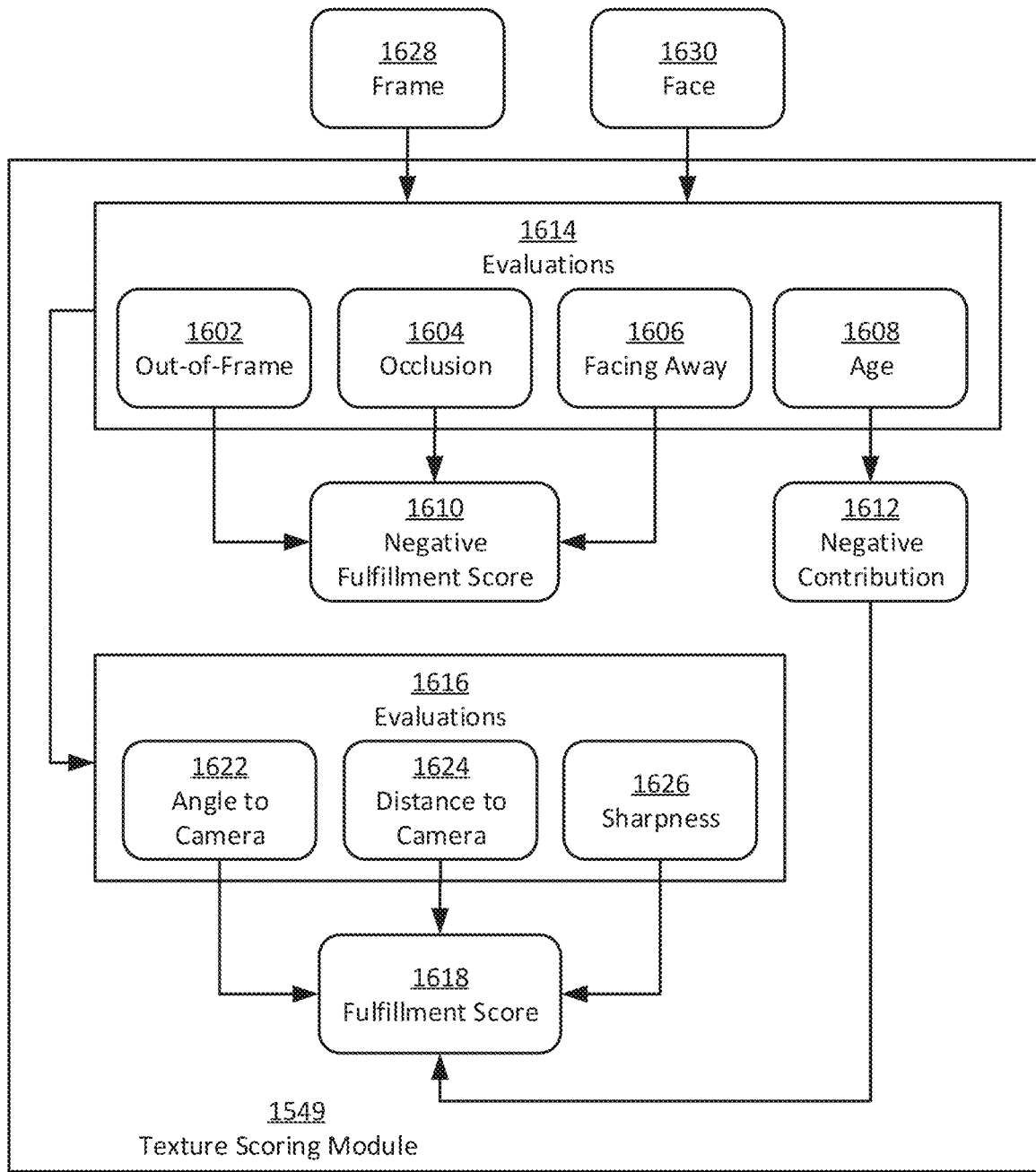
FIG. 16 illustrates a more detailed view of the texture scoring module of FIG. 15, in accordance with example implementations.

FIG. 16 illustrates a more detailed view of the texture scoring module 1549 of FIG. 15, in accordance with example implementations. As shown in FIG. 16, the texture scoring module 1549 performs a number of evaluations 1614 on a frame 1628 captured by the imaging sensor 726 and a face 1630 in a mesh. In some implementations, these evaluations 1614 are used to filter or penalize frame 1628 when frame 1628 is not suitable as a candidate for texturing face 1630.

Evaluations 1614 include an out-of-frame 1602 evaluation that determines whether the face 1630 lies inside or outside the portion of the 3D space captured by the frame 1628. If the face 1630 falls within the portion of the 3D space captured by the frame 1628, the face 1630 passes the out-of-frame 1602 evaluation. If the face 1630 falls outside of the portion of the 3D space captured by the frame 1628, the face 1630 does not pass the out-of-frame 1602 evaluation. To perform the out of frame 1602 evaluation, the texture scoring module 1549 may project the vertices of the face 1630 onto 2D locations in the image plane of the imaging sensor 726. If all 2D locations onto which the vertices are projected are within the boundaries of the frame 1628, the texture scoring module 1549 may determine that the face 1630 falls within the portion of the 3D space captured by the frame 1628 and thus passes the out-of-frame 1602 evaluation. If one or more 2D locations onto which the vertices are projected are not within the boundaries of the frame 1628, the texture scoring module 1549 may determine that the face 1630 falls outside the portion of the 3D space captured by the frame 1628 and thus does not pass the out-of-frame 1602 evaluation.

Evaluations 1614 also include an occlusion 1604 evaluation that determines whether a surface represented by the face 1630 is occluded or visible within the frame 1628. If the surface represented by the face 1630 is not occluded in the frame 1628 by one or more other surfaces, the face 1630 passes the occlusion 1604 evaluation. If the surface represented by the face 1630 is occluded in the frame 1628 by one or more other surfaces, the face 1630 does not pass the occlusion 1604 evaluation.

In some implementations, the texture scoring module 1549 performs occlusion 1604 evaluation using a ray casting technique. During the ray casting technique, the texture scoring module 1549 creates a grid (e.g., 10×10, 15×20, 20×20, 100×100, etc.) of 2D points in the frame 1628 (e.g., as (x, y) pixel locations in the frame 1628). Next, texture scoring module 1549 may convert each point in the grid into clip space (e.g., a value bounded by −1 and 1 in the x– and y-axes) by calculating the coordinates of the point in clip space as ((2*x/width)−1, 1−(2*y /height)), where "x" is the x-coordinate of the point in the frame 1628, "y" is the y-coordinate of the point in frame 1628, "width" is the pixel width of the frame 1628, and "height" is the pixel height of the frame 1628. The texture scoring module 1549 may multiply the inverse of the projection matrix for imaging sensor 726 by the point in clip space to generate a ray in the "view space" of imaging sensor 726 and multiply the inverse of the view matrix associated with the imaging sensor 726 by the ray in view space to obtain the ray in the 3D "world space" of the 3D representation. The texture scoring module 1549 may identify one or more mesh faces that intersect the ray and sort the intersecting mesh faces by distance from the imaging sensor 726. If the sorted mesh faces indicate that the face 1630 is closest to the imaging sensor 726, the texture scoring module 1549 may determine that the face 1630 is not occluded and thus passes the occlusion 1604 evaluation. If the sorted mesh faces indicate that the face 1630 is not closest to the imaging sensor 726, the texture scoring module 1549 may determine that the face 1630 is occluded and thus does not pass the occlusion 1604 evaluation.

In some implementations, the texture scoring module 1549 performs the occlusion 1604 evaluation using a depth matte technique, which utilizes a depth matte associated with the frame 1628 that is generated by the depth sensor 724. The depth matte includes depth values representing estimated distances from the imaging sensor 726 to surfaces captured by the frame 1628. During the depth matte technique, the texture scoring module 1549 may project 2D locations of pixels associated with depth values in the depth matte onto a 3D space occupied by the mesh to generate 3D locations corresponding to the pixel locations. The texture scoring module 1549 may then identify a subset of vertices and/or faces in the mesh that are closest to the 3D locations. If the face 1630 is included in the subset of closest faces, the texture scoring module 1549 may determine that the face 1630 is not occluded and thus passes the occlusion 1604 evaluation. If the face 1630 is not included in the subset of closest faces, the texture scoring module 1549 may determine that the face 1630 is occluded and thus does not pass the occlusion 1604 evaluation. The depth matte technique for occlusion detection is described in further detail below with respect to FIG. 17.

In some implementations, the texture scoring module 1549 includes functionality to selectively combine different techniques for performing the occlusion 1604 evaluation. For example, the texture scoring module 1549 may use the depth matte technique to perform efficient occlusion 1604 evaluation for regions of the frame 1628 that are not associated with significant differences in depth (g as determined using the depth matte for the frame 1628). Texture scoring module 1549 could alternatively use the ray casting technique to perform more precise occlusion 1604 evaluation for regions of the frame 1628 that include greater differences in depth.

Evaluations 1614 further include a facing away 1606 evaluation that determines whether the face 1630 is angled toward the imaging sensor 726 or away from the imaging sensor 726. If the face 1630 is angled toward the imaging sensor 726, the face 1630 passes the facing away 1606 evaluation. If the face 1630 is angled away from the imaging sensor 726, the face 1630 does not pass the facing away 1606 evaluation. The texture scoring module 1549 may perform the facing away 1606 evaluation by examining the normal vector associated with the face. If the normal vector points away from the imaging sensor 726, the face 1630 is not angled toward the imaging sensor 726 and thus does not pass the facing away 1606 evaluation. If the normal vector points toward the imaging sensor 726, the face 1630 is angled toward the imaging sensor 726 and thus passes the facing away 1606 evaluation.

Finally, evaluations 1614 include an age 1608 evaluation, which is performed by comparing an age of the frame 1628 with a threshold. The age of the frame 1628 can be represented by an elapsed time since the frame 1628 was captured, a number of texturing intervals elapsed since the frame 1628 was captured, and/or another representation. If the age exceeds the threshold, frame 1628 does not pass age 1608 evaluation. If the age does not exceed the threshold, frame 1628 passes the age evaluation.

If frame 1628 and/or face 1630 do not pass any of the out-of-frame 1602, occlusion 1604, or facing away 1606 evaluations, the texture scoring module 1549 assigns a negative fulfillment score 1610 to frame 1628 and face 1630. This negative fulfillment score 1610 indicates that frame 1628 is not suitable for use as a texture for face 1630 and effectively prevents frame 1628 from being considered for use in texturing face 1630. After negative fulfillment score 1610 is assigned to a combination of a given frame 1628 and a given face 1630, texture scoring module 1549 discontinues additional processing or scoring related to the combination of the frame 1628 and the face 1630.

If the frame 1628 does not pass the age 1608 evaluation, the texture scoring module 1549 assigns a negative contribution 1612 to a fulfillment score 1618 for the combination of the frame 1628 and the face 1630. For example, the texture scoring module 1549 may assign a fixed negative contribution 1612 once the frame 1628 is determined to not pass the age 1608 evaluation. In another example, the texture scoring module 1549 may scale the negative contribution 1612 based on the extent to which the age of the frame 1628 exceeds a threshold. When the fulfillment score 1618 is associated with the negative contribution 1612, the texture scoring module 1549 performs additional evaluations 1616 related to the frame 1628 and the face 1630 to determine a value of the fulfillment score 1618 that includes the negative contribution 1612. Thus, unlike the out-of-frame 1602, occlusion 1604, or facing away 1606 evaluations, the age 1608 evaluation acts as a "soft" filter that reduces the likelihood that the frame 1628 is used as a texture for the face 1630 instead of a "hard" filter that precludes use of the frame 1628 as a texture for the face 1630.

If the frame 1628 passes all evaluations 1614, the texture scoring module 1549 generates the fulfillment score 1618 based on the additional evaluations 1616. As shown in FIG. 16, evaluations 1616 include an angle to camera 1622 evaluation that determines the angle of the face 1630 to the imaging sensor 726. During the angle of camera 1622 evaluation, texture scoring module 1549 may calculate the dot product between the normal vector for the face 1630 and the vector from the imaging sensor 726 to the face 1630. The texture scoring module 1549 may also divide the dot product by the product of the magnitudes of the two vectors to obtain the cosine of the angle between the two vectors. Because the angle to camera 1622 evaluation is performed after the frame 1628 and the face 1630 have passed the facing away 1606 evaluation, the cosine of the angle may range from 0 to 1. Further, a cosine value that is closer to 1 indicates a smaller angle between the face 1630 and the imaging sensor 726, and a cosine value that is closer to 0 indicates a larger angle between the face 1630 and the imaging sensor 726.

Evaluations 1616 also include a distance to camera 1624 evaluation that determines the distance of the face 1630 to the imaging sensor 726 at the time at which the frame 1628 was captured. The texture scoring module 1549 may perform the distance to camera 1624 evaluation by calculating the distance between the 3D location of the face 1630 and the 3D location of the imaging sensor 726 at the time at which the frame 1628 was captured.

Evaluations 1616 additionally include a sharpness 1626 evaluation that estimates the amount of blur in the frame 1628. The texture scoring module 1549 may perform the sharpness 1626 evaluation by computing the variance of the Laplacian of frame 1628, analyzing the Fast Fourier Transform (FFT) of the frame, and/or using another blur detection technique.

The texture scoring module 1549 then combines the results of the angle to camera 1622, distance to camera 1624, and sharpness 1626 evaluations 1616 into the fulfillment score 1618 associated with the frame 1628 and face 1630. In some implementations, the texture scoring module 1549 converts the results of angle to camera 1622, distance to camera 1624, and sharpness 1626 evaluations 1616 into sub-scores and calculates the fulfillment score 1618 as a weighted combination of the sub-scores.

For example, the texture scoring module 1549 may use the cosine value produced by the angle to camera 1622 evaluation directly as a first sub-score associated with the angle to camera 1622 evaluation. The texture scoring module 1549 may also calculate a second sub-score ranging from 0 to 1 for the distance to camera 1624 evaluation. The second sub-score may be inversely proportional to the distance between the face 1630 and the imaging sensor 726 at the time at which the frame 1628 was captured, so that a shorter distance between the face 1630 and the imaging sensor 726 results in a higher second sub-score and a greater distance between the face 1630 and the imaging sensor 726 results in a lower second sub-score. The texture scoring module 1549 may further calculate a third sub-score for the sharpness 1626 evaluation as a value between 0 and 1, where a lower value for the third sub-score indicates a greater amount of blur in the frame 1628 and a higher value for the third sub-score indicates a lower amount of blur in the frame 1628. The texture scoring module 1549 may then calculate the fulfillment score 1618 representing the quality of a texture generated from the frame 1628 for the face 1630 as a sum of the sub-scores multiplied by respective weights, where each weight determines the contribution of the corresponding sub-score to the fulfillment score 1618. A higher fulfillment score 1618 indicates a higher quality texture produced from the frame 1628 for the face 1630, and a lower fulfillment score 1618 indicates a lower quality texture produced from the frame 1628 for the face 1630.

If the frame 1628 and face 1630 do not pass the age 1608 evaluation, the texture scoring module 1549 also updates the fulfillment score 1618 to reflect the corresponding negative contribution 1612. Continuing with the above example, the texture scoring module 1549 may subtract the magnitude of the negative contribution 1612 from the weighted sum of sub-scores to produce the fulfillment score 1618. Thus, while the negative contribution 1612 negatively impacts the fulfillment score 1618, the fulfillment score 1618 may still indicate that the frame 1628 represents a high quality texture for the face 1630 when the sub-scores associated with the angle to camera 1622, distance to camera 1624, and sharpness 1626 evaluations 1616 are high.

After fulfillment scores are calculated between the face 1630 and all frames in the frame list 1544, the texture scoring module 1549 uses the fulfillment scores to select a given frame 1628 from the frame list as a texture for the face 1630. Continuing with the above example, the texture scoring module 1549 may select the frame 1628 associated with the highest fulfillment score 1618 as the texture for the face 1630. In another example, if the fulfillment score 1618 is inversely proportional to the quality of the corresponding frame 1628 as a texture for the face 1630, the texture scoring module 1549 may select the frame 1628 with the lowest fulfillment score as the texture for the face 1630.

Figure 17:
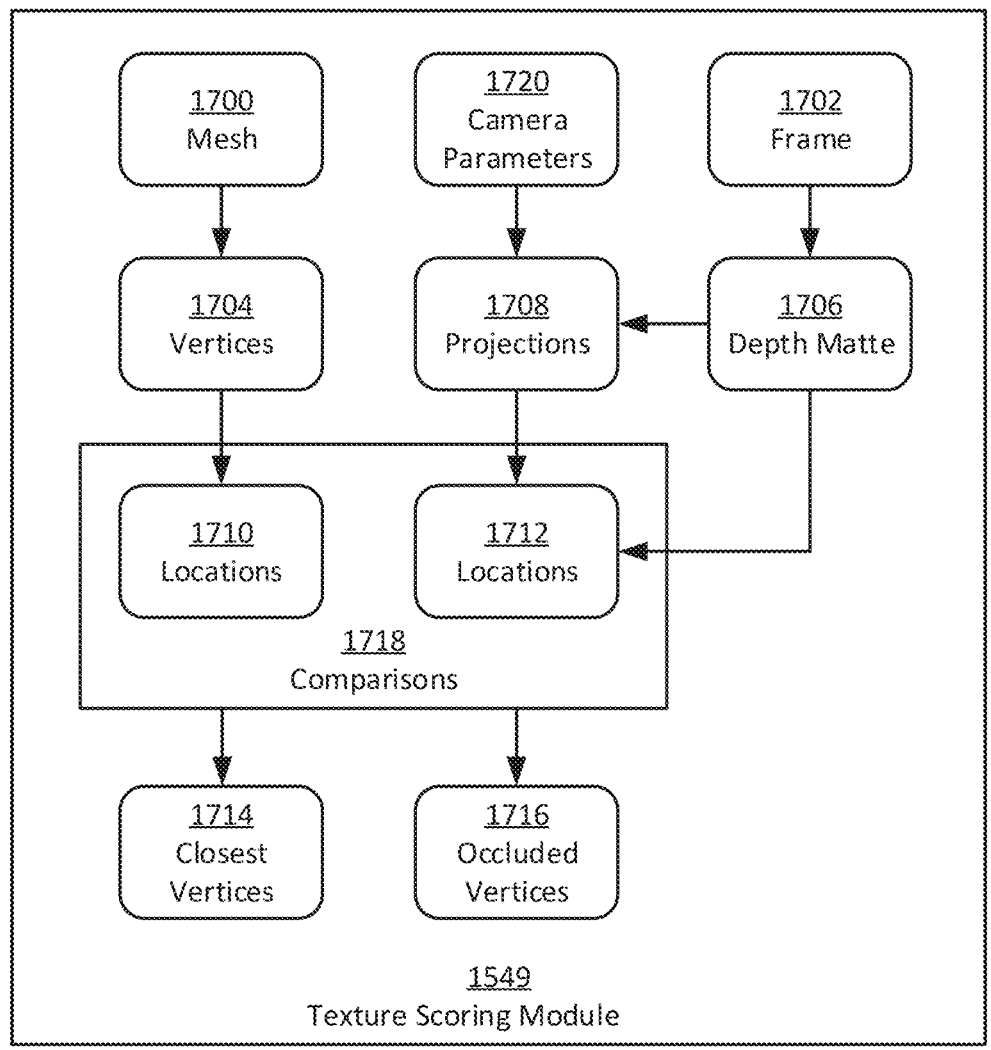
FIG. 17 illustrates an occlusion detection technique performed by the texture scoring module of FIG. 15, in accordance with example implementations.

FIG. 17 illustrates an occlusion detection technique performed by the texture scoring module 1549 of FIG. 15, in accordance with example implementations. More specifically, FIG. 17 illustrates the depth matte technique for detecting occlusions in a mesh 1700 that includes vertices 1704 with locations 1710 in a 3D space scanned by the depth sensor 724. As mentioned above, the depth matte technique uses a depth matte 1706 associated with a frame 1702 captured by the imaging sensor 726. The depth matte 1706 may be generated by the depth sensor 724 and include estimated depths for some or all pixels in the frame 1702. These estimated depths may represent distances from the imaging sensor 726 at the time the frame 1702 was captured to one or more surfaces that are visible in the frame 1702 and represented by some or all vertices 1704 in the mesh 1700.

The texture scoring module 1549 uses camera parameters 1720 associated with the imaging sensor 726 to generate projections 1708 of the pixel locations and depths in the depth matte 1706 into locations 1712 in the 3D space occupied by the vertices 1704 in the mesh 1700. For example, the camera parameters 1720 may include a 3D position and orientation of the imaging sensor 726, a camera model, a focal length, a principal point, one or more skew coefficients, one or more distortion coefficients, and/or other information that can be used to relate the 2D pixel locations in the frame 1702 to 3D locations 1712 in the 3D space. The texture scoring module 1549 may use the camera parameters 1720 to perform backward projections 1708 of pixel coordinates with depth values in depth matte 1706 onto 3D locations 1712 in the 3D space occupied by the mesh 1700.

The texture scoring module 1549 then performs comparisons 1718 of the locations 1712 onto which pixel locations and depth values in depth matte 1706 are projected with locations 1710 of vertices 1704 in the mesh 1700 in the same 3D space. During comparisons 1718, the texture scoring module 1549 divides the vertices 1704 in the mesh 1700 into a set of closest vertices 1714 in the mesh 1700 to the frame 1702 and a set of occluded vertices 1716 that are hidden from view in the frame 1702. For example, the texture scoring module 1549 may identify the closest vertices 1714 as a subset of vertices 1704 in the mesh 1700 with locations 1710 that are within a threshold distance of the 3D locations 1712 onto which points in the depth matte 1706 are projected. The texture scoring module 1549 may then identify the occluded vertices 1716 as all other vertices 1704 in the mesh 1700.

The texture scoring module 1549 uses the identified sets of closest vertices 1714 and occluded vertices 1716 to determine whether or not a given face in the mesh 1700 is occluded in the frame 1702. For example, the texture scoring module 1549 may determine that a face in the mesh 1700 is not occluded when all vertices in the face are in the set of closest vertices 1714. Conversely, the texture scoring module 1549 may determine that the face is occluded when one or more vertices in the face are in the set of occluded vertices 1716.

Figure 18:
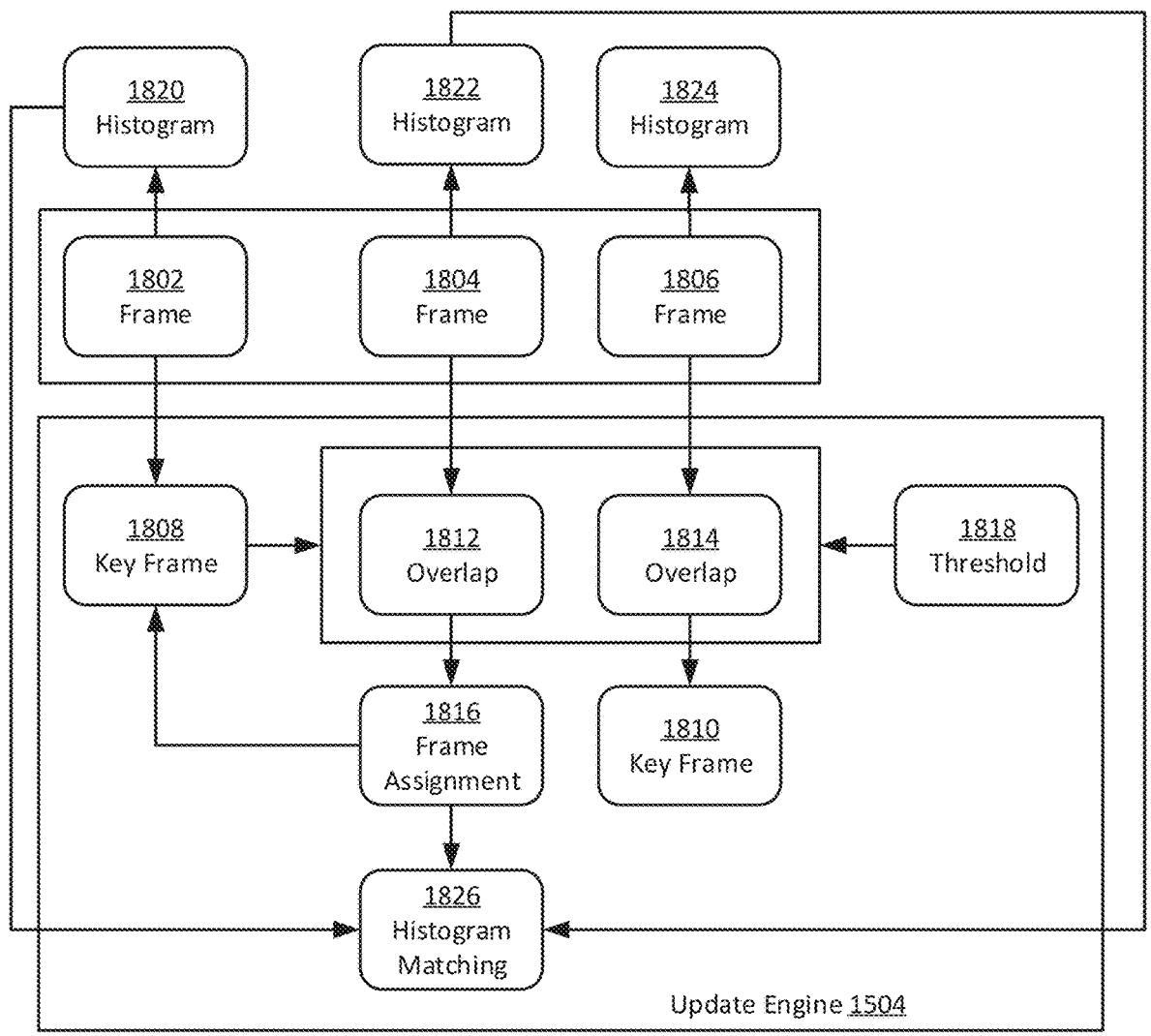
FIG. 18 illustrates a more detailed view of the update engine of FIG. 15, in accordance with example implementations.

FIG. 18 illustrates a more detailed view of the update engine 1504 of FIG. 15, in accordance with example implementations. More specifically, FIG. 18 illustrates the operation of update engine 1504 in generating histogram-matched frames 1562 within the frame list 1544. As shown in FIG. 18, the update engine 1504 receives a series of frames 1802-1806 to be included in the frame list 1544. For example, the update engine 1504 may select frames 1802-1806 for inclusion in the frame list 1544 after determining that overall fulfillment scores for the frames 1802-1806 meet or exceed a threshold.

To reduce patchiness in textures generated from the frames 1802-1806, the update engine 1504 performs histogram matching 1824 associated with frames 1802-1806. First, the update engine 1504 selects a first frame 1802 in the series as a key frame 1808 based on a lack of overlap with other key frames in the frame list 1544. For example, the update engine 1504 may select the frame 1802 as a first key frame 1808 in the frame list when the frame 1802 is the first frame selected for inclusion in the frame list 1544 and/or after all existing key frames in the frame list 1544 have been discarded (e.g., after a histogram matching interval has lapsed since the last set of key frames was selected).

After the second frame 1804 in the series is selected for inclusion in the frame list 1544, the update engine 1504 compares an overlap 1812 between the first frame 1802 and the second frame 1804 to a threshold 1818. For example, the update engine 1504 may calculate a visual overlap 1812 between the two frames 1802-1804 and compare the overlap 1812 to a numeric, percentage, and/or another threshold 1818.

After determining that the overlap 1812 meets or exceeds the threshold 1818, the update engine 1504 performs a frame assignment 1816 of the second frame 1804 to the key frame 1808 represented by the first frame 1808. The update engine 1504 also performs histogram matching 1826 that adjusts a distribution of pixel attributes (e.g., tone values) in a histogram 1822 associated with the second frame 1804 to match the distribution of pixel attributes in a histogram 1820 associated with the key frame 1808.

After the third frame 1806 in the series is selected for inclusion in the frame list 1544, the update engine 1504 compares an overlap 1814 between the first frame 1802 and the third frame 1806 to the same threshold 1818. After determining that the overlap 1814 does not exceed the threshold 1818, the update engine 1504 selects the third frame 1806 as another key frame 1810. Because the third frame 1806 is a different key frame 1810 from the first frame 1802, the update engine 1504 does not perform histogram matching between a histogram 1824 for the third frame 1806 and the histogram 1820 for the first frame 1802.

The update engine 1504 may continue using overlap between subsequent frames in the series and existing key frames 1808-1810 to identify each subsequent frame as an additional key frame or assign the subsequent frame to an existing key frame. For each frame that is assigned to a corresponding key frame, the update engine 1504 performs histogram matching that adjust a distribution of pixel attributes in the assigned frame to match the distribution of pixel attributes in the corresponding key frame.

The update engine 1504 may additionally discard one or more existing key frames on a periodic basis to allow histogram matching to be performed using newer frames in the frame list 1544. For example, the update engine 1504 may remove all existing key frames after a histogram matching interval has lapsed since the last key frame was selected. In another example, the update engine 1504 may remove a frame as a key frame after the frame is discarded from the frame list 1544 and/or after the frame has been used as a key frame for a certain amount of time. This removal of existing key frames allows histogram matching performed by the update engine 1504 to reflect newer frames and/or frames with different tonal distributions than previous key frames.

Figure 19:
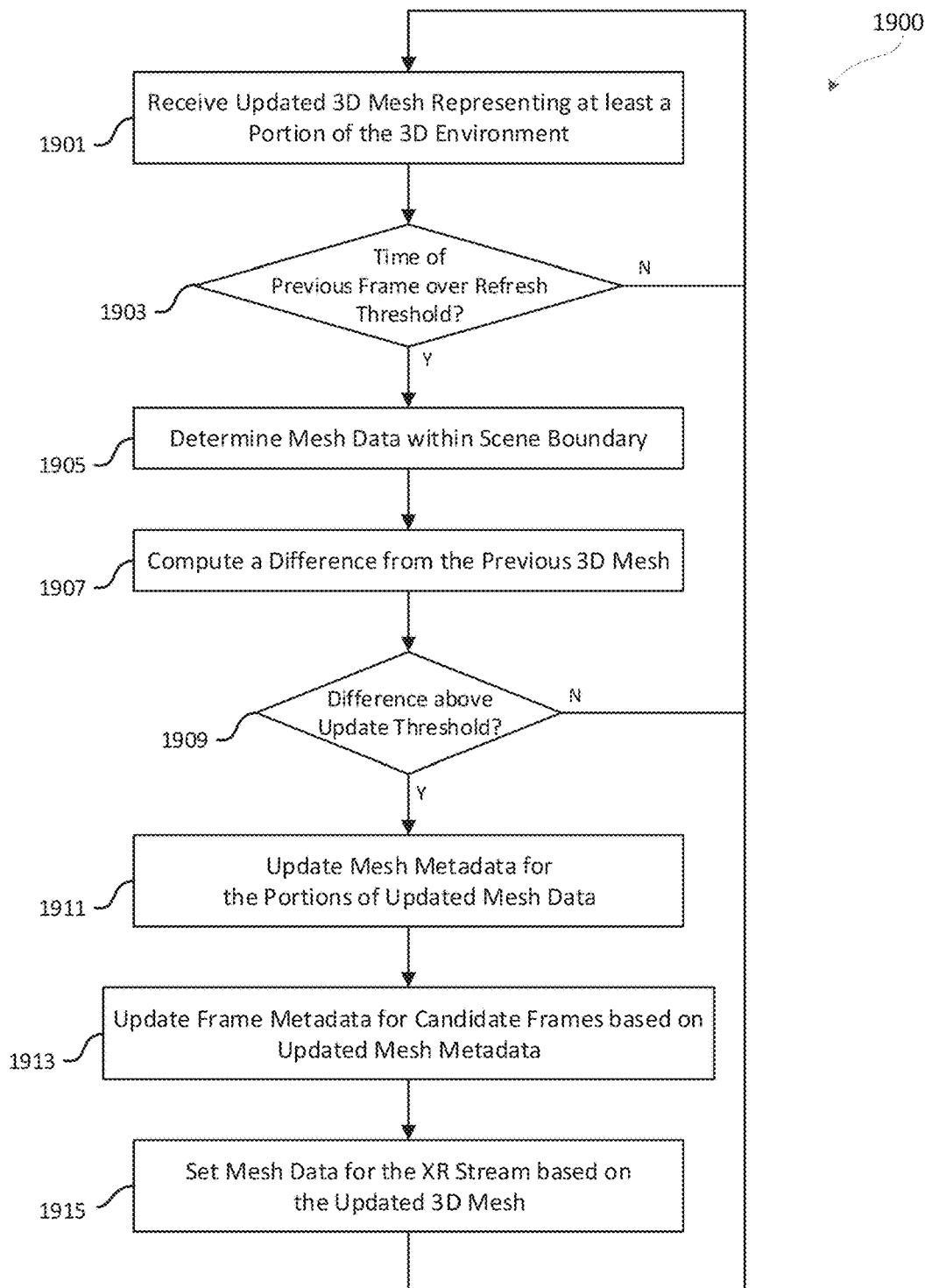
FIG. 19 sets forth a flow diagram of method steps for updating a mesh representing a 3D environment, in accordance with example implementations.

FIG. 19 sets forth a flow diagram of method steps for updating a mesh representing a 3D environment, in accordance with example implementations. Although the method steps are described in conjunction with FIGS. 1-18, persons of ordinary skill in the art will understand that any system configured to perform this method and/or other methods described herein, in any order, and in any combination not logically contradicted, is within the scope of the present invention.

At step 1901, the update engine 1504 receives an updated mesh representing at least a portion of a 3D environment. In various embodiments, a mesh update module 1546 included in the update engine 1504 receives updated meshes and/or mesh data 1520 that is generated by the scanning engine 1502 when the depth sensor 724 periodically scans the physical space and acquires updated depth sensor data.

At step 1903, the update engine 1504 determines whether the time elapsed since processing the previous frame has exceed a mesh refresh threshold. In various embodiments, the mesh update module 1546 may receive multiple sets of updated mesh data 1520 from the scanning engine 1502 generating an updated mesh periodically (every 10 seconds). In such instances, the mesh update module 1546 may maintain a mesh refresh threshold to determine when to process data associated with an updated mesh. In such instances, the mesh update module 1546 may first determine the time elapsed since the mesh update module 1546 previously processed an updated mesh. The mesh update module 1546 may compare the elapsed time to the mesh refresh threshold. When the mesh update module 1546 determines that the elapsed time is below the threshold, the mesh update module 1546 does not process the updated mesh and returns to step 1901; otherwise, the mesh update module 1546 determines that the elapsed time exceeds the mesh refresh threshold and proceeds to step 1905.

At step 1905, the update engine 1504 determines the mesh data 1520 for the updated mesh that is included in a scene boundary. In various embodiments, the mesh update module 1546 may process the updated mesh data 1520 by initially setting a scene boundary. In such instances, the mesh update module 1546 may analyze the updated mesh data 1520 that is within the scene boundary. In some embodiments, the host user may set the scene boundary when performing an initial scan of the physical space. In some embodiments, the mesh update module 1546 may compare the coordinates of the vertices 1522 to the coordinates that define the edges of the scene boundary, and may filter any vertices 1522 and/or any faces 1524 that are positioned outside of the scene boundary.

At step 1907, the update engine 1504 computes a difference between the updated mesh and the previous mesh. In various embodiments, the mesh update module 1546 may generate one or more values associated with characteristics of a given mesh. Such values may include metrics that characterize the mesh, such as a curvature index (associated with a function of the two principal curvatures of the surface of the mesh), a distance index (associated with functions based on distances between points on multiple faces of the mesh), and/or a volume index (associated with a function of volumes of portions within the mesh). The mesh update module 1546 may compute a difference value based on the difference between respective indices associated with the updated mesh data and the previous mesh data (e.g., computing a difference between volume indices). Alternatively, the mesh update module 1546 may compute other values, such a Hausdorff distance between the updated mesh and the previous mesh. In such instances, the mesh update module 1546 may compute the Hausdorff distance between faces 1524 for the updated mesh and faces of the previous mesh. The mesh update module 1546 may generate a difference value based on the computed metrics.

At step 1909, the update engine 1904 compares the difference value to an update threshold. In various embodiments, the mesh update module 1546 may compare the computed difference value to an update threshold. In such instances, the mesh update module 1546 may refrain from further processing updated mesh data 1520 for a mesh that has a difference value below the update threshold. In such instances, the mesh update module 1546 determines that because the difference value falls below the update threshold, the updated mesh is not a significant change to the previous mesh and the host device 106(1) does not need to provide the updated mesh to the recipients. When the mesh update module 1546 determines that the difference value exceeds the update threshold, the mesh update module 1546 determines that the updated mesh is a significant change to the representation of the physical space and proceeds to step 1911; otherwise, the mesh update module 1546 determines that the difference value is below the update threshold and refrains from processing the mesh, returning to step 1901.

At step 1911, the update engine 1504 updates the mesh metadata 1548 for the portions of the updated mesh. In various embodiments, when the updated mesh represents a significant change from the previous mesh, the mesh update module 1546 updates the mesh metadata 1548 based on the updated mesh data 1520. In some embodiments, the mesh metadata 1548 includes values associated with specific mesh components, such as specific mesh metadata 1548 that is assigned to each face 1524. In such instances, the mesh update module 1546 may update the mesh metadata 1548 based on the faces 1524 included in the updated mesh data 1520. In some embodiments, a subset of the faces 1524 differ in the updated mesh data from the faces included in the previous mesh data. In such instances, the mesh update module 1546 may update the mesh metadata 1548 subset of differing faces while the mesh metadata 1548 for the unaltered faces 1524 remain unchanged.

At step 1913, the update engine 1504 optionally updates one or more candidate frames that are in the frame list 1544 based on the updated mesh metadata 1548. In various embodiments, the mesh update module 1546 may optionally cause the texture scoring module 1549 to update one or more fulfillment scores for the current frame and/or one or more candidate frames identified in the frame list 1544 with respect to the portions of the updated mesh. In such instances, the texture scoring module 1549 may respond by recalculating fulfillment scores for a given frame based on updated values included in the mesh metadata 1548.

At step 1915, the update engine 1504 may optionally sets the mesh data for an XR stream based on the updated mesh. In various embodiments, the mesh update module 1546 may respond to the updated fulfillment scores associated with the portion of the updated mesh by causing the texturing engine 1506 to assign a particular frame (e.g., a candidate frame identified in the frame list 1544) to the portion of the updated mesh. In such instances, texture data from the frame may be correlated to the portion of the updated mesh and included in an XR stream that is transmitted to recipients of the remote collaboration session.

Figure 20:
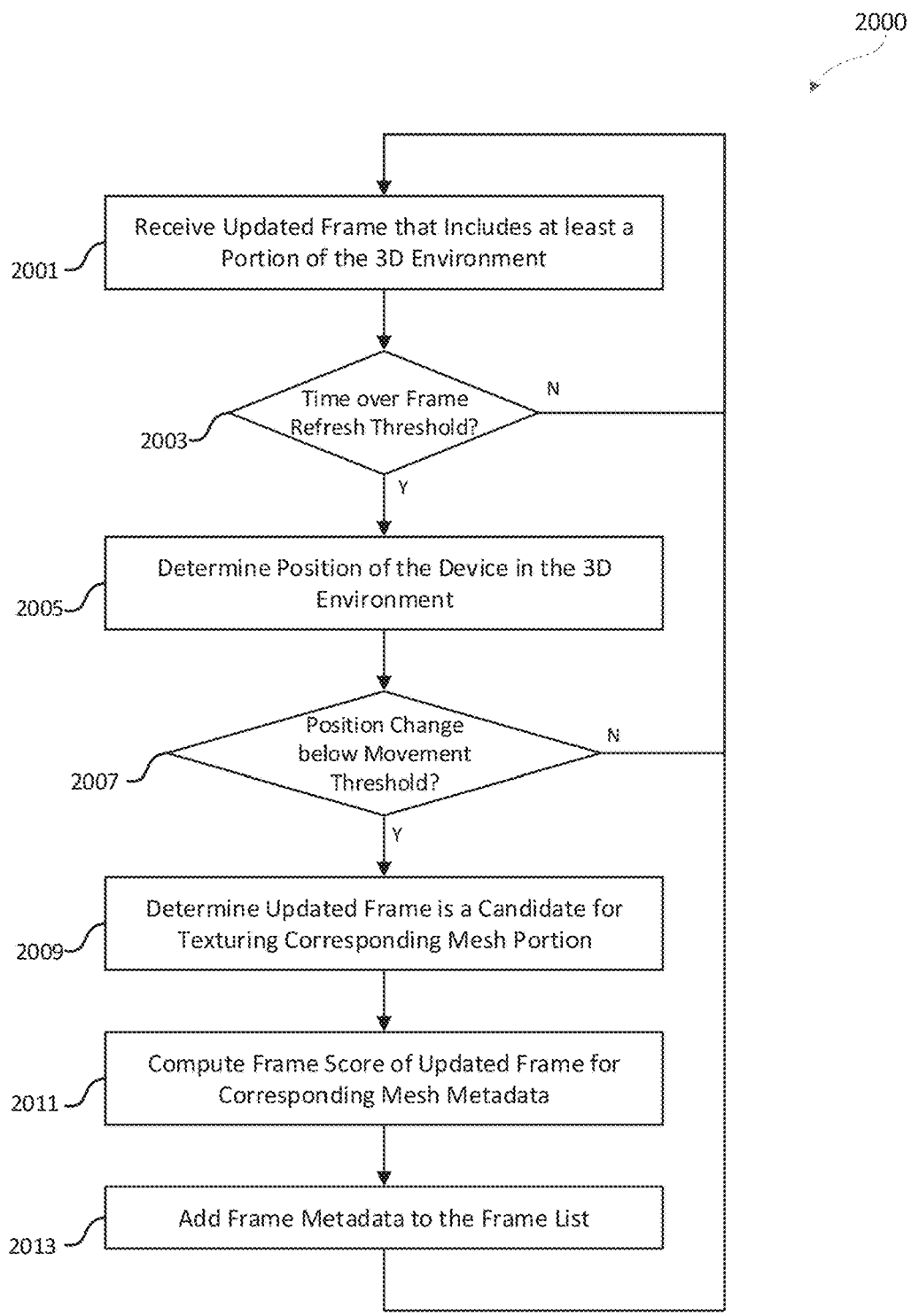
FIG. 20 sets forth a flow diagram of method steps for updating frames associated with a mesh representing a 3D environment, in accordance with example implementations.

FIG. 20 sets forth a flow diagram of method steps for updating frames associated with a mesh representing a 3D environment, in accordance with example implementations. Although the method steps are described in conjunction with FIGS. 1-18, persons of ordinary skill in the art will understand that any system configured to perform this method and/or other methods described herein, in any order, and in any combination not logically contradicted, is within the scope of the present invention.

At step 2001, the update module 1504 receives an updated frame that includes at least a portion of the 3D environment. In various embodiments, the frame update module 1542 included in the update engine 1504 processes the one or more updated frames 1514 that are generated by the scanning engine 1502 when the imaging sensor 726 periodically scans the physical space and acquires updated image sensor data. In some embodiments, the scanning engine 1502 may also generate frame metadata that corresponds with each of the updated frames 1514.

At step 2003, the update module 1504 determines whether a time elapsed since a frame was previously processed exceeds a frame refresh threshold. In various embodiments, the frame update module 1542 may maintain a frame refresh threshold to manage the quantity of received updated frames 1514 that the frame update module 1542 processes. The frame update module 1542 may determine the time elapsed since the frame update module 1542 previously processed an updated frame 1514. The frame update module 1542 may compare the elapsed time to the frame refresh threshold. When the frame update module 1542 determines that the elapsed time has not exceeded the frame refresh threshold, the frame update module 1542 refrains from processing the corresponding frame metadata and returns to step 2001. Otherwise, when the frame update module 1542 determines that the elapsed time has exceeded the threshold, the frame update module 1542 proceeds to step 2005.

At step 2005, the frame update module 1542 determines the position of a device in the 3D environment with respect to the updated frame. In various embodiments, the frame update module 1542 may process a given frame 1514 and generate and/or update associated frame metadata for the given frame 1514. The frame metadata include the position and orientation of the imaging sensor 726 when the image sensor data was acquired to generate the updated frame 1514.

At step 2007, the frame update module 1542 may determine whether the position change represented by the updated frame is below a movement threshold. In various embodiments, the frame update module 1542 may compare the position and/or orientation values that are associated with an updated frame 1514 to the position and/or orientation values that are associated with the previous frame. In some embodiments, the frame update module 1542 may compute a position change value based on differences in position values and orientation values in the respective frame metadata for the updated frame 1514 and the previous frame. The frame update module 1542 may compare the computed position change value to a movement threshold. When the frame update module 1542 determines that the position change value exceeds the movement threshold, the frame update module 1542 discards the updated frame 1514 and returns to step 2001. Otherwise, the frame update module 1542 may determine that the position change value falls below the movement threshold and proceeds to step 2007.

At step 2009, the update engine 1504 determines that the updated frame is a candidate for texturing a corresponding portion of the mesh. In various embodiments, the frame update module 1542 may determine that a frame is a candidate frame for texturing a portion of the mesh upon determining that the position change is below the movement threshold and is likely not to be blurry. In some embodiments, the frame update module 1542 may also determine that the updated frame is a candidate frame by determining that the position change is above a threshold, indicating a dissimilarity from the previous frame and likely to include a significant change to the texture data.

At step 2011, the update engine 1504 computes a frame score for the updated frame 1514 for corresponding portions of the mesh metadata 1548. In some embodiments, the frame update module 1542 may cause the texture scoring module 1549 to compute fulfillment scores for a candidate frame. In such instances, the texture scoring module 1549 may perform one or more evaluations of the candidate frame in relation to a given face 1524 in the updated mesh data 1520 and, based on the one or more evaluations, generate a fulfillment score for the frame in relation to a given face 1524. The frame update module 1542 stores the respective fulfillment scores (where the frame score is a set of fulfillment scores) in the frame metadata corresponding to the updated frame 1514.

At step 2013, the update engine 1504 stores the frame metadata in the frame list 1544. In various embodiments, upon the texture scoring module 1549 calculating fulfillment scores for a given candidate frame, the frame update module 1542 may store the frame metadata that stores the fulfillment scores in the frame list 1544. In such instances, one or more modules included in the update engine and/or the texturing engine 1506 may process the frame metadata stored in the frame list in order to identify candidate frames that are to provide texture data for portions of the updated mesh.

Figure 21:
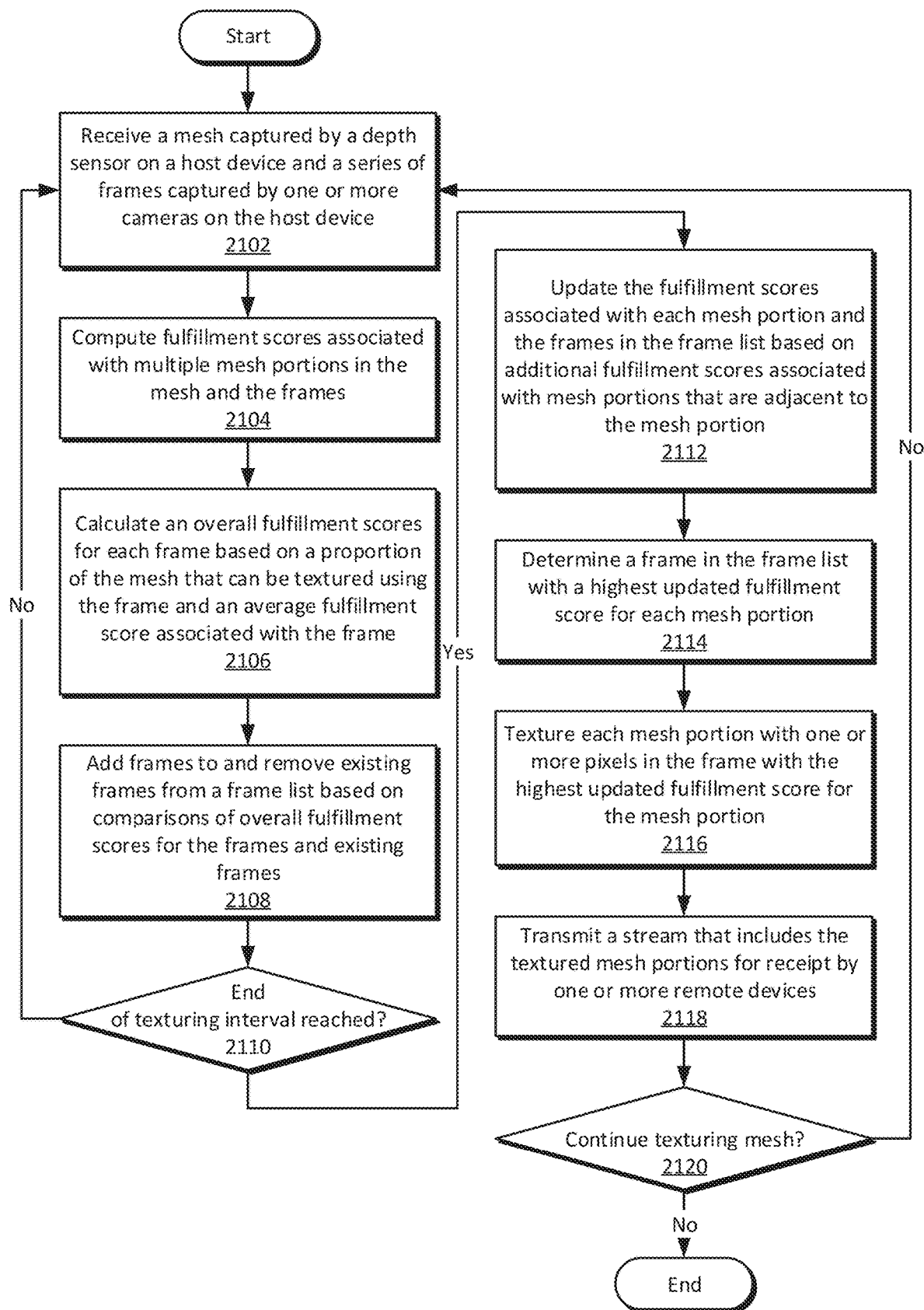
FIG. 21 sets forth a flow diagram of method steps for texturing a mesh representing a 3D environment, in accordance with example implementations.

FIG. 21 sets forth a flow diagram of method steps for texturing a mesh representing a 3D environment, in accordance with example implementations. Although the method steps are described in conjunction with FIGS. 1-15, persons of ordinary skill in the art will understand that any system configured to perform this method and/or other methods described herein, in any order, and in any combination not logically contradicted, is within the scope of the present invention.

As shown, in step 2102, the texturing engine 1506 receives a mesh captured by a depth sensor on a host device and a series of frames captured by one or more cameras on the host device. For example, the texturing engine 1506 may receive updates to the mesh as captured by a LiDAR sensor. The texturing engine 1506 may also receive the series of frames from the camera(s) concurrently with updates to the mesh.

In step 2104, the texturing engine 1506 computes fulfillment scores associated with multiple mesh portions in the mesh and the frames, as described in further detail below with respect to FIG. 22. Each fulfillment score represents the quality of a frame as a texture for a face and/or another mesh portion within the mesh.

In step 2106, the texturing engine 1506 calculates an overall fulfillment score for each frame based on a proportion of the mesh that can be textured using the frame and an average fulfillment score associated with the frame. For example, the texturing engine 1506 may calculate the average fulfillment score associated with the frame and all mesh portions in the mesh that have "valid" (e.g., positive) fulfillment scores for the frame. The texturing engine may then multiply the average fulfillment score by the proportion of the mesh that is associated with the valid fulfillment scores.

In step 2108, the texturing engine 1506 adds frames to and removes existing frames from a frame list based on comparisons of overall fulfillment scores for the frames and the existing frames. For example, the texturing engine 1506 may add a frame received in step 2102 to the frame list when the overall fulfillment score for the frame is higher than at least one overall fulfillment score for an existing frame in the frame list. When a frame is added to the frame list, the texturing engine 1506 may optionally remove an existing frame with the lowest overall fulfillment score from the frame list to prevent the frame list from exceeding a maximum number of frames. Conversely, the texturing engine 1506 may omit adding a frame received in step 2102 to the frame list when the overall fulfillment score of the frame is lower than the overall fulfillment scores of all existing frames in the frame list and/or when the overall fulfillment score of the frame is lower than a threshold.

In step 2110, the texturing engine 1506 determines whether or not an end of a texturing interval is reached. For example, the texturing engine 1506 may determine whether or not a certain amount of time has elapsed since the last time the mesh was textured. If the end of the texturing interval is not reached, the texturing engine 1506 repeats steps 2102-2108 to update the frame list with newer frames and/or frames that represent higher quality textures for mesh portions in the mesh.

After the texturing engine 1506 determines that the end of the texturing interval is reached, in step 2112, the texturing engine 1506 proceeds to step 2112. In step 2112, the texturing engine 1506 updates the fulfillment scores associated with each mesh portion and the frames in the frame list based on additional fulfillment scores associated with mesh portions that are adjacent to the mesh portion. For example, the texturing engine 1506 may calculate an updated fulfillment score associated with a mesh portion and a frame as a weighted combination of the current fulfillment score for the mesh portion and the frame and the average fulfillment score for the same frame and one or more mesh portions that are adjacent to (or optionally nearby) the mesh portion.

In step 2114, the texturing engine 1506 determines a frame in the frame list with a highest updated fulfillment score for each mesh portion. In step 2116, the texturing engine 1506 textures each mesh portion with one or more pixels in the frame with the highest updated fulfillment score for the mesh portion. For example, the texturing engine 1506 may texture the mesh portion with the frame by assigning the frame as a texture for the mesh portion, calculating pixel locations in the frame that correspond to texture coordinates for the face, and storing an identifier for the frame and the texture coordinates in material and/or texture data for the mesh portion.

In step 2118, the texturing engine 1506 transmits a stream that includes the textured mesh portions generated in step 2116 for receipt by one or more remote devices. For example, the texturing engine 1506 may transmit the stream to a distributed messaging system for receipt by one or more remote devices. The remote device(s) may then render the textured mesh portions in an extended reality application and/or augmented reality environment, thereby providing users of the remote device(s) with a 3D representation of the physical space that is textured using the most recent frames captured by the image sensor.

In step 2120, the texturing engine 1506 determines whether or not to continue texturing the mesh. For example, the texturing engine 1506 may continue texturing the mesh while a 3D representation of the physical space is continually captured and transmitted to the remote device(s). If texturing of the mesh is to continue, the texturing engine 1506 repeats steps 2102-2118 one or more times until step 2120 is reached again. If the texturing engine 1504 determines at step 2120 that texturing of the mesh is to be discontinued, the texturing engine 1506 stops repeating steps 2102-2118.

Figure 22:
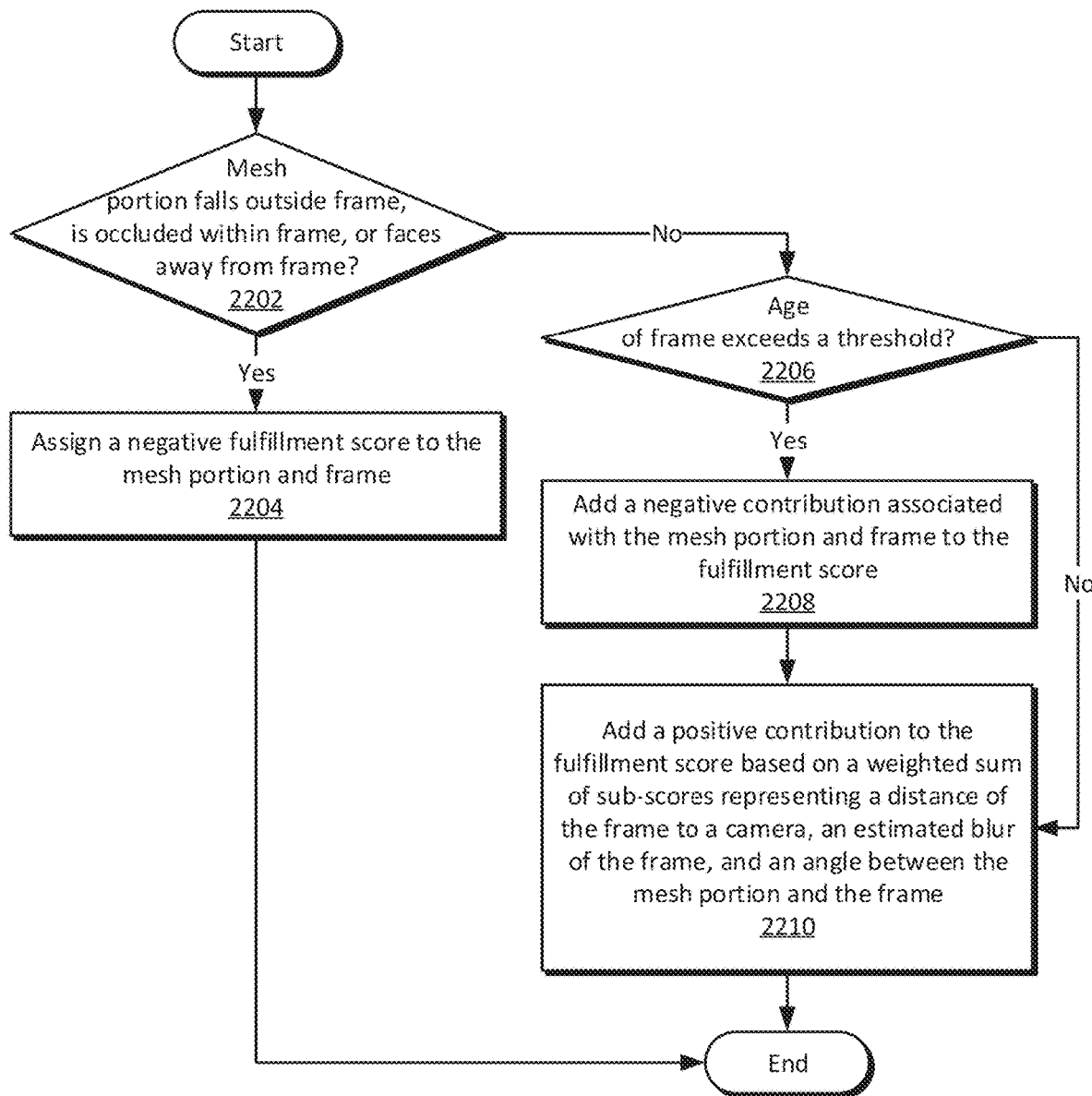
FIG. 22 sets forth a flow diagram of method steps for generating a fulfillment score representing the quality of a frame as a texture for a mesh portion included in a mesh, in accordance with example implementations.

FIG. 22 sets forth a flow diagram of method steps for generating a fulfillment score representing the quality of a frame as a texture for a mesh portion included in a mesh, in accordance with example implementations. Although the method steps are described in conjunction with FIGS. 1-15, persons of ordinary skill in the art will understand that any system configured to perform this method and/or other methods described herein, in any order, and in any combination not logically contradicted, is within the scope of the present invention.

As shown, in step 2202, the texture scoring module 1549 determines whether the mesh portion falls outside a frame, is occluded within the frame, or faces away from the frame. As described above, the mesh portion can represent a face in the mesh and/or another subset of the mesh. The texture scoring module 1549 may project the vertices of the face onto 2D locations in the image plane associated with the frame. If all 2D locations onto which the vertices are projected are within the boundaries of the frame, the texture scoring module 1549 may determine that the face falls within the frame. If one or more 2D locations onto which the vertices are projected are not within the boundaries of the frame, the texture scoring module 1549 may determine that the face falls outside of the frame. The texture scoring module 1549 may also use a ray casting technique and/or a depth matte technique to determine whether the mesh portion is occluded or visible within the frame. The texture scoring module 1549 may further use a normal vector for the mesh portion to determine whether the mesh portion faces toward or away from the frame.

If the mesh portion falls outside the frame, is occluded within the frame, or faces away from the frame, the texture scoring module 1549 proceeds to step 2204. In step 2204, the texture scoring module 1549 assigns a negative fulfillment score to the mesh portion and frame. This negative fulfillment score indicates that the frame is not suitable as a candidate for texturing the mesh portion. Alternatively, the texture scoring module 1549 may omit generating any fulfillment score for the mesh portion and frame to indicate that the frame should not be considered a candidate for texturing the mesh portion.

If the mesh portion does not fall outside the frame, is not occluded within the frame, and does not face away from the frame, the texture scoring module 1549 proceeds to step 2206. In step 2206, the texture scoring module 1549 determines whether or not the age of the frame exceeds a threshold. For example, the age of the frame may be represented as a number of seconds, a number of texturing intervals, and/or another measure of time that has elapsed since the frame was captured. During step 2206, the texture scoring module 1549 may compare the age of the frame to one or more thresholds representing one or more age ranges for the frame.

If the texture scoring module 1549 determines that the age of the frame exceeds a threshold, the texture scoring module 1549 proceeds to step 2208. In step 2208, the texture scoring module 1549 adds a negative contribution associated with the mesh portion and frame to the fulfillment score. For example, the texture scoring module 1549 may set the negative contribution to a fixed negative number when the age of the frame exceeds a given threshold. In another example, the texture scoring module 1549 may set the negative contribution to a negative number with a magnitude that is proportional to the extent to which the age of the frame exceeds a threshold. The texture scoring module 1549 then proceeds to step 2210.

If the texture scoring module 1549 determines that the age of the frame does not exceed a threshold, the texture scoring module 1549 omits step 2208 and proceeds directly to step 2210. In step 2210, the texture scoring module 1549 adds a positive contribution to the fulfillment score based on a weighted sum of sub-scores representing a distance of the frame to a camera, an estimated blur of the frame, and an angle between the mesh portion and the frame. For example, the texture scoring module 1549 may calculate a first sub-score that is inversely proportional to the distance of the frame to the camera (so that a higher first sub-score indicates that the frame is closer to the camera), a second sub-score that is inversely proportional to the estimated blur in the frame (so that a higher second sub-score indicates less blur in the frame), and a third sub-score that is inversely proportional to the angle between the mesh portion and the frame (so that a higher third sub-score indicates a face that more directly faces the frame). The texture scoring module 1549 may then multiply the sub-scores by corresponding weights and sum the weighted sub-scores to obtain the positive contribution. Finally, the texture scoring module 1549 may sum the positive contribution and any negative contribution determined in step 2208 to obtain a final fulfillment score associated with the mesh portion and frame.

Those skilled in the art will appreciate that the fulfillment score may be calculated using different types or combinations of sub-scores. For example, sub-scores used to calculate the fulfillment score may be calculated based on the number of pixels from a frame that can be used to texture a mesh portion, the dynamic range of pixel values in the portion of a frame that can be used to texture a mesh portion, and/or other attributes that can be used to characterize the quality of a frame as a texture for a mesh portion.

Figure 23:
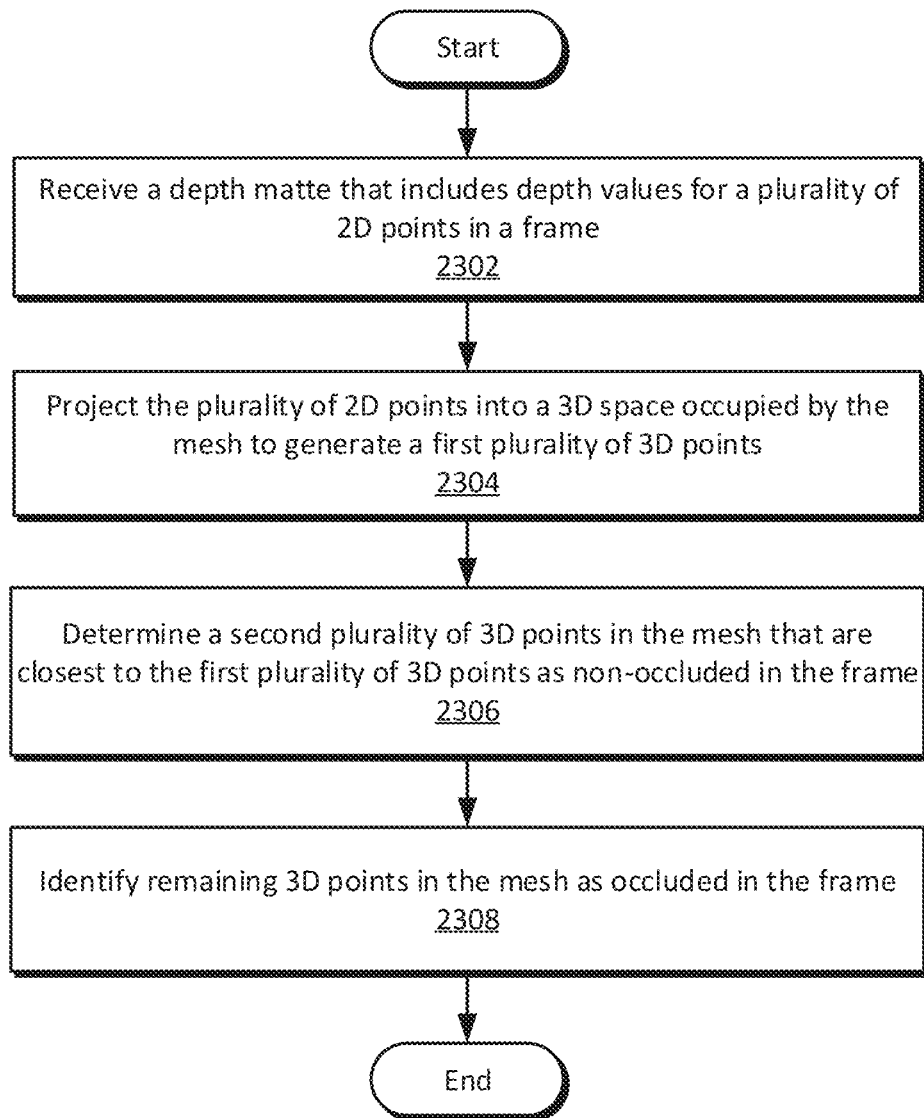
FIG. 23 sets forth a flow diagram of method steps for identifying occluded and non-occluded portions of a mesh, in accordance with example implementations.

FIG. 23 sets forth a flow diagram of method steps for identifying occluded and non-occluded portions of a mesh, in accordance with example implementations. Although the method steps are described in conjunction with FIGS. 1-15, persons of ordinary skill in the art will understand that any system configured to perform this method and/or other methods described herein, in any order, and in any combination not logically contradicted, is within the scope of the present invention.

As shown, in step 2302, the texture scoring module 1549 receives a depth matte that includes depth values for a plurality of 2D points in a frame. For example, the texture scoring module 1549 may receive the depth matte as generated by a LiDAR sensor and/or another type of depth sensor on a device (e.g., host device 106(1)).

Next, in step 2304, the texture scoring module 1549 projects the plurality of 2D points into a 3D space occupied by the mesh to generate a first plurality of 3D points. For example, the texture scoring module 1549 may use camera parameters associated with the camera that captured the frame to convert pixel coordinates and depth values associated with the 2D points in the depth matte into 3D coordinates of the first plurality of 3D points in the 3D space.

In step 2306, the texture scoring module 1549 determines a second plurality of 3D points in the mesh that are closest to the first plurality of 3D points as non-occluded in the frame. For example, the texture scoring module 1549 may identify the second plurality of 3D points as falling within a threshold distance of the first plurality of 3D points.

In step 2308, the texture scoring module 1549 identifies remaining 3D points in the mesh as occluded in the frame. Continuing with the above example, the texture scoring module 1549 may identify points in the mesh that do not fall within the threshold distance of the first plurality of 3D points as occluded.

Figure 24:
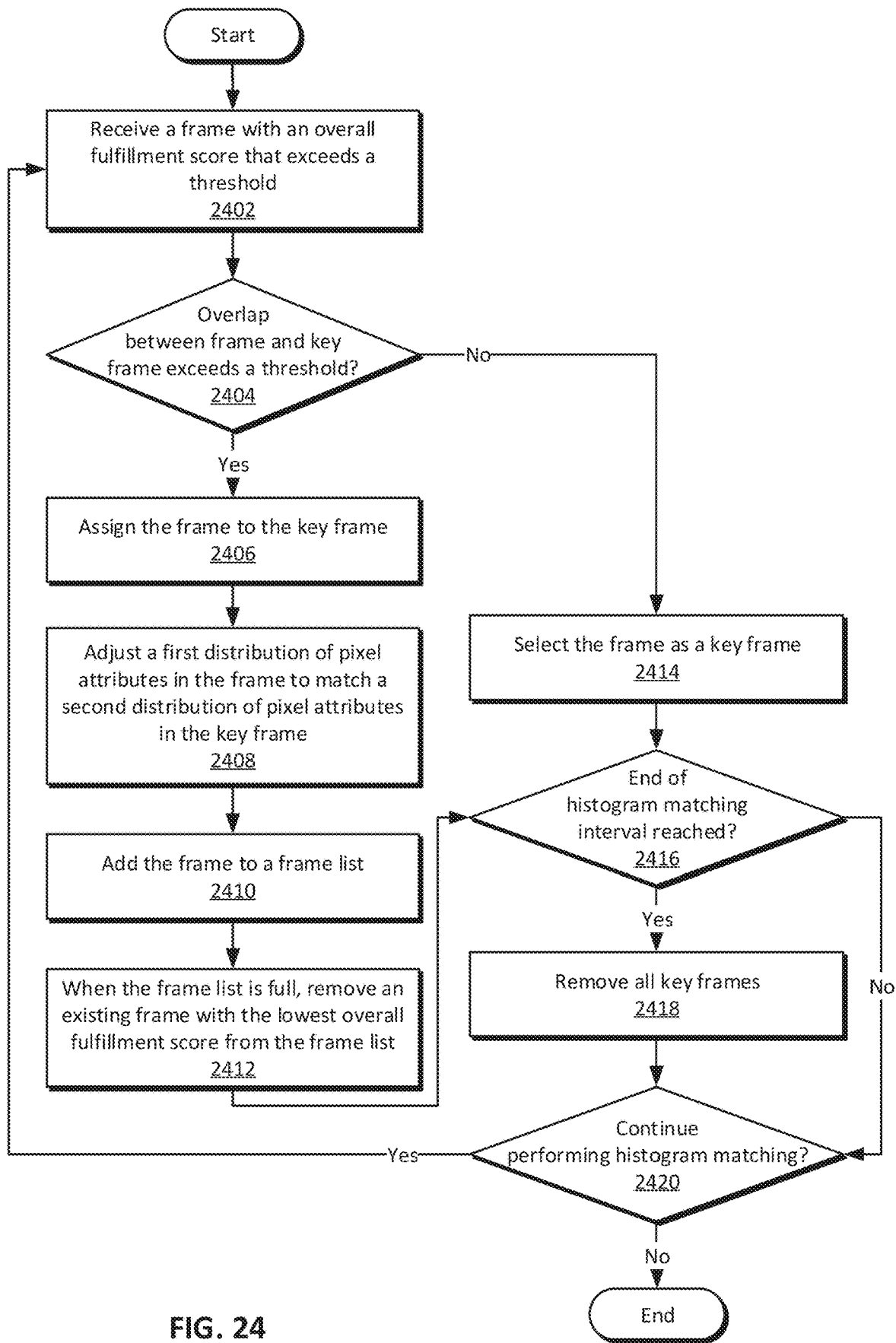
FIG. 24 sets forth a flow diagram of method steps for performing histogram matching across frames in a frame list, in accordance with example implementations.

FIG. 24 sets forth a flow diagram of method steps for performing histogram matching across frames in a frame list, in accordance with example implementations. Although the method steps are described in conjunction with FIGS. 1-15, persons of ordinary skill in the art will understand that any system configured to perform this method and/or other methods described herein, in any order, and in any combination not logically contradicted, is within the scope of the present invention.

As shown, in step 2402, the update engine 1504 receives a frame with an overall fulfillment score that exceeds a threshold. For example, the update engine 1504 may calculate the overall fulfillment score based on a proportion of the mesh that can be textured using the frame and an average fulfillment score associated with the frame and one or more mesh portions included in the proportion of the mesh. The update engine 1504 may also receive the frame after the frame is determined to have an overall fulfillment score that meets a minimum threshold for inclusion in the frame list and/or an overall fulfillment score that is greater than at least one overall fulfillment score of an existing frame in the frame list.

Next, in step 2404, the update engine 1504 determines whether or not an overlap between the frame and a key frame exceeds a threshold. For example, the update engine 1504 may calculate the overlap as a proportion of the frame that visually overlaps with the key frame, a proportion of faces in a mesh that are eligible for texturing by the frame that are also eligible for texturing by the key frame, and/or another measure of visual overlap between the frame and key frame. The update engine 1504 may then compare the calculated overlap to a numeric and/or another threshold.

If the update engine 1504 determines that the overlap between the frame and key frame exceeds the threshold, the update engine 1504 proceeds to step 2414. For example, the update engine 1504 may determine that the overlap exceeds the threshold when no key frames exist for the frame list, or when the frame captures a different part of a 3D environment than the key frame. In step 2414, the update engine 1504 selects the frame as a key frame.

If the update engine 1504 determines that the overlap between the frame and key frame does not exceed the threshold, the update engine 1504 proceeds to step 2406. Tn step 2406, the update engine 1504 assigns the frame to the key frame. For example, the update engine 1504 may store an association between the frame and the key frame to indicate assignment of the frame to the key frame.

After performing step 2406, the update engine 1504 proceeds to step 2408. In step 2408, the update engine 1504 adjusts a first distribution of pixel attributes in the frame to match a second distribution of pixel attributes in the key frame. For example, the update engine 1504 may adjust a histogram of pixel tonal values in the frame to match a corresponding histogram of pixel tonal values in the key frame.

After performing step 2408, the update engine 1504 proceeds to step 2410. In step 2410, the update engine 1504 adds the frame to the frame list. The update engine then proceeds to step 2412. In step 2412, the update engine removes an existing frame with the lowest overall fulfillment score from the frame list when the frame list is full.

After performing step 2414 or steps 2406-2412, the update engine 1504 proceeds to step 2416. In step 2416, the update engine 1504 determines whether or not an end of a histogram matching interval has been reached. For example, the update engine 1504 may compare the time elapsed since the most recent time at which a frame was selected as a key frame to a value representing the histogram matching interval. If the time elapsed equals or exceeds the value, the update engine 1504 may determine that the end of the histogram matching interval is reached. If the time elapsed is less than the value, the update engine 1504 may determine that the end of the histogram matching interval has not been reached.

If the update engine 1504 determines that the end of the histogram matching interval has been reached, the update engine 1504 proceeds to step 2418. In step 2418, the update engine removes all key frames from the frame list. The update engine then proceeds to step 2420.

If the update engine 1504 determines that the end of the histogram matching interval has not been reached, the update engine 1504 skips step 2418 and proceeds directly to step 2420. In step 2420, the update engine 1504 determines whether or not to continue performing histogram matching. For example, the update engine 1504 may continue performing histogram matching of frames in the frame list while a mesh associated with the frame list is textured using frames in the frame list. If histogram matching of frames in the frame list is to continue, the update engine 1504 repeats steps 2402-2418 one or more times until step 2420 is reached again. If the update engine 1504 determines at step 2420 that histogram matching of frames in the frame list is to be discontinued, the texturing engine 1506 does not repeat steps 2402-2418.

Figure 25:
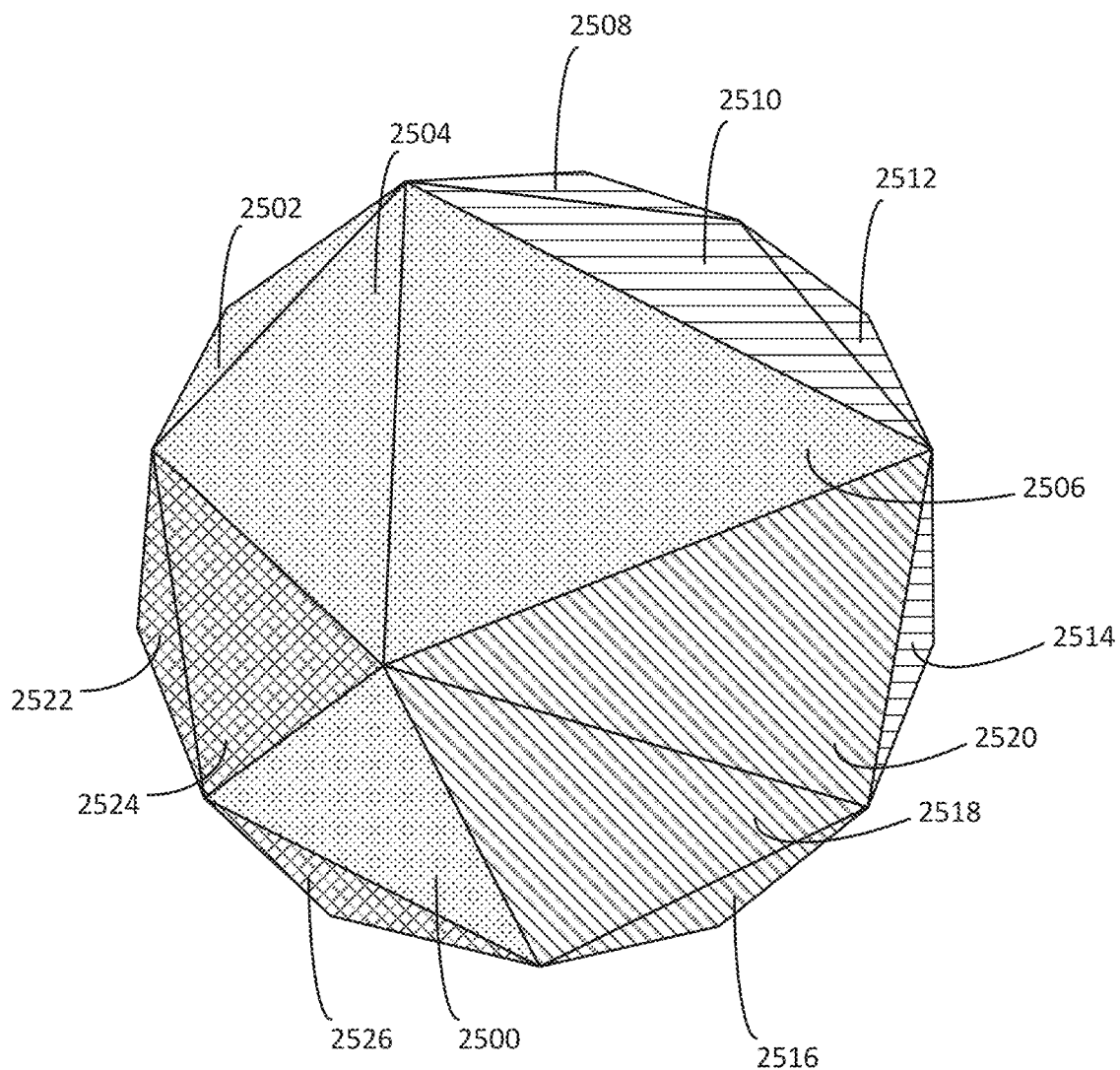
FIG. 25 illustrates an example division of a mesh into multiple submeshes, in accordance with example implementations.

FIG. 25 illustrates an example division of a mesh into multiple submeshes (Mi, submeshes 1568), in accordance with example implementations. As shown in FIG. 25, the mesh includes multiple faces 2500-2526, where each face includes a fill pattern that denotes a frame used to texture the face. Thus, four faces 2500-2506 are textured using a first frame, four faces 2508-2514 are textured using a second frame, three faces 2516-X20 are textured using a third frame, and three faces 2522-2526 are textured using a fourth frame.

As mentioned above, each face included in faces 2500-2526 may be associated with a set of fulfillment scores. Each fulfillment score may represent the quality of a texture generated from a corresponding frame for the face. During retexturing of the mesh, a frame associated with the highest fulfillment score (or a fulfillment score that indicates the highest quality texture) for each face in the mesh is identified, out of multiple frames in a frame list for the mesh. The frame is assigned as a texture for the face, and texture coordinates for the face are calculated as pixel locations within the frame.

Figure 26:
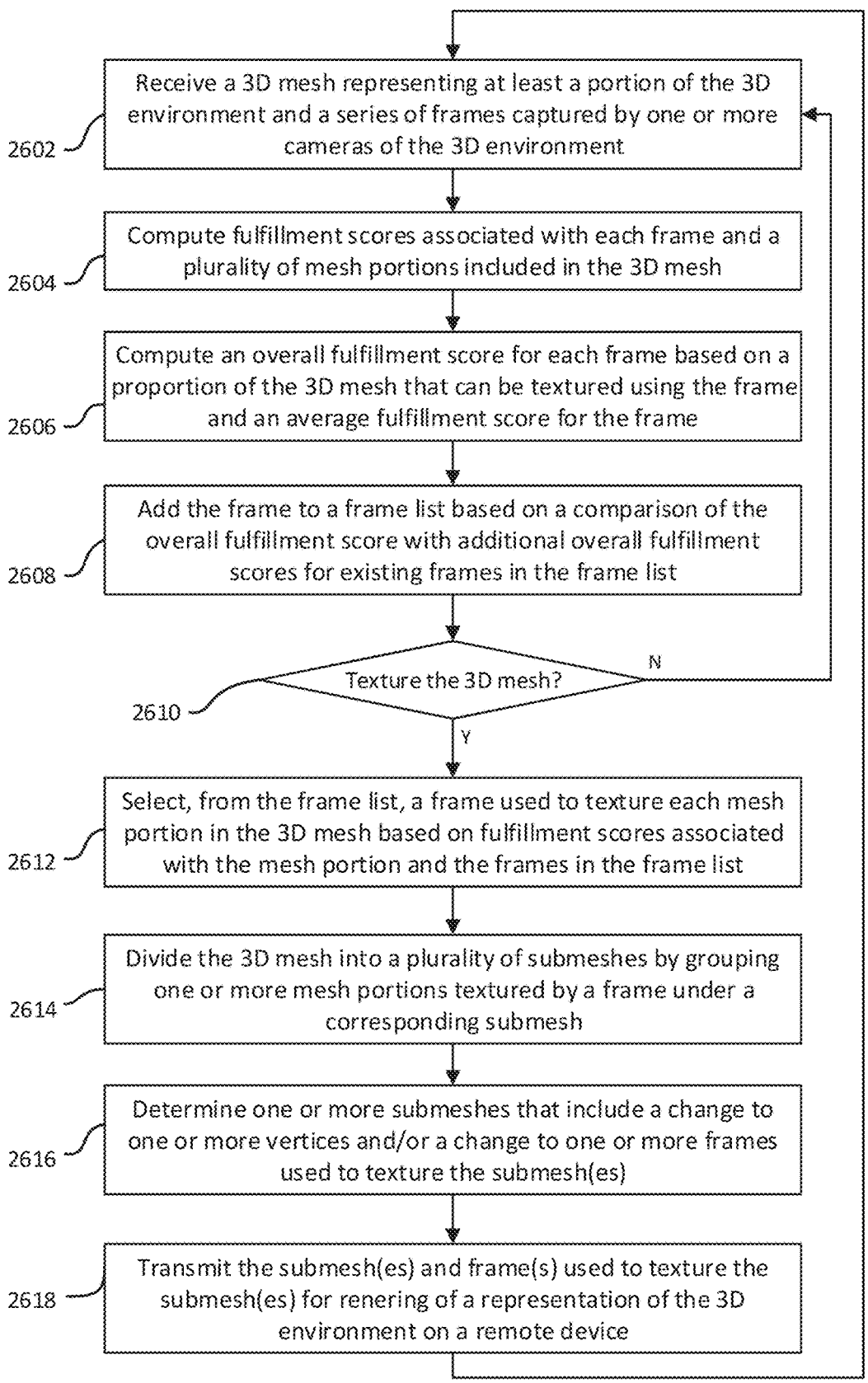
FIG. 26 sets forth a flow diagram of method steps for scanning a 3D environment, in accordance with example implementations.

Because visual quality can vary within an image and each fulfillment score reflects multiple criteria that characterize the suitability of a corresponding frame as a texture for a face, a given frame can be selected as a texture for non-adjacent faces in the mesh. In the example show in FIG. 25, the face 2500 is textured using the same frame as three other faces 2502-X06, none of which are adjacent to the face 2500. Similarly, the face 2514 can be textured using the same frame as three other faces 2508-2512, even if one or more faces (not shown) between the FIG. 26 sets forth a flow diagram of method steps for scanning a 3D environment, in accordance with example implementations. Although the method steps are described in conjunction with FIGS. 1-15, persons of ordinary skill in the art will understand that any system configured to perform this method and/or other methods described herein, in any order, and in any combination not logically contradicted, is within the scope of the present invention.

As shown, in step 2602, the update engine 1504 receives a 3D mesh representing at least a portion of the 3D environment and a series of frames captured by one or more cameras of the 3D environment. For example, the update engine 1504 may receive the 3D mesh after points in the mesh are captured by a LiDAR sensor and/or another type of depth sensor on a host device. The update engine 1504 may also receive the series of frames at a frame rate that is supported by the camera(s) on the host device and/or based on a "frame capture interval" that is slower than the frame rate supported by the cameras.

Next, in step 2604, the update engine 1504 computes fulfillment scores associated with each frame and a plurality of mesh portions included in the mesh. Each fulfillment score represents the quality of a frame as a texture for a mesh portion within the mesh (e.g., a face in the mesh). For example, each fulfillment score may be calculated based on one or more filters and/or one or more sub-scores representing indicators of a frame's quality or suitability as a texture for a corresponding mesh portion.

In step 2606, the update engine 1504 computes an overall fulfillment score for each frame based on a proportion of the 3D mesh that can be textured using the frame and an average fulfillment score for the frame. For example, the update engine 1504 may determine the proportion of mesh portions in the mesh that have "valid" (e.g., positive) fulfillment scores for the frame. The update engine 1504 may also calculate the average valid fulfillment score associated with those mesh portions and the frame. The update engine 1504 may then calculate the overall fulfillment score as the product of the average valid fulfillment score and the proportion of mesh portions with valid fulfillment scores for the frame.

In step 2608, the update engine 1504 adds the frame to a frame list based on a comparison of the overall fulfillment score with additional overall fulfillment scores for existing frames in the frame list. For example, the update engine 1504 may add the frame to the frame list when the overall fulfillment score for the frame meets a minimum threshold for inclusion in the frame list and/or is greater than at least one overall fulfillment score of an existing frame in the frame list. If the frame list is full, the update engine 1504 may remove an existing frame with the lowest overall fulfillment score from the frame list to accommodate the addition of the frame to the frame list.

In step 2610, the texturing engine 1506 determines whether or not the 3D mesh is to be textured. For example, the texturing engine 1506 may determine whether or not a texturing interval has elapsed since the last time the mesh was textured. If the texturing interval has lapsed, the texturing engine 1506 may determine that the 3D mesh is to be textured. If the texturing interval has not yet lapsed, the texturing engine 1506 may determine that the 3D mesh is not to be textured.

While the texturing engine 1506 determines that the 3D mesh is not to be textured, the update engine 1504 repeats steps 2602-2608 to update the frame list with newer frames and/or frames that represent higher quality textures for mesh portions in the mesh. The texturing engine 1506 also repeats step 2610 to periodically and/or continually evaluate whether or not the 3D mesh is to be textured.

After the texturing engine 1506 determines that the 3D mesh is to be textured, the texturing engine 1506 proceeds to step 2612. In step 2612, the texturing engine 1506 selects, from the frame list, a frame used to texture each mesh portion in the 3D mesh based on fulfillment scores associated with the mesh portion and the frames in the frame list. For example, the texturing engine 1506 may optionally calculate an updated fulfillment score associated with each mesh portion in the 3D mesh and each frame in the frame list as a weighted combination of the current fulfillment score for the mesh portion and the frame and the average fulfillment score for the same frame and one or more mesh portions that are adjacent to (or nearby) the mesh portion. The texturing engine 1506 may then select a frame used to texture each mesh portion as the frame in the frame list with a highest updated fulfillment score (or original fulfillment score calculated in step 2604, if calculation of the updated fulfillment score is omitted) for the mesh portion.

In step 2614, the texturing engine 1506 divides the 3D mesh into a plurality of submeshes by grouping one or more mesh portions textured by a frame under a corresponding submesh. For example, the texturing engine 1506 may create a material for each frame used to texture the mesh and add the frame as a texture associated with the material. The texturing engine 1506 may also calculate texture coordinates for vertices in the submesh that correspond to pixel locations in the frame and add the texture coordinates to the material. The texturing engine 1506 may further assign the material to a new submesh and add vertices, faces, normals, and/or other attributes of one or more mesh portions textured using the frame to the submesh.

In step 2616, the texturing engine 1506 determines one or more submeshes that include a change to one or more vertices and/or a change to one or more frames used to texture the submesh(es). For example, the texturing engine 1506 may cache a first set of submeshes created from the mesh at an earlier time (e.g., during a previous round of retexturing and/or updating of the mesh). After performing step 2614, the texturing engine 1506 may create a second, newer set of submeshes from the mesh based on the frames used to texture the mesh. The texturing engine 1506 may compare the second set of submeshes with the cached first set of submeshes to identify, within the second set of submeshes, one or more "changed" submeshes with vertices, faces, normal, textures, and/or attributes that are different from those of one or more corresponding submeshes in the first set of submeshes.

In step 2618, the texturing engine 1506 transmits the submesh(es) identified in step 2616 and one or more frames used to texture the submesh(es) to a distributed messaging system and/or one or more remote devices 106. For example, the texturing engine 1506 may transmit the submesh(es) and frame(s) to a distributed messaging system for receipt by the remote devices. Alternatively, the texturing engine 1506 may transmit the submesh(es) and frame(s) directly to the remote device(s). The remote device(s) may then render the changed submeshes in an extended reality application, thereby providing users of the remote device(s) with a 3D representation of the physical space that is textured using the most recent frames captured by the image sensor. The update engine 1504 and texturing engine 1506 may also repeat steps 2602-2618 while a representation of the 3D environment is continually captured and transmitted to the remote device(s).

1. In various embodiments, a computer-implemented method for scanning a three-dimensional (3D) environment comprises generating mesh data representing a 3D environment, receiving a plurality of frames associated with the 3D environment and captured by an image sensor coupled to a host device, determining, for each frame in the plurality of frames, a fulfillment score that represents a quality of a texture generated from the frame for at least a subset of mesh faces included in the mesh data, generating two-dimensional (2D) texture data for the mesh data based on the plurality of frames and the associated fulfillment scores, and transmitting at least a portion of the 2D texture data and at least a portion of the 3D depth data to a remote device for rendering a representation of the 3D environment.

2. The computer-implemented method of clause 1, further comprising correlating the 2D texture data to the one or more 3D meshes, where a texture in the 2D texture data is applied to one or more mesh faces in the set of mesh faces based on the correlation.

3. The computer-implemented method of clause 1 or 2, further comprising, for each frame in the plurality of frames, generating frame metadata associated with the frame, where the frame metadata includes the fulfillment score, storing the frame metadata in a frame list that stores sets of frame metadata corresponding to a subset of frames captured by the image sensor over a plurality of time interval.

4. The computer-implemented method of any of clauses 1-3, further comprising determining a position of the image sensor within the 3D environment when 2D surface data associated with the frame was captured, and determining, based the position, a position change value, and comparing the position change value to a movement threshold.

5. The computer-implemented method of any of clauses 1-4, where the frame metadata for a given frame is stored in the frame cache upon determining that the position change value does not exceed the movement threshold.

6. The computer-implemented method of any of clauses 1-5, where the position is determined after an end of the first interval.

7. The computer-implemented method of any of clauses 1-6, where, based on the fulfillment score, the 2D texture data is generated from the frame for a corresponding mesh face.

8. The computer-implemented method of any of clauses 1-7, where each fulfillment score is based on a position the image sensor within the 3D environment when 2D surface data associated with the frame was captured.

9. The computer-implemented method of any of clauses 1-8, where each mesh face in a subset of mesh faces is associated with mesh metadata that identifies a frame that includes the associated 2D texture data.

10. The computer-implemented method of any of clauses 1-9, where the mesh metadata for a mesh face includes at least one of an age value of the mesh face, a fulfillment score of the frame that includes the associated 3D texture data, a mesh metadata identifier, or a frame metadata identifier.

11. In various embodiments, one or more non-transitory computer readable media storing instructions that, when executed by one or more processors, cause the one or more processors to perform the steps of generating mesh data representing a 3D environment, receiving a plurality of frames associated with the 3D environment and captured by an image sensor coupled to a host device, determining, for each frame in the plurality of frames, a fulfillment score that represents a quality of a texture generated from the frame for at least a subset of mesh faces included in the mesh data, generating two-dimensional (2D) texture data for the mesh data based on the plurality of frames and the associated fulfillment scores, and transmitting at least a portion of the 2D texture data and at least a portion of the 3D depth data to a remote device for rendering a representation of the 3D environment.

12. The one or more non-transitory computer readable media of clause 11, further comprising correlating the 2D texture data to the one or more 3D meshes, where a texture in the 2D texture data is applied to one or more mesh faces in the set of mesh faces based on the correlation.

13. The one or more non-transitory computer readable media of clause 11 or 12, further comprising, for each frame in the plurality of frames, generating frame metadata associated with the frame, where the frame metadata includes the fulfillment score, storing the frame metadata in a frame list that stores sets of frame metadata corresponding to a subset of frames captured by the image sensor over a plurality of time interval.

14. The one or more non-transitory computer readable media of any of clauses 11-13, further comprising determining a position of the image sensor within the 3D environment when 2D surface data associated with the frame was captured, and determining, based the position, a position change value, and comparing the position change value to a movement threshold.

15. The one or more non-transitory computer readable media of any of clauses 11-14, where the frame metadata for a given frame is stored in the frame cache upon determining that the position change value does not exceed the movement threshold.

16. The one or more non-transitory computer readable media of any of clauses 11-15, where the position is determined after an end of the first interval.

17. The one or more non-transitory computer readable media of any of clauses 11-16, where, based on the fulfillment score, the 2D texture data is generated from the frame for a corresponding mesh face.

18. The one or more non-transitory computer readable media of any of clauses 11-17, where each fulfillment score is based on a position the image sensor within the 3D environment when 2D surface data associated with the frame was captured.

19. In various embodiments, a computer system comprises a memory storing instructions, and a processor for executing the instructions to generate mesh data representing a 3D environment, receive a plurality of frames associated with the 3D environment and captured by an image sensor coupled to a host device, determine, for each frame in the plurality of frames, a fulfillment score that represents a quality of a texture generated from the frame for at least a subset of mesh faces included in the mesh data, generate two-dimensional (2D) texture data for the mesh data based on the plurality of frames and the associated fulfillment scores, and transmit at least a portion of the 2D texture data and at least a portion of the 3D depth data to a remote device for rendering a representation of the 3D environment.

20. The computer system of clause 19, where the processor executes the instructions to correlate the 2D texture data to the one or more 3D meshes, where a texture in the 2D texture data is applied to one or more mesh faces in the set of mesh faces based on the correlation.

8.0 Terminology

Computer programs typically comprise one or more instructions set at various times in various memory devices of a computing device, which, when read and executed by at least one processor, will cause a computing device to execute functions involving the disclosed techniques. In some implementations, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular embodiment. Furthermore, use of "e.g.." is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain implementations require at least one of X, at least one of Y and at least one of Z to each be present. Further, use of the phrase "at least one of X, Y or Z" as used in general is to convey that an item, term, etc. may be either X, Y or Z, or any combination thereof.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Implementations are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

The invention claimed is:

1. A computer-implemented method for scanning a three-dimensional (3D) environment, the method comprising:
    generating mesh data representing a 3D environment;
    receiving a plurality of frames associated with the 3D environment and captured by an image sensor coupled to a host device;
    determining, for each frame in the plurality of frames, a fulfillment score that represents a quality of a texture generated from the frame for at least a subset of mesh faces included in the mesh data;
    generating, by a processor, two-dimensional (2D) texture data for the mesh data based on the plurality of frames and the associated fulfillment scores; and
    transmitting, by the processor, a portion of the 2D texture data and a portion of 3D depth data for the mesh data to a remote device for rendering a representation of the 3D environment.

2. The computer-implemented method of claim 1, further comprising:
    correlating the 2D texture data to one or more 3D meshes, wherein a texture in the 2D texture data is applied to one or more mesh faces in the subset of mesh faces based on the correlation.

3. The computer-implemented method of claim 1, further comprising, for each frame in the plurality of frames:
    generating frame metadata associated with the frame, wherein the frame metadata includes the fulfillment score; and
    storing the frame metadata in a frame list that stores sets of frame metadata corresponding to a subset of frames captured by the image sensor over a plurality of time intervals.

4. The computer-implemented method of claim 1, further comprising, for each of the frames in the plurality of frames:
    determining a position of the image sensor within the 3D environment when 2D surface data associated with the frame was captured; and
    determining, based the position, a position change value; and
    comparing the position change value to a movement threshold.

5. The computer-implemented method of claim 4, further comprising:
    generating frame metadata associated with the frame, wherein the frame metadata includes the fulfillment score,
    wherein the frame metadata for a given frame is stored in a frame cache upon determining that the position change value does not exceed the movement threshold.

6. The computer-implemented method of claim 4, wherein the position is determined after an end of a first interval.

7. The computer-implemented method of claim 1, wherein, based on the fulfillment score, the 2D texture data is generated from the frame for a corresponding mesh face.

8. The computer-implemented method of claim 1, wherein each fulfillment score is based on a position the image sensor within the 3D environment when 2D surface data associated with the frame was captured.

9. The computer-implemented method of claim 1, wherein each mesh face in a subset of mesh faces is associated with mesh metadata that identifies a frame that includes the associated 2D texture data.

10. The computer-implemented method of claim 9, wherein the mesh metadata for a mesh face includes at least one of:

an age value of the mesh face,
a fulfillment score of the frame that includes the associated 2D texture data,
a mesh metadata identifier, or
a frame metadata identifier.

11. One or more non-transitory computer readable media storing instructions that, when executed by one or more processors, cause the one or more processors to perform the steps of:
generating mesh data representing a 3D environment;
receiving a plurality of frames associated with the 3D environment and captured by an image sensor coupled to a host device;
determining, for each frame in the plurality of frames, a fulfillment score that represents a quality of a texture generated from the frame for at least a subset of mesh faces included in the mesh data;
generating, by a processor, two-dimensional (2D) texture data for the mesh data based on the plurality of frames and the associated fulfillment scores; and
transmitting, by the processor a portion of the 2D texture data and at a portion of 3D depth data for the mesh data to a remote device for rendering a representation of the 3D environment.

12. The one or more non-transitory computer readable media of claim 11, further comprising:
correlating the 2D texture data to one or more 3D meshes, wherein a texture in the 2D texture data is applied to one or more mesh faces in the subset of mesh faces based on the correlation.

13. The one or more non-transitory computer readable media of claim 11, further comprising, for each frame in the plurality of frames:
generating frame metadata associated with the frame, wherein the frame metadata includes the fulfillment score; and
storing the frame metadata in a frame list that stores sets of frame metadata corresponding to a subset of frames captured by the image sensor over a plurality of time intervals.

14. The one or more non-transitory computer readable media of claim 11, further comprising, for each of the frames in the plurality of frames:
determining a position of the image sensor within the 3D environment when 2D surface data associated with the frame was captured; and
determining, based the position, a position change value; and
comparing the position change value to a movement threshold.

15. The one or more non-transitory computer readable media of claim 14, further comprising instructions that, when executed by the one or more processors, cause the one or more processors to perform the step of:
generating frame metadata associated with the frame, wherein the frame metadata includes the fulfillment score,
wherein the frame metadata for a given frame is stored in a frame cache upon determining that the position change value does not exceed the movement threshold.

16. The one or more non-transitory computer readable media of claim 14, wherein the position is determined after an end of a first interval.

17. The one or more non-transitory computer readable media of claim 11, wherein, based on the fulfillment score, the 2D texture data is generated from the frame for a corresponding mesh face.

18. The one or more non-transitory computer readable media of claim 11, wherein each fulfillment score is based on a position the image sensor within the 3D environment when 2D surface data associated with the frame was captured.

19. A computer system, comprising:
a memory storing instructions; and
a processor for executing the instructions to:
generate mesh data representing a 3D environment;
receive a plurality of frames associated with the 3D environment and captured by an image sensor coupled to a host device;
determine, for each frame in the plurality of frames, a fulfillment score that represents a quality of a texture generated from the frame for at least a subset of mesh faces included in the mesh data;
generate two-dimensional (2D) texture data for the mesh data based on the plurality of frames and the associated fulfillment scores; and
transmit a portion of the 2D texture data and a portion of 3D depth data for the mesh data to a remote device for rendering a representation of the 3D environment.

20. The computer system of claim 19, wherein the processor executes the instructions to:
correlate the 2D texture data to one or more 3D meshes, wherein a texture in the 2D texture data is applied to one or more mesh faces in the subset of mesh faces based on the correlation.

* * * * *